US010091387B2

(12) United States Patent
Park et al.

(10) Patent No.: US 10,091,387 B2
(45) Date of Patent: Oct. 2, 2018

(54) IMAGE FORMING DEVICE SUPPORTING SHORT RANGE WIRELESS COMMUNICATION AND METHOD FOR OPERATING SAME, MOBILE TERMINAL SUPPORTING SHORT RANGE WIRELESS COMMUNICATION AND METHOD FOR OPERATING SAME, AND CLOUD PRINT SYSTEM USING SHORT RANGE WIRELESS COMMUNICATION

(71) Applicant: S-Printing Solution Co., Ltd., Suwon-si, Gyeonggi-do (KR)

(72) Inventors: Hyun-wook Park, Suwon-si (KR); Naveen Maheshwari, Suwon-si (KR); Mok-hwa Lim, Suwon-si (KR); Kang-yub Kim, Yongin-si (KR); Byoung-yue Kim, Suwon-si (KR); Eun-young Jung, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 2 days.

(21) Appl. No.: 15/327,265

(22) PCT Filed: Aug. 26, 2015

(86) PCT No.: PCT/KR2015/008925
§ 371 (c)(1),
(2) Date: Jan. 18, 2017

(87) PCT Pub. No.: WO2016/036045
PCT Pub. Date: Mar. 10, 2016

(65) Prior Publication Data
US 2017/0134609 A1 May 11, 2017

Related U.S. Application Data

(60) Provisional application No. 62/045,431, filed on Sep. 3, 2014.

(30) Foreign Application Priority Data

Dec. 8, 2014 (KR) .................. 10-2014-0175380

(51) Int. Cl.
*H04N 1/327* (2006.01)
*H04N 1/00* (2006.01)
(Continued)

(52) U.S. Cl.
CPC .......... *H04N 1/32776* (2013.01); *G06F 3/12* (2013.01); *G06Q 30/02* (2013.01);
(Continued)

(58) Field of Classification Search
CPC ....... H04N 1/00307; H04N 2201/0094; H04N 2201/0075
See application file for complete search history.

(56) References Cited

U.S. PATENT DOCUMENTS 9,736,644 B2 * 8/2017 Meredith .............. H04W 4/023
2004/0152419 A1 * 8/2004 Lee ................... H04M 1/72519
455/67.7
(Continued)

FOREIGN PATENT DOCUMENTS

EP 1 916 830 A1 4/2008
KR 10-2005-0050497 A 5/2005
(Continued)

*Primary Examiner* — Nicholas Pachol
(74) *Attorney, Agent, or Firm* — Jefferson IP Law, LLP

(57) ABSTRACT

Provided is an operating method of an image forming apparatus, the operating method including broadcasting a plurality of packets comprising identification information of the image forming apparatus; receiving a connection request comprising the identification information of the image forming apparatus from a mobile terminal which received some packets from among the plurality of broadcasted packets; and connecting to the mobile terminal, based on the connection request, wherein the connection request is transmit-
(Continued)

ted from the mobile terminal when received signal strengths of the some packets received by the mobile terminal are equal to or greater than a first threshold value. In this regard, the first threshold value may indicate a received signal strength greater than a minimum received signal strength at which communication with the mobile terminal is available.

16 Claims, 49 Drawing Sheets

(51) Int. Cl.
    *H04N 1/32*     (2006.01)
    *H04N 1/44*     (2006.01)
    *G06F 3/12*     (2006.01)
    *G06Q 30/02*     (2012.01)

(52) U.S. Cl.
    CPC ..... *H04N 1/00278* (2013.01); *H04N 1/00307* (2013.01); *H04N 1/00344* (2013.01); *H04N 1/32* (2013.01); *H04N 1/32117* (2013.01); *H04N 1/32786* (2013.01); *H04N 1/4433* (2013.01); *H04N 2201/0075* (2013.01); *H04N 2201/0087* (2013.01); *H04N 2201/0094* (2013.01); *H04N 2201/3205* (2013.01); *H04N 2201/3278* (2013.01)

(56) References Cited

U.S. PATENT DOCUMENTS

| | | | |
|---|---|---|---|
| 2005/0099962 A1* | 5/2005 | Matsuda | H04L 41/0253 370/254 |
| 2008/0184345 A1 | 7/2008 | Kaechi | |
| 2010/0054179 A1* | 3/2010 | Meyer | H04W 48/20 370/328 |
| 2011/0205961 A1* | 8/2011 | Santivanez | H04W 74/0816 370/328 |
| 2012/0140285 A1 | 6/2012 | Kamath et al. | |
| 2013/0005256 A1* | 1/2013 | Koehler | H04W 8/26 455/41.2 |
| 2013/0225204 A1* | 8/2013 | Mathews | H04N 21/4126 455/456.3 |
| 2014/0085663 A1 | 3/2014 | Kavanappillil et al. | |
| 2014/0109196 A1 | 4/2014 | Jagannatharao et al. | |
| 2014/0355517 A1* | 12/2014 | Reunamaki | H04W 8/005 370/328 |
| 2015/0234623 A1* | 8/2015 | Mochizuki | G06F 3/1238 358/1.14 |
| 2015/0271628 A1* | 9/2015 | Knaappila | H04W 4/008 455/41.2 |

FOREIGN PATENT DOCUMENTS

| | | |
|---|---|---|
| KR | 10-2013-0060732 A | 6/2013 |
| WO | 2008-050085 A1 | 5/2008 |

\* cited by examiner

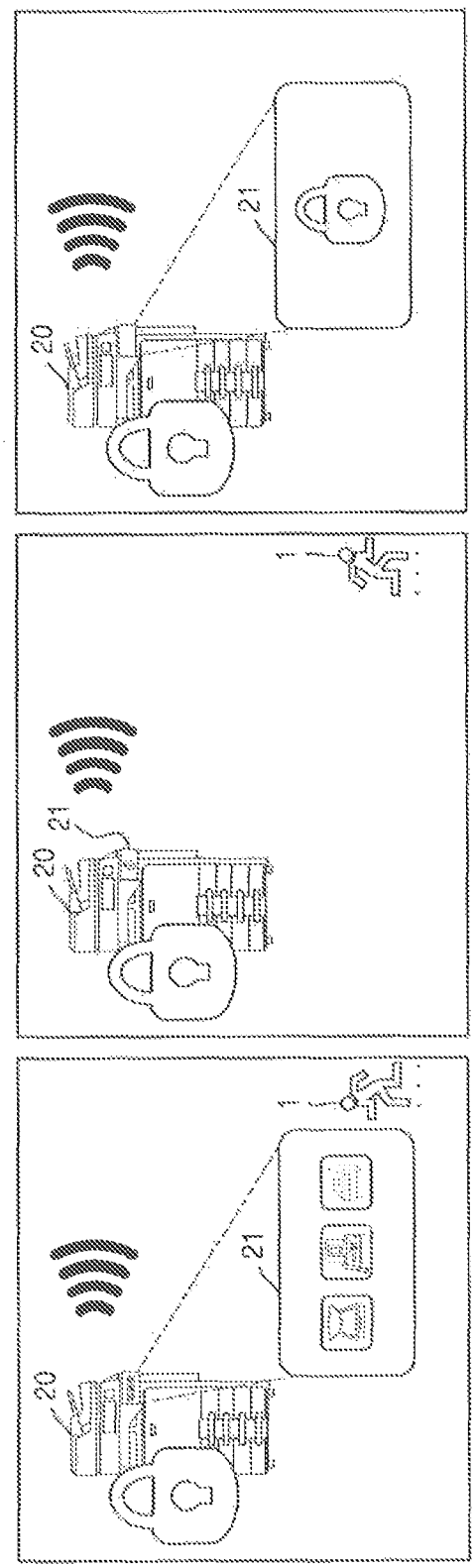

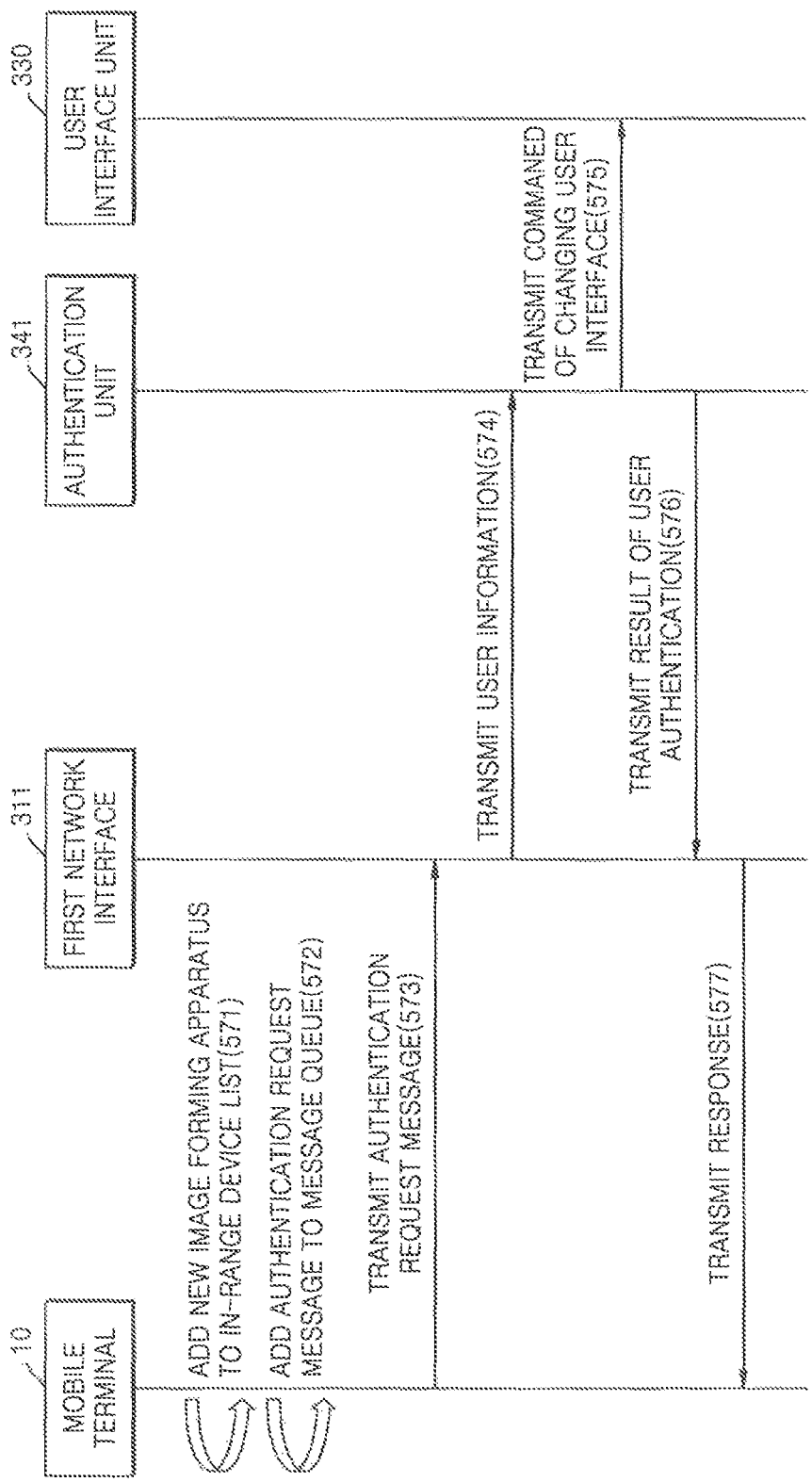

FIG. 7B
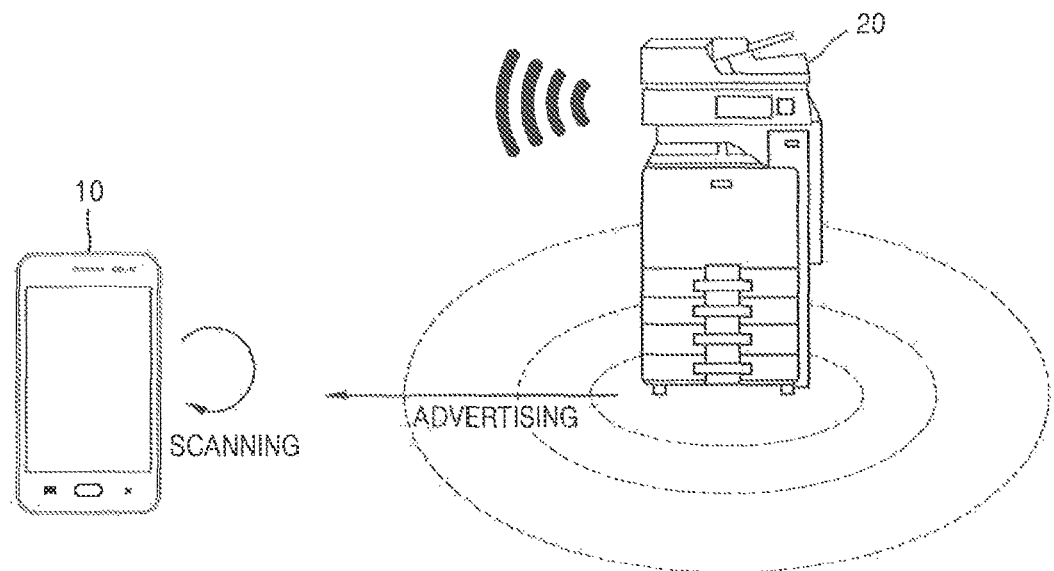
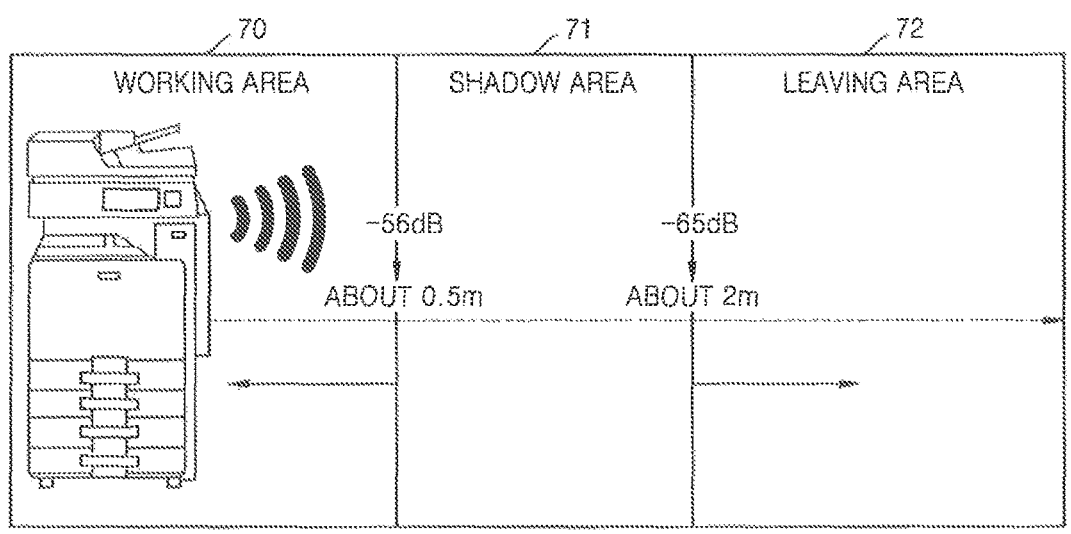

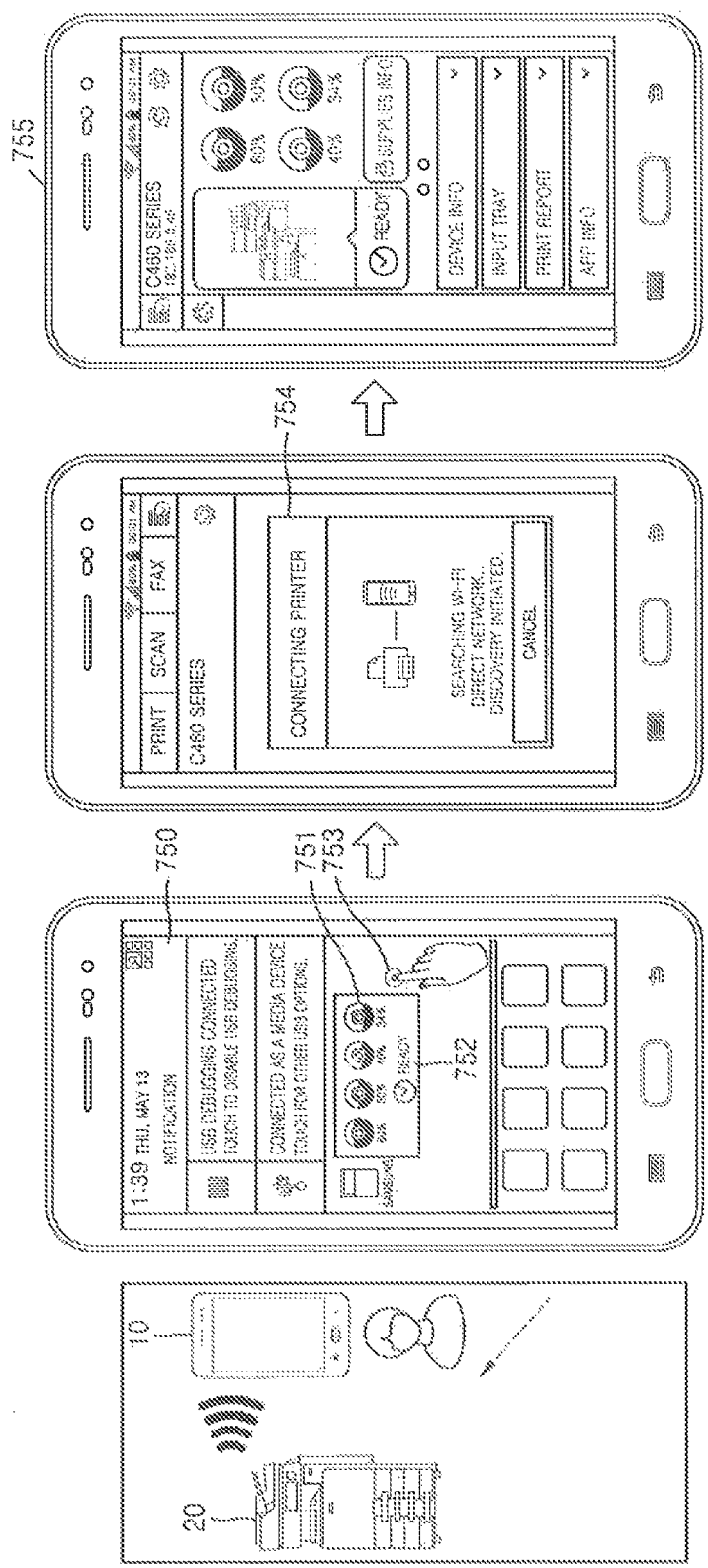

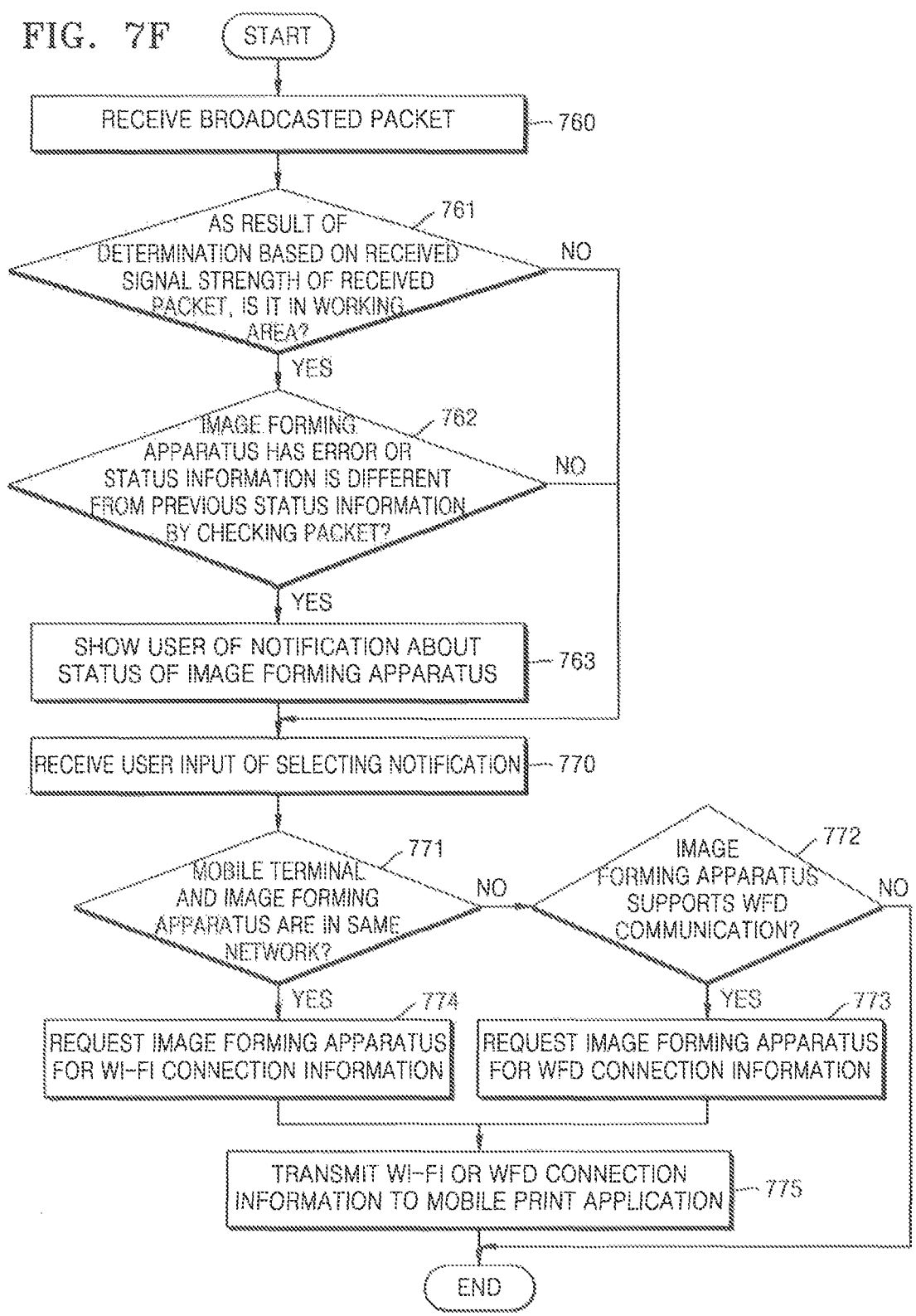

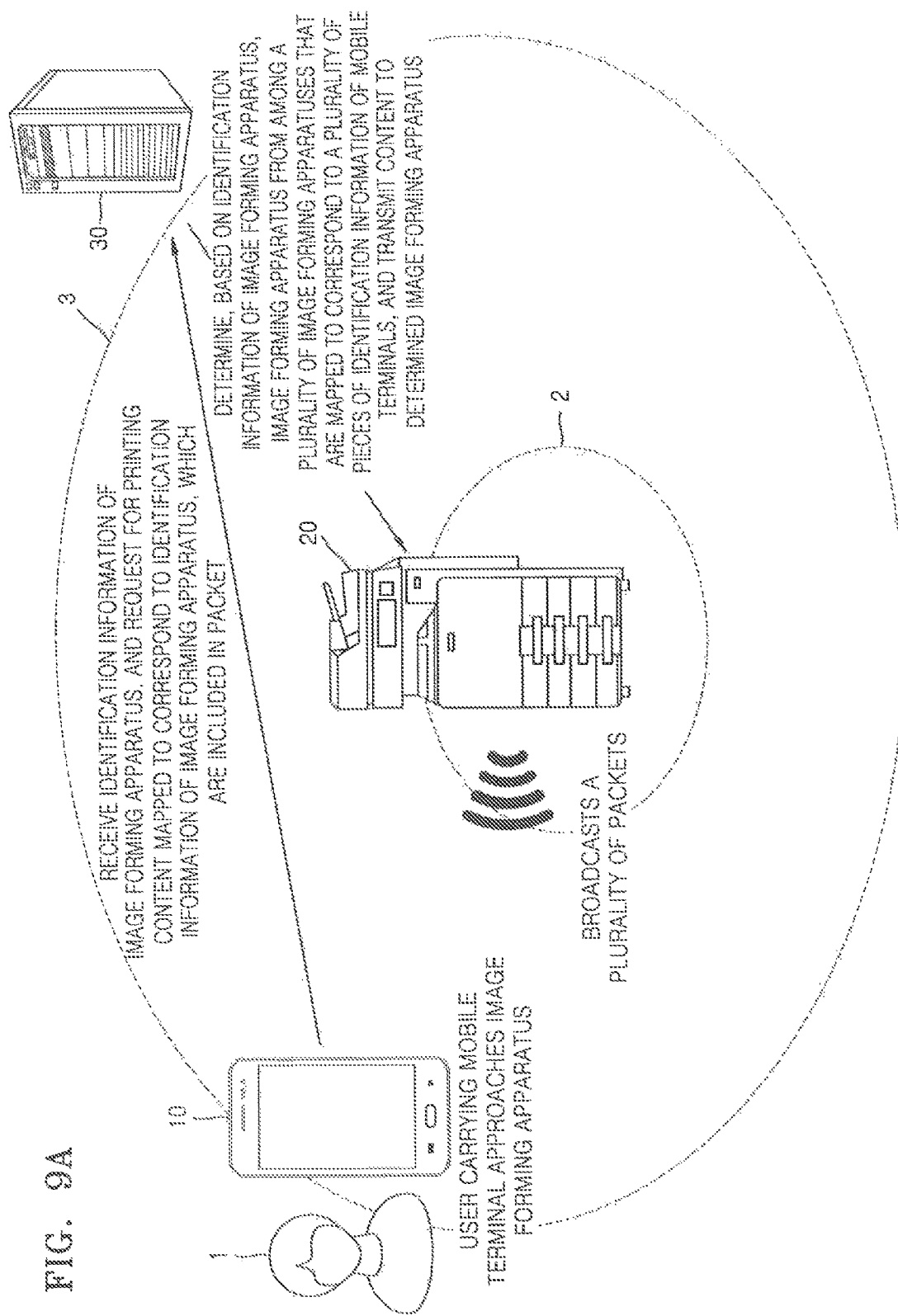

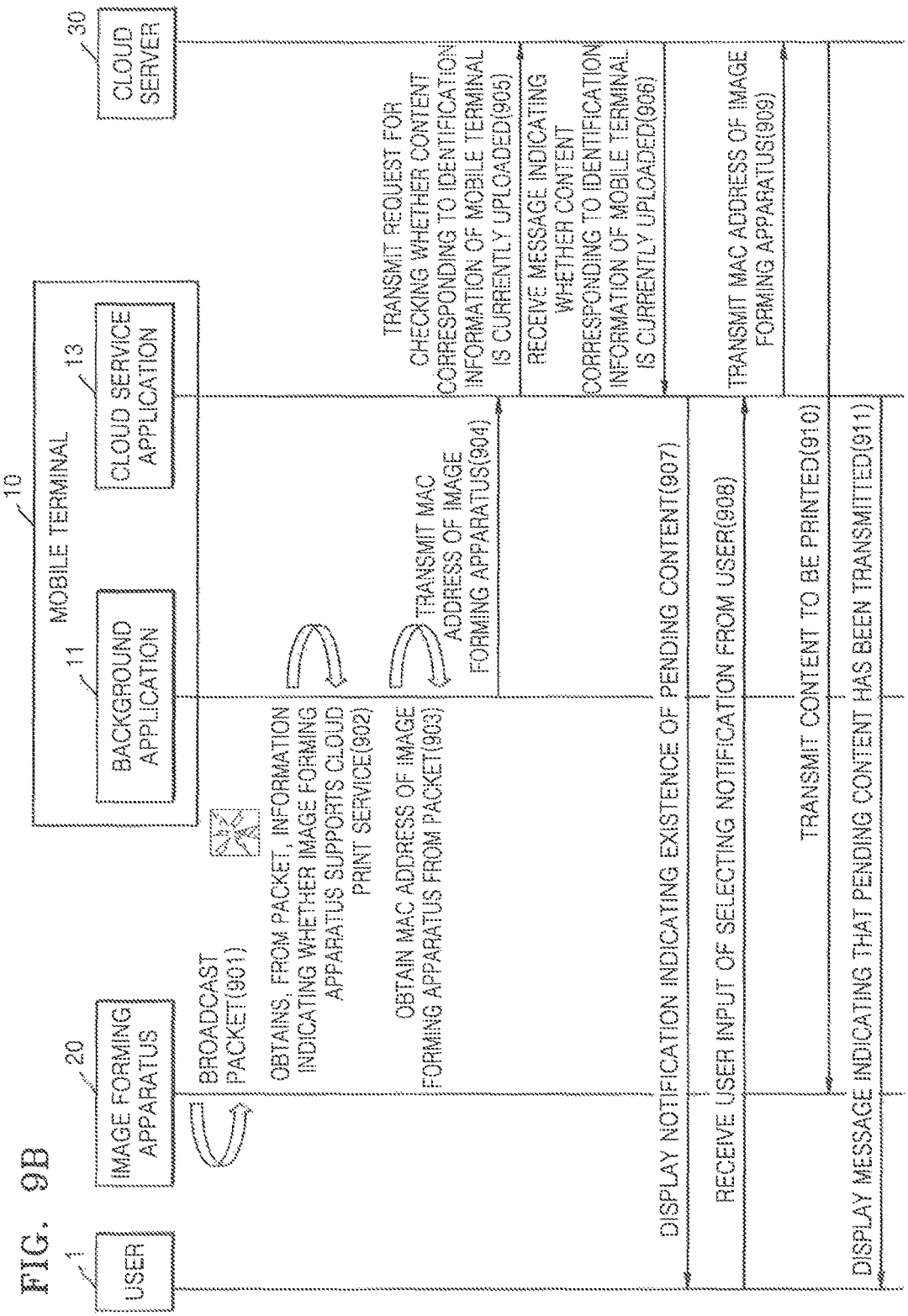

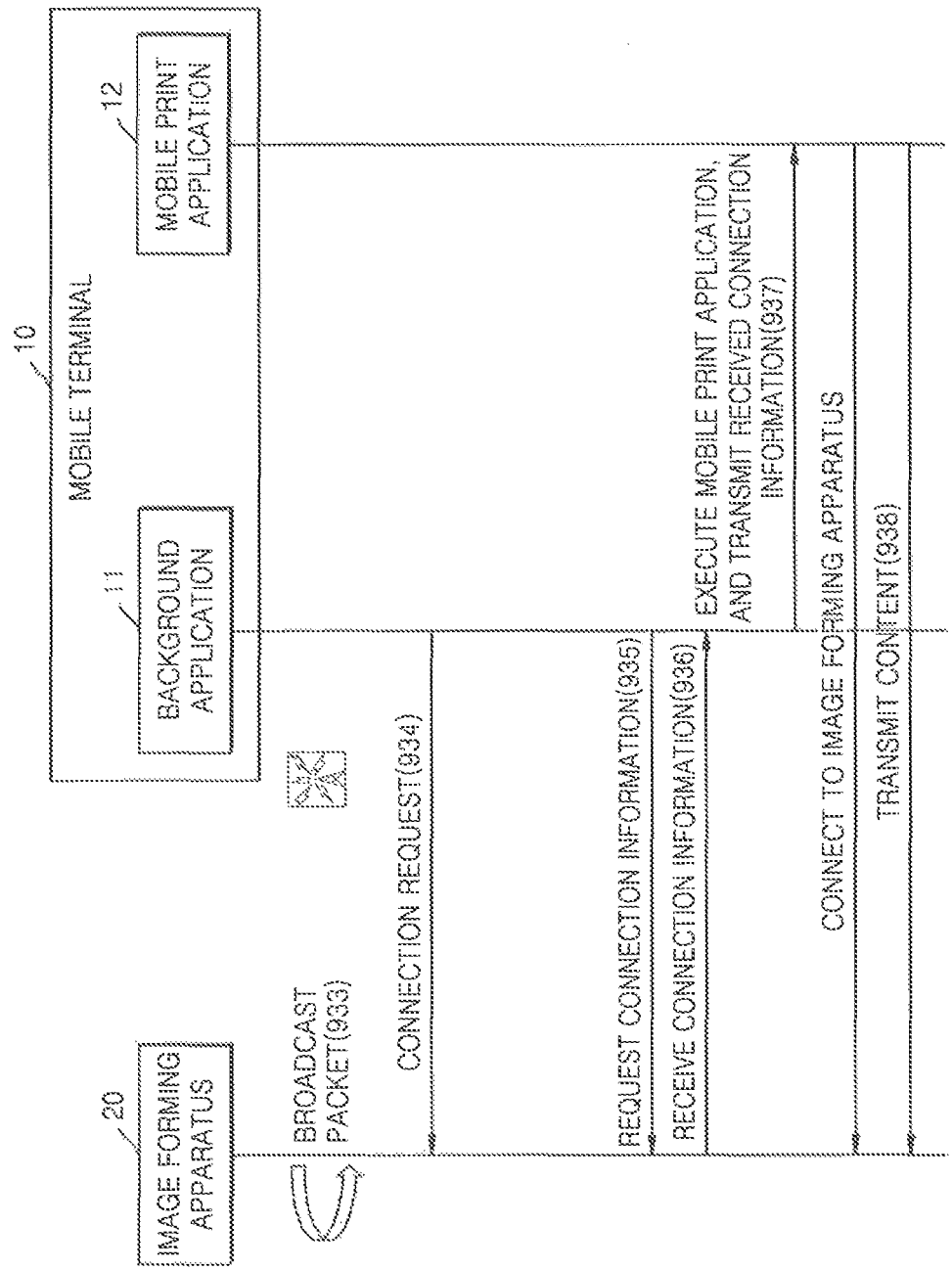

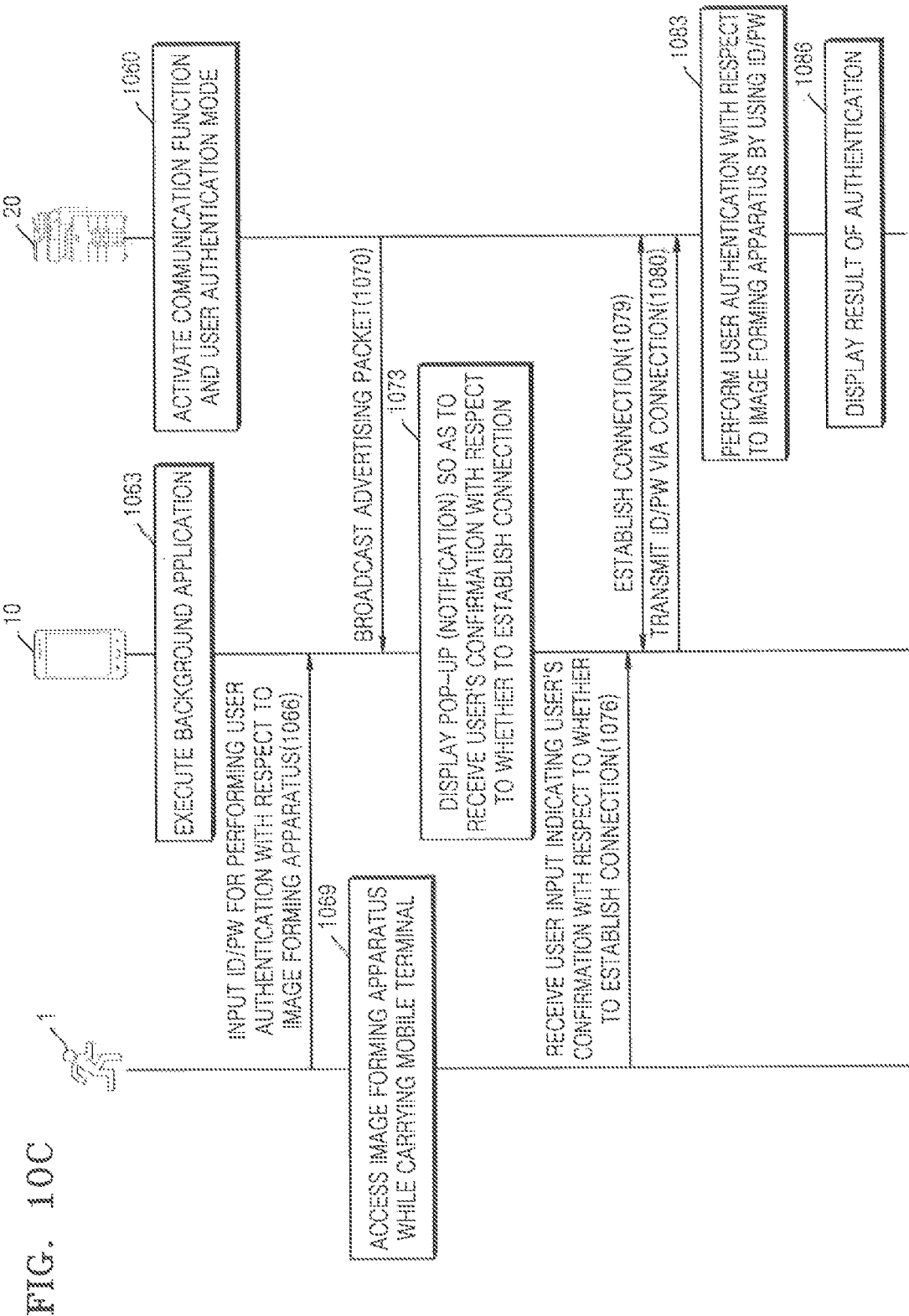

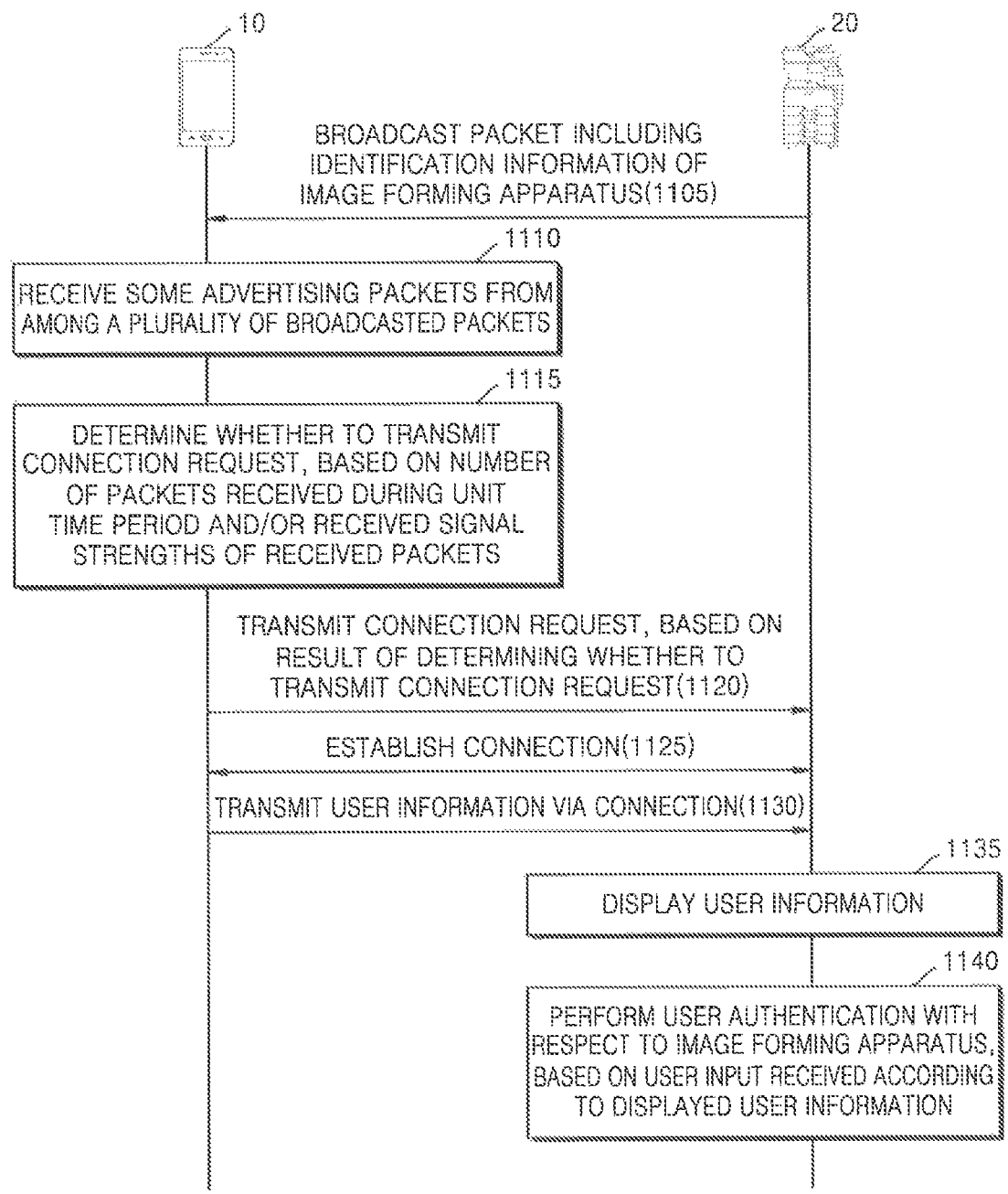

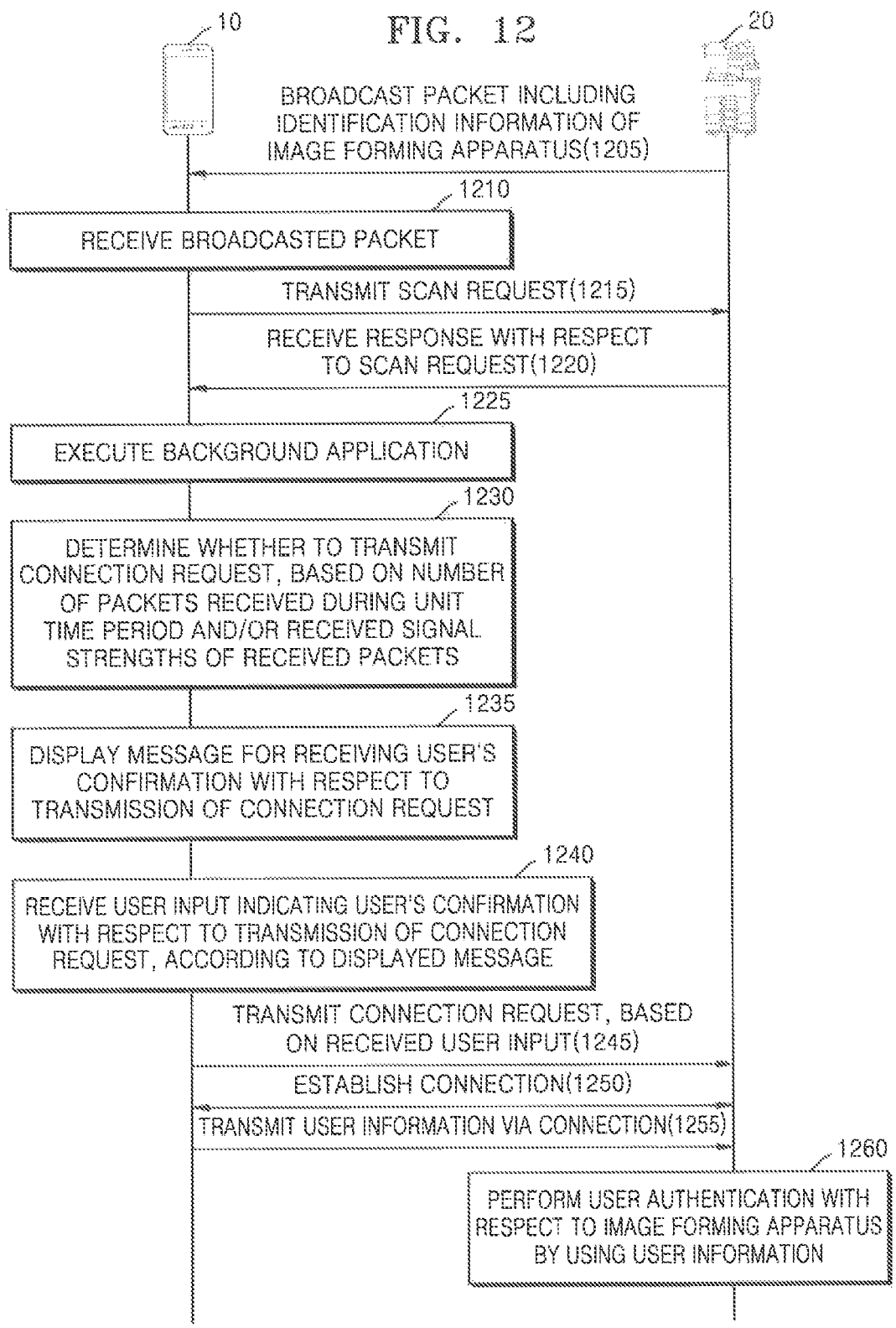

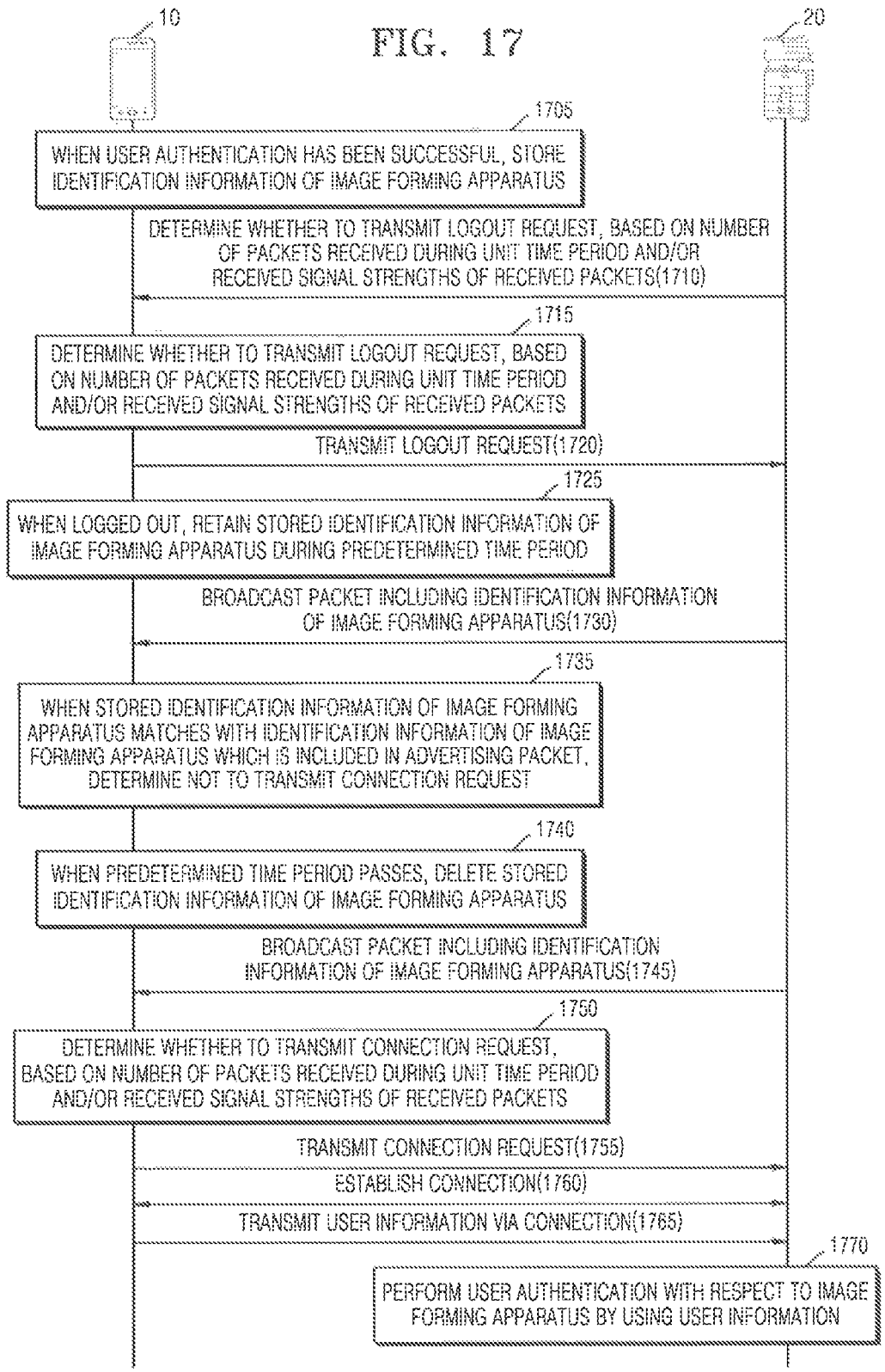

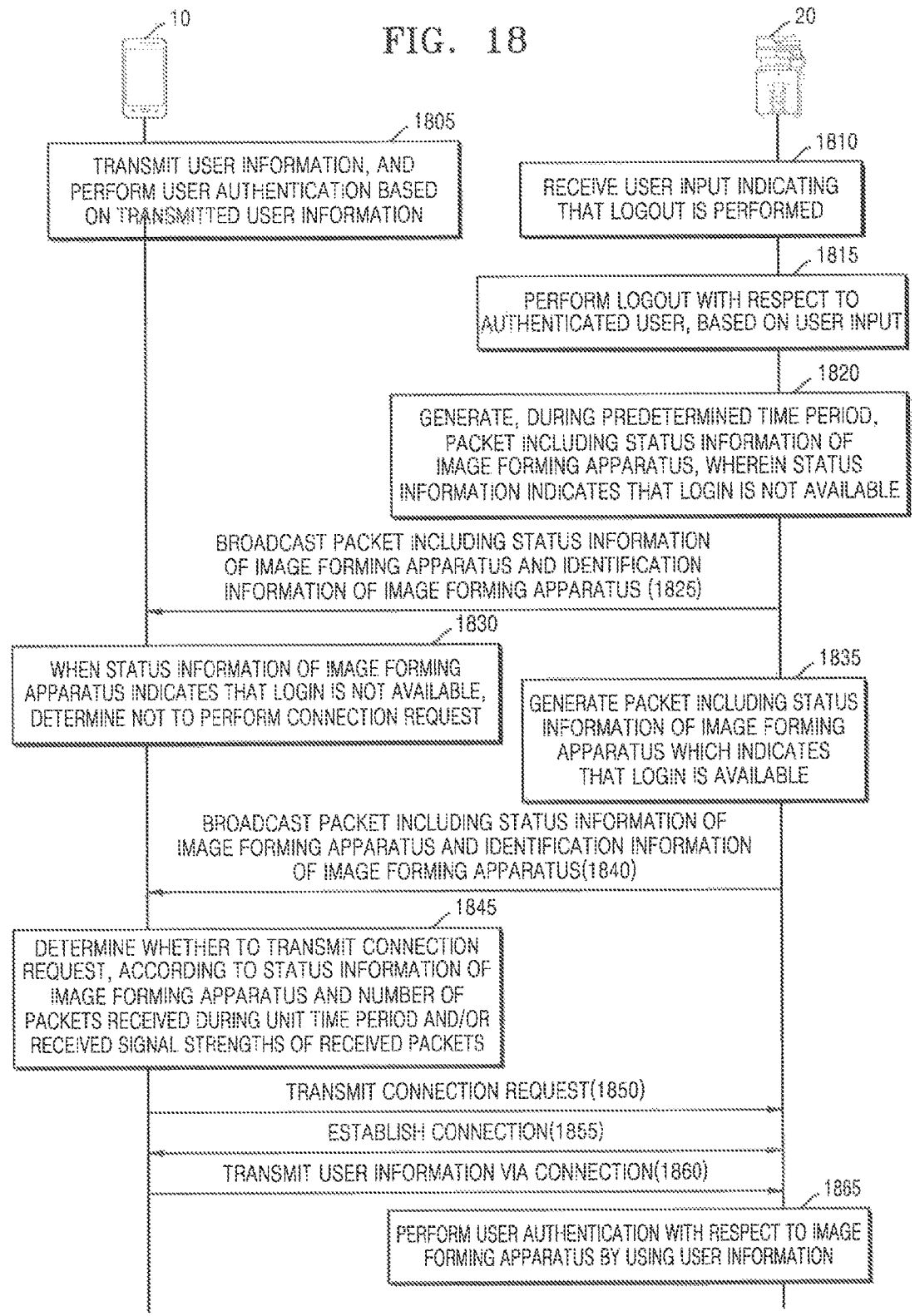

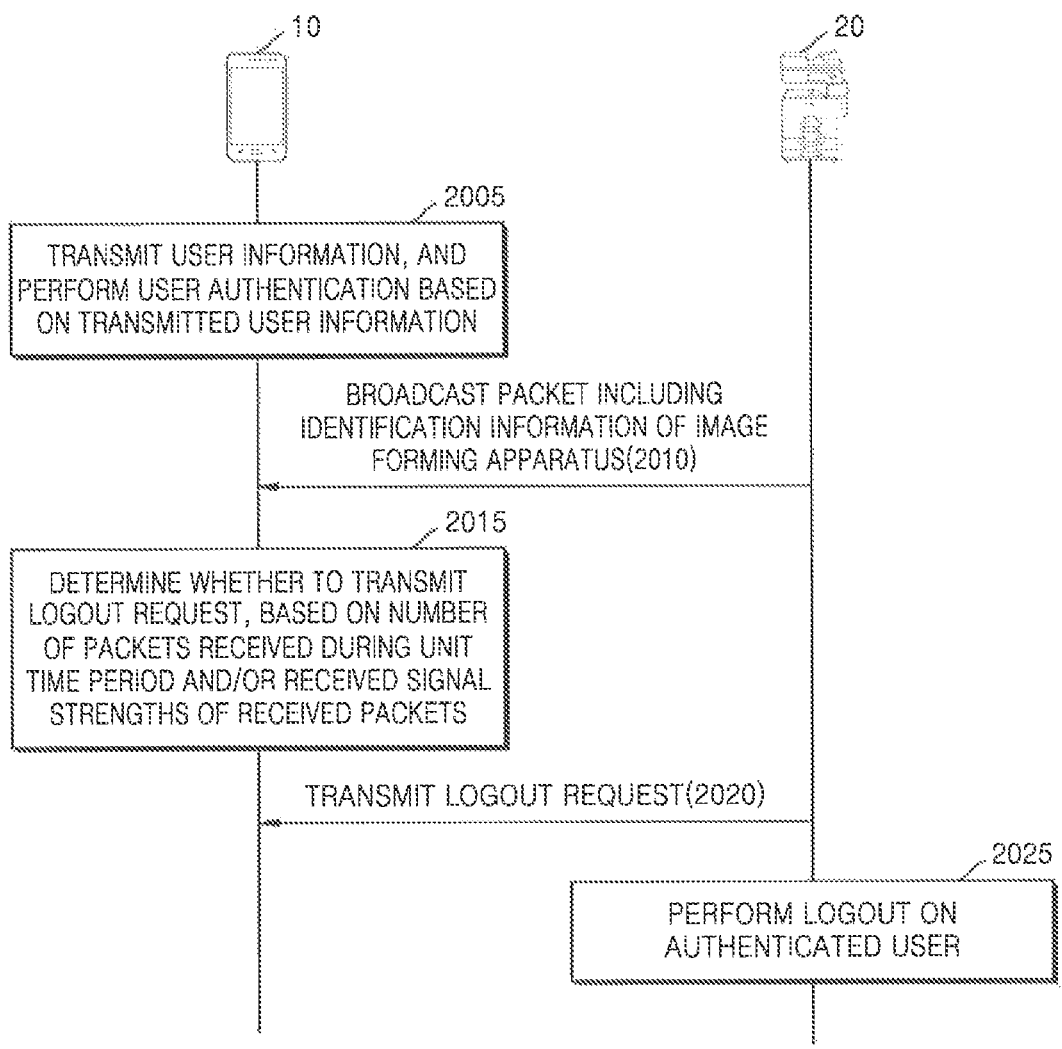

IMAGE FORMING DEVICE SUPPORTING SHORT RANGE WIRELESS COMMUNICATION AND METHOD FOR OPERATING SAME, MOBILE TERMINAL SUPPORTING SHORT RANGE WIRELESS COMMUNICATION AND METHOD FOR OPERATING SAME, AND CLOUD PRINT SYSTEM USING SHORT RANGE WIRELESS COMMUNICATION

TECHNICAL FIELD

One or more exemplary embodiments relate to a technique for performing a task of an image forming apparatus by using short-distance wireless communication.

BACKGROUND ART

Various wireless communication techniques are used to interconnect an image forming apparatus and a mobile terminal. However, when a user attempts to connect to an image forming apparatus by using a mobile terminal, the user is inconvenienced due to when manually selecting one of image forming apparatuses that are discovered by the mobile terminal.

A mobile terminal may measure signal strengths of advertising packets received from an image forming apparatus, and when the mobile terminal receives an advertising packet with a signal strength sufficient to connect to the image forming apparatus, the mobile terminal may automatically connect to the image forming apparatus. However, even if a user does not want to connect the mobile terminal to the image forming apparatus, once the mobile terminal receives the advertising packet with the signal strength sufficient to connect to the image forming apparatus, the mobile terminal is connected to the image forming apparatus, and thus, even when the user is distant from the image forming apparatus, making it difficult for the user to manipulate the image forming apparatus, the mobile terminal is automatically connected to the image forming apparatus.

Accordingly, there is a demand for the mobile terminal to connect to the image forming apparatus when the user of the mobile terminal approaches within a distance sufficient for the user to manipulate the image forming apparatus.

DETAILED DESCRIPTION OF THE INVENTION

Technical Problem

According to an embodiment, an operating method of an image forming apparatus includes broadcasting a plurality of packets including identification information of the image forming apparatus; receiving a connection request including the identification information of the image forming apparatus from a mobile terminal which received some packets from among the plurality of broadcasted packets; and connecting to the mobile terminal, based on the connection request, wherein the connection request is transmitted from the mobile terminal, according to the number of packets that are from among the some packets, that are received by the mobile terminal during a unit time period, and whose received signal strengths are equal to or greater than a first threshold value.

According to another embodiment, an operating method of a mobile terminal includes receiving a plurality of packets including identification information of an image forming apparatus from the image forming apparatus; determining whether to transmit a connection request according to the number of packets that are from among the plurality of packets, that are received during a unit time period, and whose received signal strengths are equal to or greater than a first threshold value; and according to a result of the determining, transmitting the connection request to the image forming apparatus, and connecting to the image forming apparatus.

According to another embodiment, a cloud print system includes a cloud server that receives, from a mobile terminal, a print request for content registered and mapped to identification information of the mobile terminal, and transmits the content to an image forming apparatus to perform an image forming job on the content, wherein the image forming apparatus is from among a plurality of image forming apparatuses that are registered and mapped to the identification information of the mobile terminal; and the image forming apparatus that receives the content from the cloud server and thus, performs the image forming job on the content, wherein the image forming apparatus broadcasts a plurality of packets including identification information of the image forming apparatus, the cloud server receives the identification information of the image forming apparatus and the print request for the content from the mobile terminal that received some packets from among the plurality of packets, determines, based on the identification information of the image forming apparatus, the image forming apparatus from among the plurality of image forming apparatuses that are registered and mapped to the identification information of the mobile terminal, and transmits the content to the image forming apparatus, and the mobile terminal transmits the print request for the content, according to the number of packets that are from among the some packets, are received by the mobile terminal during a unit time period, and whose received signal strengths are equal to or greater than a first threshold value.

According to another embodiment, an image forming apparatus includes a network interface for broadcasting a plurality of packets including identification information of the image forming apparatus; a user interface for providing a user interface that receives a user input; a task performer including a scan module, a fax module, and a print module; and a controller for controlling the network interface to receive a connection request including the identification information of the image forming apparatus from a mobile terminal which received some packets from among the plurality of broadcasted packets, and to connect to the mobile terminal, based on the connection request, wherein the connection request is transmitted from the mobile terminal, according to the number of packets that are from among the some packets, are received by the mobile terminal during a unit time period, and whose received signal strengths are equal to or greater than a first threshold value.

According to another embodiment, a mobile terminal includes a network interface for receiving a plurality of packets including identification information of an image forming apparatus; and a controller for determining whether to transmit a connection request according to the number of packets that are from among the plurality of packets, are received during a unit time period, and whose received signal strengths are equal to or greater than a first threshold value, wherein the controller controls, according to a result of the determining, the network interface to transmit the connection request to the image forming, and to connect to the image forming apparatus.

According to another embodiment, a recording medium may read recorded computer programs for executing the methods by using a computer.

BRIEF DESCRIPTION OF THE DRAWINGS

FIG. 5F illustrates a procedure in which, when a user carrying the mobile terminal becomes distant from the image forming apparatus, the image forming apparatus changes and displays a user interface of the image forming apparatus, according to an embodiment.

FIG. 5G illustrates a procedure in which the mobile terminal transmits user information to the image forming apparatus, and receives a result of user authentication from the image forming apparatus, according to an embodiment.

FIG. 7B illustrates a procedure in which the mobile terminal receives an advertising packet from the image forming apparatus by executing a background application, and determines, by using the advertising packet, whether to transmit a connection request.

FIG. 7E illustrates a procedure in which, when a user carrying the mobile terminal approaches the image forming apparatus, the mobile terminal provides a notification about a status of the image forming apparatus, according to an embodiment.

FIG. 7F is a flowchart for describing a procedure in which the mobile terminal provides a notification about a status of the image forming apparatus, according to an embodiment.

FIG. 9A illustrates an environment of a cloud print system using the mobile terminal, according to an embodiment.

FIG. 9B illustrates a procedure in which, when a user carrying the mobile terminal approaches the image forming apparatus, the image forming apparatus outputs content that was uploaded to a cloud server, according to an embodiment.

FIG. 9E is a flowchart for describing a procedure in which the mobile terminal requests the image forming apparatus for connection information, and when the mobile terminal receives the connection information, the mobile terminal transmits content to the image forming apparatus by using the connection information, and the image forming apparatus prints the content, according to an embodiment.

FIG. 10C is a flowchart for describing in detail a procedure in which, when a user carrying the mobile terminal approaches the image forming apparatus, the image forming apparatus performs user authentication by using a user input received according to a displayed message, according to an embodiment.

FIG. 11 is a flowchart for describing in detail a procedure in which the image forming apparatus displays user information and performs user authentication with respect to the image forming apparatus by using a user input received according to the displayed user information, according to an embodiment.

FIG. 12 is a flowchart for describing a procedure in which the mobile terminal transmits a scan request, receives application identification information for performing an application, and performs user authentication with respect to the image forming apparatus, according to an embodiment.

FIG. 17 is a flowchart for describing a procedure in which the mobile terminal stores identification information of the image forming apparatus during a preset time period, and thus, limits user authentication using the mobile terminal, according to an embodiment.

FIG. 18 is a flowchart for describing a procedure in which the image forming apparatus broadcasts an advertising packet including status information of the image forming apparatus during a preset time period, and thus, limits user authentication using the mobile terminal, according to an embodiment.

FIG. 20 is a flowchart for describing a procedure in which the image forming apparatus performs a logout on an authenticated user when the mobile terminal becomes distant from the image forming apparatus, according to an embodiment.

BEST MODE

Figure 1:
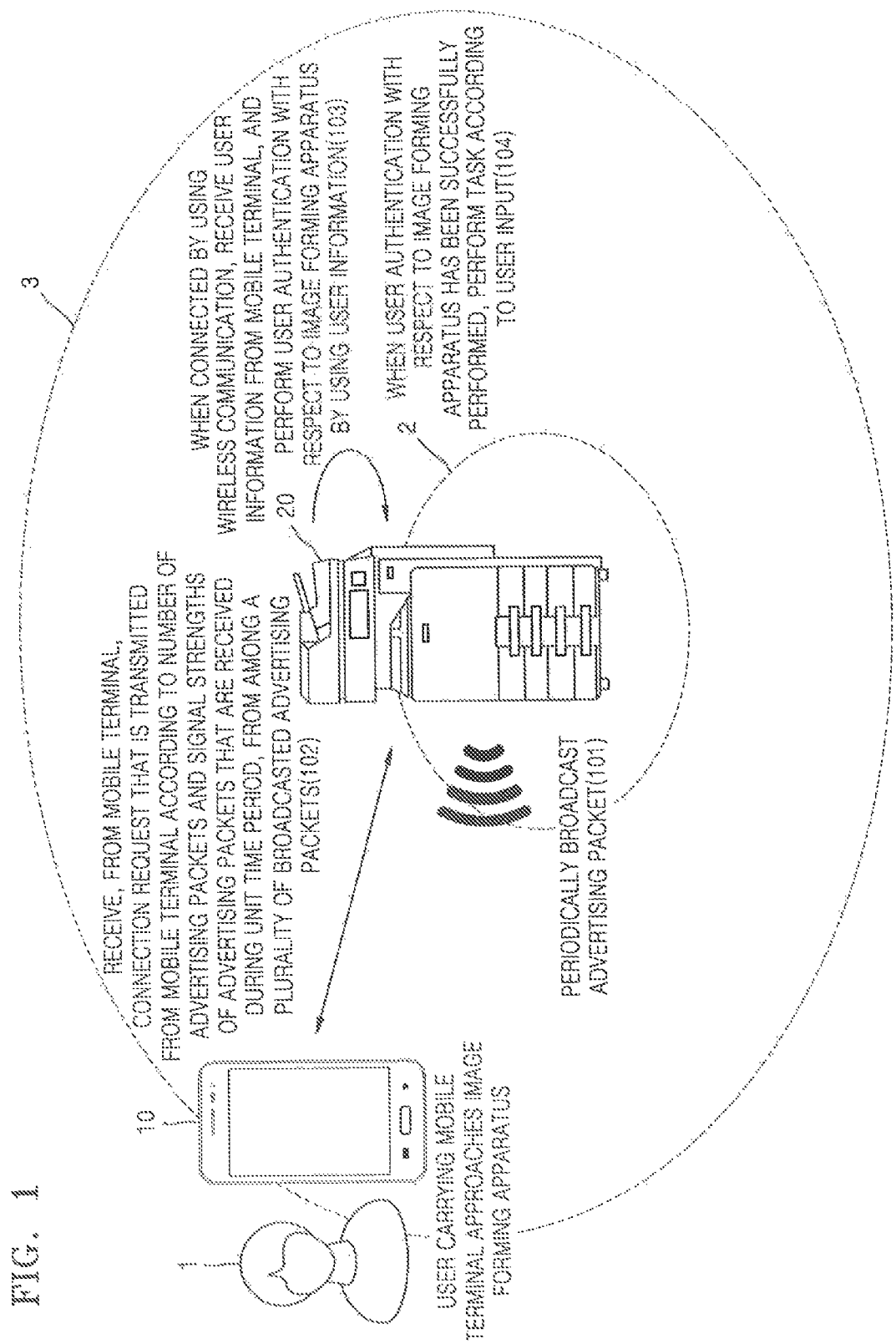
FIG. 1 illustrates an environment in which, when a user carrying a mobile terminal approaches an image forming apparatus, the mobile terminal connects to the image forming apparatus by using wireless communication and performs a task, according to an embodiment.

According to an embodiment, an operating method of an image forming apparatus includes broadcasting a plurality of packets including identification information of the image forming apparatus; receiving a connection request including the identification information of the image forming apparatus from a mobile terminal which received some packets from among the plurality of broadcasted packets; and connecting to the mobile terminal, based on the connection request, wherein the connection request is transmitted from the mobile terminal, according to the number of packets that are from among the some packets, that are received by the mobile terminal during a unit time period, and whose received signal strengths are equal to or greater than a first threshold value.

The operating method may further include connecting to the mobile terminal based on the received connection request, and receiving user information from the mobile terminal via the connecting; and performing user authentication with respect to the image forming apparatus, based on the user information.

The some packets may be sequentially received by the mobile terminal during the unit time period, and the connection request may be transmitted from the mobile terminal, based on whether the number of the packets that are from among the some packets, are received by the mobile terminal during the unit time period, and whose received signal strengths are equal to or greater than the first threshold value, is equal to or greater than a preset detecting count.

If the user authentication has been successfully performed, the operating method may further include unlocking a locked user interface and displaying the unlocked user interface.

The operating method may further include receiving a disconnection request from the mobile terminal; and disconnecting the connection according to the disconnection request, and changing the unlocked user interface to the locked user interface and displaying the locked user interface, wherein the disconnection request is transmitted from the mobile terminal, according to the number of packets that are from among the some packets, are received by the mobile terminal during the unit time period, and whose received signal strengths are less than the first threshold value.

The user information may include at least one selected from identification information of the mobile terminal and identification information of a user of the mobile terminal, and the performing of the user authentication may include determining whether the user information matches with user information stored in the image forming apparatus.

The user information may be previously input to the mobile terminal and may be stored in the mobile terminal.

First packets may indicate the plurality of broadcasted packets including the identification information of the image forming apparatus, and the operating method may further include, if the user authentication has been successfully performed, receiving a user input indicating a scan request for a document; when the user input indicating the scan request for the document is received, broadcasting a second packet including the user information; receiving a request for Wi-Fi or Wi-Fi Direct (WFD) connection information from the mobile terminal which received the second packet, and transmitting the Wi-Fi or WFD connection information to the mobile terminal; and generating image data of the document according to the user input, and transmitting the image data to the mobile terminal by using Wi-Fi or WFD communication, wherein the request for the Wi-Fi or WFD connection information is transmitted, by the mobile terminal, based on whether the user information included in the second packet matches with the user information of the mobile terminal.

According to another embodiment, an operating method of a mobile terminal includes receiving a plurality of packets including identification information of an image forming apparatus from the image forming apparatus; determining whether to transmit a connection request according to the number of packets that are from among the plurality of packets, that are received during a unit time period, and whose received signal strengths are equal to or greater than a first threshold value; and according to a result of the determining, transmitting the connection request to the image forming apparatus, and connecting to the image forming apparatus.

The operating method may further include determining whether to transmit a disconnection request according to the number of packets that are from among the plurality of packets, are received during the unit time period, and whose received signal strengths are less than the first threshold value; and transmitting, according to a result of the determining, the disconnection request to the image forming apparatus, and disconnecting the connection with the image forming apparatus.

The first threshold value may be a preset value, the packets from among the plurality of packets may be sequentially received during the unit time period, the determining may include determining to transmit the connection request when the received signal strengths of the packets from among the plurality of packets are equal to or greater than the first threshold value, and the number of the packets from among the plurality of packets is equal to or greater than a preset detecting count, and the unit time period and the preset detecting count may be preset according to a user input received from a user.

The operating method may further include determining whether to transmit a disconnection request according to the number of packets that are from among the plurality of packets, are received during the unit time period, and whose received signal strengths are less than the first threshold value; and transmitting, according to a result of the determining, the disconnection request to the image forming apparatus, and disconnecting the connection with the image forming apparatus.

The operating method may further include obtaining information about a status of the image forming apparatus from the plurality of packets, and displaying a notification indicating the information about the status of the image forming apparatus.

The operating method may further include receiving a user input of selecting the notification; after receiving the user input, receiving Wi-Fi or Wi-Fi Direct (WFD) connection information from the image forming apparatus by the connection with the image forming apparatus, and connecting to the image forming apparatus by using Wi-Fi or WFD communication; and receiving, from the image forming apparatus, detailed information about the status of the image forming apparatus by using the Wi-Fi or WFD communication, and displaying the detailed information about the status of the image forming apparatus.

According to another embodiment, a cloud print system includes a cloud server that receives, from a mobile terminal, a print request for content registered and mapped to identification information of the mobile terminal, and transmits the content to an image forming apparatus to perform an image forming job on the content, wherein the image forming apparatus is from among a plurality of image forming apparatuses that are registered and mapped to the identification information of the mobile terminal; and the image forming apparatus that receives the content from the cloud server and thus, performs the image forming job on the content, wherein the image forming apparatus broadcasts a plurality of packets including identification information of the image forming apparatus, the cloud server receives the identification information of the image forming apparatus and the print request for the content from the mobile terminal that received some packets from among the plurality of packets, determines, based on the identification information of the image forming apparatus, the image forming apparatus from among the plurality of image forming apparatuses that are registered and mapped to the identification information of the mobile terminal, and transmits the content to the image forming apparatus, and the mobile terminal transmits the print request for the content, according to the number of packets that are from among the some packets, are received by the mobile terminal during a unit time period, and whose received signal strengths are equal to or greater than a first threshold value.

According to another embodiment, an image forming apparatus includes a network interface for broadcasting a plurality of packets including identification information of the image forming apparatus; a user interface for providing a user interface that receives a user input; a task performer including a scan module, a fax module, and a print module; and a controller for controlling the network interface to receive a connection request including the identification information of the image forming apparatus from a mobile terminal which received some packets from among the plurality of broadcasted packets, and to connect to the mobile terminal, based on the connection request, wherein the connection request is transmitted from the mobile terminal, according to the number of packets that are from among the some packets, are received by the mobile terminal during a unit time period, and whose received signal strengths are equal to or greater than a first threshold value.

The controller may control the network interface to receive user information from the mobile terminal, and may perform user authentication with respect to the image forming apparatus, based on the user information.

First packets may indicate the plurality of broadcasted packets including the identification information of the image forming apparatus, the user interface may receive a user input indicating a scan request for a document, the network interface may include a first network interface that broadcasts the plurality of packets including the identification information of the image forming apparatus; and a second network interface that connects to an external device by using Wi-Fi or Wi-Fi Direct (WFD) communication, and the controller, when the user input indicating the scan request for the document is received, broadcasts a second advertisement packet including the user information, controls the first network interface to receive, via the connection with the image forming apparatus, a request for Wi-Fi or WFD connection information from the mobile terminal which received the second advertisement packet, and to transmit the Wi-Fi or WFD connection information to the mobile terminal, and controls the second network interface to transmit image data of the document to the mobile terminal by using Wi-Fi or WFD communication, wherein the image data is generated by the scan module according to the user input.

According to another embodiment, a mobile terminal includes a network interface for receiving a plurality of packets including identification information of an image forming apparatus; and a controller for determining whether to transmit a connection request according to the number of packets that are from among the plurality of packets, are received during a unit time period, and whose signal strengths are equal to or greater than a first threshold value, wherein the controller controls, according to a result of the determining, the network interface to transmit the connection request to the image forming, and to connect to the image forming apparatus.

The first threshold value may be a preset value, the packets from among the plurality of packets may be sequentially received during the unit time period, the controller may determine to transmit the connection request when the received signal strengths of the packets from among the plurality of packets are equal to or greater than the first threshold value, and the number of the packets from among the plurality of packets is equal to or greater than a preset detecting count, and the unit time period and the preset detecting count may be preset according to a user input received from a user.

The network interface may include a first network interface that receives the plurality of packets including the identification information of the image forming apparatus; and a second network interface that connects to an external device by using Wi-Fi or Wi-Fi Direct (WFD) communication, and wherein the mobile terminal further includes a user interface unit that displays a user interface and receives a user input via the user interface, and the controller controls the user interface unit to obtain information about a status of the image forming apparatus from the plurality of packets, to display a notification indicating the information about the status of the image forming apparatus, and to receive a user input of selecting the notification, and when the user input is received, the controller controls the second network interface to receive Wi-Fi or WFD connection information from the image forming apparatus using the connection with the image forming apparatus, to connect to the image forming apparatus by using Wi-Fi or WFD communication according to the Wi-Fi or WFD connection information, and to receive, from the image forming apparatus, detailed information about the status of the image forming apparatus by using the Wi-Fi or WFD communication, and controls the user interface unit to display the detailed information about the status of the image forming apparatus.

According to another embodiment, a recording medium may read recorded computer programs for executing the methods by using a computer.

MODE OF THE INVENTION

Reference will now be made in detail to embodiments, examples of which are illustrated in the accompanying drawings. In order to clearly describe features of the embodiments, detailed descriptions about functions or constructions that are well-known to one of ordinary skill in the art may be omitted.

FIG. 1 illustrates an environment in which, when a user carrying a mobile terminal approaches an image forming apparatus, the mobile terminal connects to the image forming apparatus by using wireless communication and performs a task, according to an embodiment.

Referring to FIG. 1, it is assumed that a user 1 carrying a mobile terminal 10 approaches an image forming apparatus 20.

In operation 101, the image forming apparatus 20 may periodically broadcast a packet (an advertising packet) so as to advertise an existence of an image forming apparatus. Here, the packet (the advertising packet) may include identification information of the image forming apparatus, e.g., a media access control address (MAC address) of the image forming apparatus. In addition, the packet (the advertising packet) may include a flag indicating a feature of the image forming apparatus. In particular, the flag indicating the feature of the image forming apparatus indicates a status in relation to a function of the image forming apparatus, which is provided via wireless connection with the mobile terminal. For example, the flag indicating the feature of the image forming apparatus may include a flag indicating whether the image forming apparatus requires user authentication, whether the image forming apparatus is ready for pull printing, or whether the image forming apparatus is ready for a scan task. Also, the packet (the advertising packet) may include an internet protocol (AP) address of the image forming apparatus, status information of the image forming apparatus that indicates a status such as an error that occurred in the image forming apparatus, information of a toner mounted in the image forming apparatus, and a phone number of a mobile terminal to which image data is to be transmitted, wherein the image data is generated by scanning a document (hereinafter, the status information may also be referred to as the information about the status). The broadcasted advertising packet may be a message that conforms to the Bluetooth Low Energy (BLE) standard.

It is assumed that the user 1 carrying the mobile terminal 10 is located outside an area 3 and thus it is too distant for the user to manipulate the image forming apparatus 20.

The mobile terminal 10 receives the packet (the advertising packet) that is periodically broadcasted from the image forming apparatus 20. Here, the image forming apparatus 20 may not receive just one packet (one advertising packet) but may receive a plurality of packets (advertising packets) during a unit time period. The mobile terminal 10 determines whether to transmit a connection request, according to the number of packets (advertising packets) and/or signal strengths of the packets (the advertising packets) that are received by the mobile terminal 10 during the unit time period.

Since the user 1 is located outside the area 3 and thus it is too distant for the user to manipulate the image forming apparatus 20, the number of the packets (the advertising packets) received during the unit time period may be small, and the signal strengths of the received packets (the advertising packets) may be small. Thus, the mobile terminal 10 may determine not to transmit the connection request to the image forming apparatus 20 by using the wireless communication.

It is assumed that the user 1 carrying the mobile terminal 10 approaches the image forming apparatus 20 and is located in an area 2 and thus it is close enough for the user to manipulate the image forming apparatus 20.

The mobile terminal 10 receives a packet (an advertising packet) that is periodically broadcasted from the image forming apparatus 20. In this regard, the image forming apparatus 20 may not receive just one packet (one advertising packet) but may receive a plurality of packets (advertising packets) during the unit time period. The mobile terminal 10 determines whether to transmit a connection request, according to the number and signal strengths of packets (advertising packets) that are received by the mobile terminal 10 during the unit time period. Since the user 1 is located in the area 2 and thus it is close enough for the user to manipulate the image forming apparatus 20, the number of the packets (the advertising packets) received during the unit time period may be large, and the signal strengths of the received packets (the advertising packets) may be high. Thus, the mobile terminal 10 may determine to transmit the connection request to the image forming apparatus 20.

In operation 102, the image forming apparatus 20 receives the connection request that was transmitted from the mobile terminal 10 according to the number of packets (advertising packets) and/or signal strengths of the packets (the advertising packets) that are received during the unit time period, from among the plurality of broadcasted packets (advertising packets). Based on the received connection request, the image forming apparatus 20 may connect to the mobile terminal 10 by using wireless communication. For example, after the image forming apparatus 20 broadcasts the packet (the advertising packets) including messages that conform to the BLE standard, the image forming apparatus 20 may receive, from the mobile terminal 10, the connection request that was transmitted from the mobile terminal 10 according to the signal strengths of the packets (the advertising packets) that are received during the unit time period and are from among the plurality of broadcasted packets (advertising packets), and may connect to the mobile terminal 10, based on the received connection request. For example, the image forming apparatus 20 may connect to the mobile terminal 10 by using BLE communication, based on the received connection request.

In operation 103, when the image forming apparatus 20 is connected to the mobile terminal 10 by using the wireless communication, the image forming apparatus 20 may receive user information about the user 1 of the mobile terminal 10 from the mobile terminal 10, and may perform user authentication with respect to the image forming apparatus 20 by using the user information.

When the user 1 attempts to perform a task by using the image forming apparatus 20, the image forming apparatus 20 requires the user authentication, and in this regard, the user information may indicate identification information that is transmitted from the mobile terminal 10 to the image forming apparatus 20 for the user authentication, and may include identification information of mobile terminal 10, such as a serial number, a phone number, etc., of the mobile terminal 10. Also, the user information may include user identification information such as user identification (ID) and a password that were previously input to the mobile terminal 10 by the user 1.

In more detail, the image forming apparatus 20 already registered user information, compares the registered user information with the user information about the mobile terminal 10 that is received from the mobile terminal 10, and determines whether the registered user information matches with the user information. If they are matched, the user authentication with respect to the image forming apparatus 20 succeeds, and if they are not matched, the user authentication with respect to the image forming apparatus 20 fails.

A domain of the user authentication with respect to the image forming apparatus 20 is a local domain. That is, the user authentication with respect to the image forming apparatus 20 is performed by using the registered user information stored in the image forming apparatus 20, but one or more embodiments are not limited thereto, and the domain of the user authentication may be a network domain. In this case, the image forming apparatus 20 may not use the registered user information stored in the image forming apparatus 20 but may transmit the received user information to a network-connected device such as a server, and the server may perform the user authentication with respect to the image forming apparatus 20 by using user information stored in the server. Here, the server may transmit, to the image forming apparatus 20, a message including a result of the user authentication with respect to the image forming apparatus 20, and the image forming apparatus 20 may receive the message including the result of the user authentication with respect to the image forming apparatus 20 and may determine whether the user authentication with respect to the image forming apparatus 20 has been successfully performed.

In operation 104, if the user authentication with respect to the image forming apparatus 20 has been successfully performed, the image forming apparatus 20 may perform a task according to a user input. For example, if the user authentication with respect to the image forming apparatus 20 has been successfully performed, the image forming apparatus 20 may provide a user interface for receiving a user input, the user 1 may input the user input via the user interface provided by the image forming apparatus 20, and according to the user input, the image forming apparatus 20 may perform various tasks including a print task, a scan task, a fax task, or the like.

If the user information is the phone number of the mobile terminal 10, the image forming apparatus 20 may obtain the phone number of the mobile terminal 10 from the mobile terminal 10, and may perform user authentication with respect to the image forming apparatus 20, based on the obtained phone number of the mobile terminal 10. If the user authentication has been successfully performed, the image forming apparatus 20 may provide the user 1 with a user interface for receiving a user input for performing a task of transmitting image data to the mobile terminal 10, when the user inputs, via the user interface, the user input indicating that the image forming apparatus 20 performs the task of transmitting the image data to the mobile terminal 10, the image forming apparatus 20 may perform a scan task on a document, and may transmit, to the mobile terminal 10, the image data that is generated as a result of the scan task.

According to the present embodiment, when the user 1 carrying the mobile terminal 10 approaches the image forming apparatus 20, the image forming apparatus 20 performs the user authentication with respect to the image forming apparatus 20. If the user authentication with respect to the image forming apparatus 20 has been successfully performed, the image forming apparatus 20 may unlock the locked user interface and may display the user interface, may receive the user input from the user 1 via the unlocked user interface, and may perform the task such as the print task, the scan task, or the fax task with respect to the image forming apparatus 20.

If the user authentication with respect to the image forming apparatus 20 has been successfully performed, the image forming apparatus 20 provides the user interface so that the user input of performing the task of transmitting the image data to the mobile terminal 10 is received. When the user 1 inputs, via the user interface, the user input indicating that the image forming apparatus 20 performs the task of transmitting the image data to the mobile terminal 10, the image forming apparatus 20 may scan the document and may transmit, to the mobile terminal 10, the image data that is generated as the result of the scan task.

If the user authentication with respect to the image forming apparatus 20 has been successfully performed, the mobile terminal 10 may receive a user input of performing a task of printing stored content, and may transmit the stored content to the image forming apparatus 20. The image forming apparatus 20 may receive the content from the mobile terminal 10, and may perform an image forming task on the content.

If the user authentication with respect to the image forming apparatus 20 has been successfully performed, the image forming apparatus 20 may perform a task of transmitting status information of the image forming apparatus 20 to the mobile terminal 10, and the mobile terminal 10 may display the status information of the image forming apparatus 20 in the form of a notification to the user 1. When the mobile terminal 10 receives a user input of selecting the notification, the image forming apparatus 20 may perform a task of transmitting detailed status information of the image forming apparatus 20 to the mobile terminal 10, and the mobile terminal 10 may receive and may display the detailed status information of the image forming apparatus 20.

However, one or more embodiments are not limited thereto, and if the user authentication with respect to the image forming apparatus 20 has been successfully performed, the image forming apparatus 20 may perform various tasks according to user inputs. The various tasks performed by the image forming apparatus 20 will be described in detail below.

In the present embodiment, when the image forming apparatus 20 is connected to the mobile terminal 10, the image forming apparatus 20 receives the user information from the mobile terminal 10, performs the user authentication with respect to the image forming apparatus 20 by using the user information, and performs the various tasks based on a result of the user authentication. However, one or more embodiments are not limited thereto, and if the image forming apparatus 20 is connected to the mobile terminal 10, the image forming apparatus 20 may perform the various tasks, without performing the user authentication.

Figure 2:
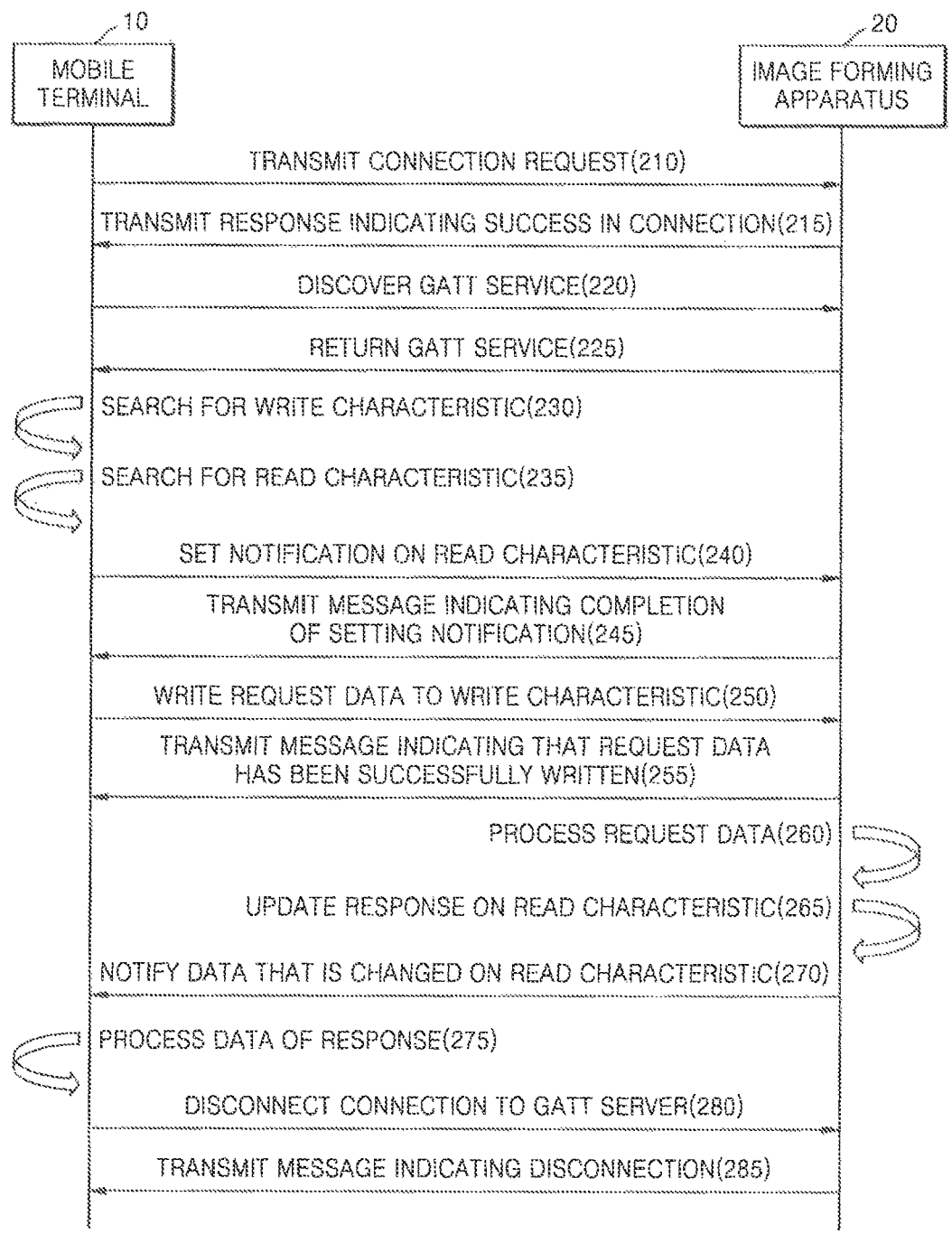
FIG. 2 illustrates a procedure in which, when the mobile terminal is connected to the image forming apparatus by using Bluetooth Low Energy (BLE) communication, the mobile terminal transmits a request to the image forming apparatus or receives a response from the image forming apparatus, according to an embodiment.

FIG. 2 illustrates a procedure in which, when a mobile terminal is connected to an image forming apparatus by using BLE communication, the mobile terminal transmits a request to the image forming apparatus or receives a response from the image forming apparatus, according to an embodiment.

The image forming apparatus 20 has a BLE profile having two characteristics. In more detail, the image forming apparatus 20 has a BLE profile having a write characteristic for allowing the mobile terminal 10 to write a request, and a read characteristic for allowing the mobile terminal 10 to read a response of the image forming apparatus 20. The mobile terminal 10 may request the image forming apparatus 20 for a predefined command by using the BLE profile. For example, if the mobile terminal 10 requests the image forming apparatus 20 for an authentication command, the mobile terminal 10 may write the authentication command with information including a user 1D and an encrypted password to the write characteristic of the BLE profile. The image forming apparatus 20 may perform user authentication with respect to the image forming apparatus 20, based on the authentication command, and may update a result of the user authentication to the read characteristic of the BLE profile, and then the mobile terminal 10 may obtain the result of the user authentication from the read characteristic of the BLE profile. Hereinafter, with reference to FIG. 2, a procedure in which the mobile terminal 10 transmits a request to the image forming apparatus 20 by using the BLE communication, and receives a response from the image forming apparatus 20 will now be described in detail.

Referring to FIG. 2, in operation 210, the mobile terminal 10 transmits a connection request to the image forming apparatus 20 by using the BLE communication. The image forming apparatus 20 receives the connection request from the mobile terminal 10, and based on the connection request, connects to the mobile terminal 10. In operation 215, when the connection to the mobile terminal 10 is established, the image forming apparatus 20 transmits, as a response to the connection request, a message indicating success in the connection to the mobile terminal 10.

In operation 220, the mobile terminal 10 transmits a discover request for a Generic Attribute Profile (GATT) service to the image forming apparatus 20.

In operation 225, when the image forming apparatus 20 receives the discover request for the GATT service from the mobile terminal 10, the image forming apparatus 20 returns the GATT service to the mobile terminal 10.

In operation 230, the mobile terminal 10 searches for a write characteristic, and the mobile terminal 10 searches for a read characteristic from the returned GATT service.

In operation 235, the mobile terminal 10 sets a notification to the read characteristic. When data of the read characteristic is changed at a later time, the changed data may be notified to the mobile terminal 10.

In operation 240, the image forming apparatus 20 may transmit a message indicating completion of setting the notification on the mobile terminal 10.

In operation 250, the mobile terminal 10 may write request data to the write characteristic. In the present embodiment, the mobile terminal 10 may include user information and a user authentication request in the request data. However, one or more embodiments are not limited thereto, and the mobile terminal 10 may include various requests in the request data and may transmit the request data.

In operation 255, if the request data has been successfully written to the write characteristic, the image forming apparatus 20 may transmit, to the mobile terminal 10, a message indicating that the request data has been successfully written.

In operation 260, the image forming apparatus 20 processes a request included in the request data that has been written to the write characteristic by the mobile terminal 10. In operation 265, after the image forming apparatus 20 processes the request, the image forming apparatus 20 may update a response to the request on the read characteristic.

In operation 270, the image forming apparatus 20 may notify the mobile terminal 10 of data that is changed on the read characteristic. For example, if the mobile terminal 10 writes data including a request for Wi-Fi or Wi-Fi Direct (WFD) connection information to the write characteristic, the image forming apparatus 20 processes the request for the Wi-Fi or WFD connection information, updates a response including the Wi-Fi or WFD connection information to the read characteristic, and notifies the mobile terminal 10 of data (the response including the Wi-Fi or WFD connection information) that is changed on the read characteristic.

In operation 275, the mobile terminal 10 may process data of the response that is notified by the image forming apparatus 20.

In operation 280, the mobile terminal 10 requests the image forming apparatus 20 to disconnect the connection to a GATT server (that is, the image forming apparatus 20).

In operation 285, if the connection to the image forming apparatus 20 is disconnected according to a disconnection request by the mobile terminal 10, the image forming apparatus 20 may transmit, to the mobile terminal 10, a message indicating the disconnection.

Figure 3:
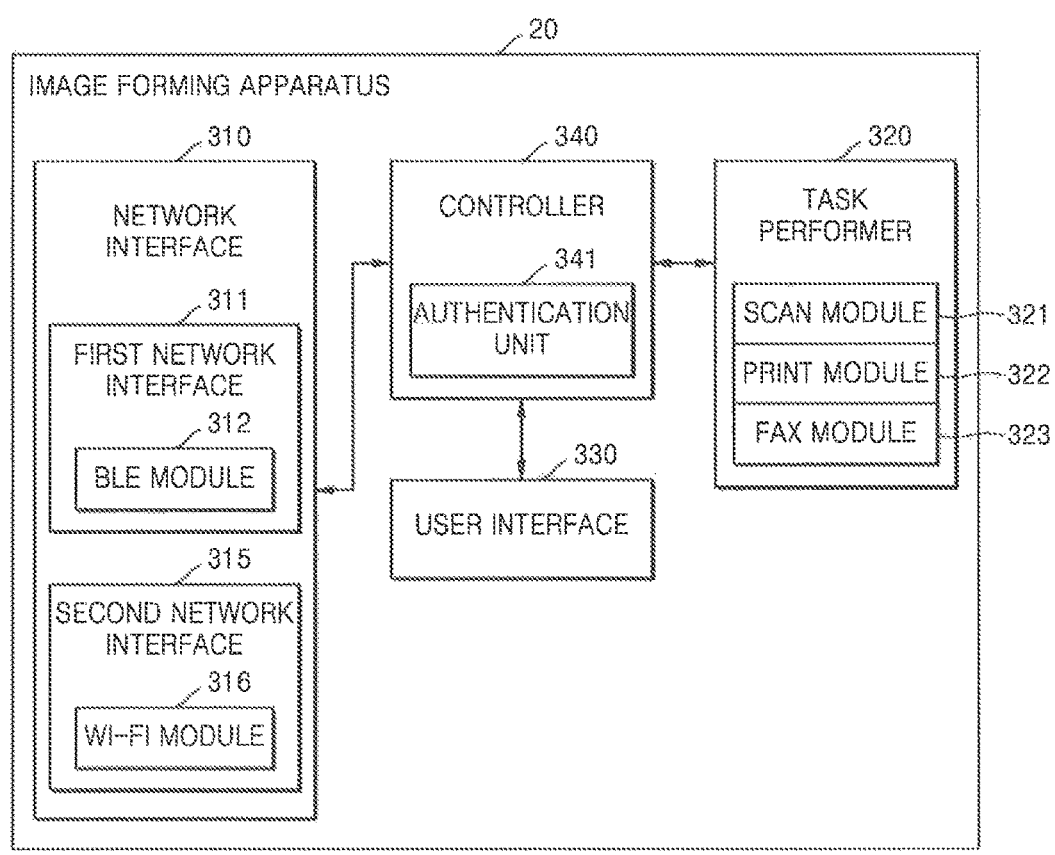
FIG. 3 is a block diagram of the image forming apparatus, according to an embodiment.

FIG. 3 is a block diagram of an image forming apparatus, according to an embodiment.

Referring to FIG. 3, the image forming apparatus 20 may include a network interface 310, a task performer 320, a user interface 330, and a controller 340.

The network interface 310 broadcasts a plurality of packets (advertising packets) including identification information of the image forming apparatus 20. In more detail, the network interface 310 may periodically broadcast a packet (an advertising packet) including identification information of the image forming apparatus 20. Here, the packet (the advertising packet) may further include status information of the image forming apparatus. Also, status information of the image forming apparatus may include information indicating whether user authentication is available in the image forming apparatus. For example, information indicating whether the user authentication is activated in the image forming apparatus may be included. The status information of the image forming apparatus may include information indicating whether the user authentication is limited in the image forming apparatus.

When the network interface 310 receives a connection request from the mobile terminal 10, the network interface 310 may connect the image forming apparatus 20 to the mobile terminal 10 by using wireless communication, and when the network interface 310 receives a request command from the mobile terminal 10, the network interface 310 may transmit a response to the request command to the mobile terminal 10 by using the wireless communication.

The network interface 310 may include a first network interface 311 and a second network interface 315. The first network interface 311 broadcasts the plurality of packets (advertising packets) including the identification information of the image forming apparatus 20. In more detail, the first network interface 311 may periodically broadcast the packet (the advertising packet) including the identification information of the image forming apparatus 20. When the first network interface 311 receives the connection request from the mobile terminal 10, the first network interface 311 may connect the image forming apparatus 20 to the mobile terminal 10 by using wireless communication, and when the first network interface 311 receives the request command from the mobile terminal 10, the first network interface 311 may transmit the response to the request command to the mobile terminal 10 by using the wireless communication.

The second network interface 315 connects the image forming apparatus 20 to the mobile terminal 10 by using another wireless communication other than the wireless communication used by the first network interface 311. The second network interface 315 may transmit and receive scan data or print data.

For example, the first network interface 311 may include a BLE module 312, and the second network interface 315 may include a Wi-Fi module 316. The BLE module 312 requires small power consumption but has a slow data transmission speed, thus, the BLE module 312 may be used in transmitting and receiving information having a small amount of data. The Wi-Fi module 316 has a data transmission speed faster than that of the BLE module 312, thus, the Wi-Fi module 316 may be used in transmitting and receiving information having large data such as the scan data or the print data.

The task performer 320 may perform various tasks including a print task, a scan task, a fax task, or the like. In more detail, the task performer 320 may include a scan module 321, a print module 322, and a fax module 323. The scan module 321 may perform the scan task on a document and may generate image data that is generated as a result of the scan task. The print module 322 may perform an image forming task on the print data. The print module 322 may print the print data. The fax module 323 transmits and receives image data via a public switched telephone network (PSTN).

The user interface 330 may receive a user input from a user. The user interface 330 may provide a user interface for receiving the user input. For example, the user interface 330 may display the user interface. In more detail, the user interface 330 may be formed as a panel for receiving the user input. For example, the user interface 330 may be formed as a screen display, a 2-line liquid crystal display (LCD), a 4-line LCD, a light-emitting diode (LED) display, or the like that may provide a graphical user interface.

The controller 340 may control operations of elements included in the image forming apparatus. The controller 340 may control the network interface 310 to receive a connection request from the mobile terminal 10, wherein the connection request was transmitted according to the number of packets (advertising packets) and/or signal strengths of the packets (the advertising packets) that are received by the mobile terminal 10 during a unit time period, from among the plurality of broadcasted packets (advertising packets). The controller 340 may control the network interface 310 to connect the image forming apparatus 20 to the mobile terminal 10, based on the received connection request. The controller 340 may control the network interface 310 to receive user information of the mobile terminal 10 from the mobile terminal 10. The controller 340 may include an authentication unit 341. The authentication unit 341 may perform user authentication with respect to the image forming apparatus 20, based on the user information. The user information may include a Unique ID (UID) corresponding to the mobile terminal. The controller 340 may control the user interface 330 to display a screen for receiving a user input including a passcode based on the Unique ID (UID).

The controller 340 may control the user interlace 330 to receive, based on the displayed screen, the user input including the passcode. The authentication unit 341 may perform the user authentication with respect to the image forming apparatus by using the passcode included in the received user input.

If the user authentication has been successfully performed, the controller 340 may control the task performer 320 to perform a task. The controller 340 may control the user authentication with respect to the image forming apparatus 20 to be performed based on the user information, and if the user authentication has been successfully performed, the controller 340 may control the user interface 330 to unlock the locked user interface and to display the unlocked user interface. Also, the controller 340 may control the network interface 310 to receive a disconnection request from the mobile terminal 10 and to disconnect the connection between the mobile terminal 10 and the image forming apparatus 20 based on the disconnection request, wherein the disconnection request was transmitted according to the number of packets (advertising packets) and signal strengths of the packets (the advertising packets) that are received by the mobile terminal 10 during a unit time period, from among a plurality of broadcasted packets (advertising packets). The controller 340 may control the user interface 330 to change a status of the unlocked user interface into a lock status and to display the locked user interface. The disconnection request may include a logout request with respect to the authenticated user. The controller 340 may perform a logout with respect to the authenticated user, based on the logout request. After the controller 340 performs the logout with respect to the authenticated user, the controller 340 may control a packet (an advertising packet), which is generated to be broadcasted, to include the status information of the image forming apparatus which indicates whether the user authentication is available. After the controller 340 performs the logout, during a preset time period, the controller 340 may control the packet (the advertising packet) to include the status information of the image forming apparatus which indicates whether the user authentication is available. For example, when the logout with respect to the authenticated user is performed, the controller 340 may control a packet (an advertising packet) to include the status information of the image forming apparatus which indicates user authentication with respect to the authenticated user is limited, wherein the packet is broadcasted during the preset time period. In addition, when a user who is authenticated according to user authentication with respect to the image forming apparatus is logged-in, the controller 340 may control the network interface 310 to transmit a packet (an advertising packet) including status information of the image forming apparatus which indicates that user authentication with respect to the image forming apparatus is limited.

When a user input indicating a scan request for a document is received via the user interface 330, the controller 340 may control the first network interface 311 to broadcast the user information. The controller 340 may control the first network interface 311 to receive, from the mobile terminal 10, a request for Wi-Fi or WFD connection information that is determined based on whether the user information that was broadcasted to the mobile terminal 10 matches with the user information of the mobile terminal 10.

The controller 340 may control the first network interface 311 to transmit the Wi-Fi or WFD connection information to the mobile terminal 10, in response to the request for Wi-Fi or WFD connection information. In this regard, the Wi-Fi connection information may be IP address information of the image forming apparatus 20, and the WFD connection information may be MAC address information and personal identification number (PIN) information of the image forming apparatus 20.

The controller 340 may control the second network interface 315 to transmit the image data to the mobile terminal 10 by using Wi-Fi or WFD) communication, wherein the image data of the document was generated by the scan module 321 according to the user input.

The controller 340 may control the user interface 330 to display message regarding a result of performing user authentication when performing user authentication with the image forming apparatus.

The controller 340 may determine communication module which is available to perform user authentication among supportable communication modules in the image forming apparatus and may control the user interface 330 to display different login screen according to the determined communication module. The controller 340 may control the network interface 310 to broadcast a plurality of advertising packets including identification information when the determined communication module is BLE module. Here, communication module which is available to perform user authentication includes at least one of NFC(Near Field Communication) module and BLE(Bluetooth Low Energy) module.

The controller 340 may control the network interface 310 to receive, from the mobile terminal, a logout request with respect to the user who is authenticated with respect to the image forming apparatus. The logout request may have been transmitted from the mobile terminal, based on the number of packets (advertising packets) during a unit time period which are from among some packets (adverting packets) received by the mobile terminal and whose received signal strengths are equal to or less than a first threshold value.

The controller 340 may determine that user authentication with respect to the user is limited during a predetermined time period, according to the logout request.

The controller 340 may control the user interface 330 to receive a user input indicating a logout with respect to the authenticated user is performed. The controller 340 may perform the logout with respect to the authenticated user, based on the received user input. In addition, after the controller 340 performs the logout with respect to the authenticated user, the controller 340 may determine that authentication with respect to the user is limited during a predetermined time period.

The controller 340 may control the network interface 310 to receive a scan request from the mobile terminal 10. In response to the received scan request, the controller 340 may control the network interface 310 to transmit, to the mobile terminal 10, a response including a Universally Unique Identifier (UUID) with respect to a predetermined application of the mobile terminal.

Figure 4:
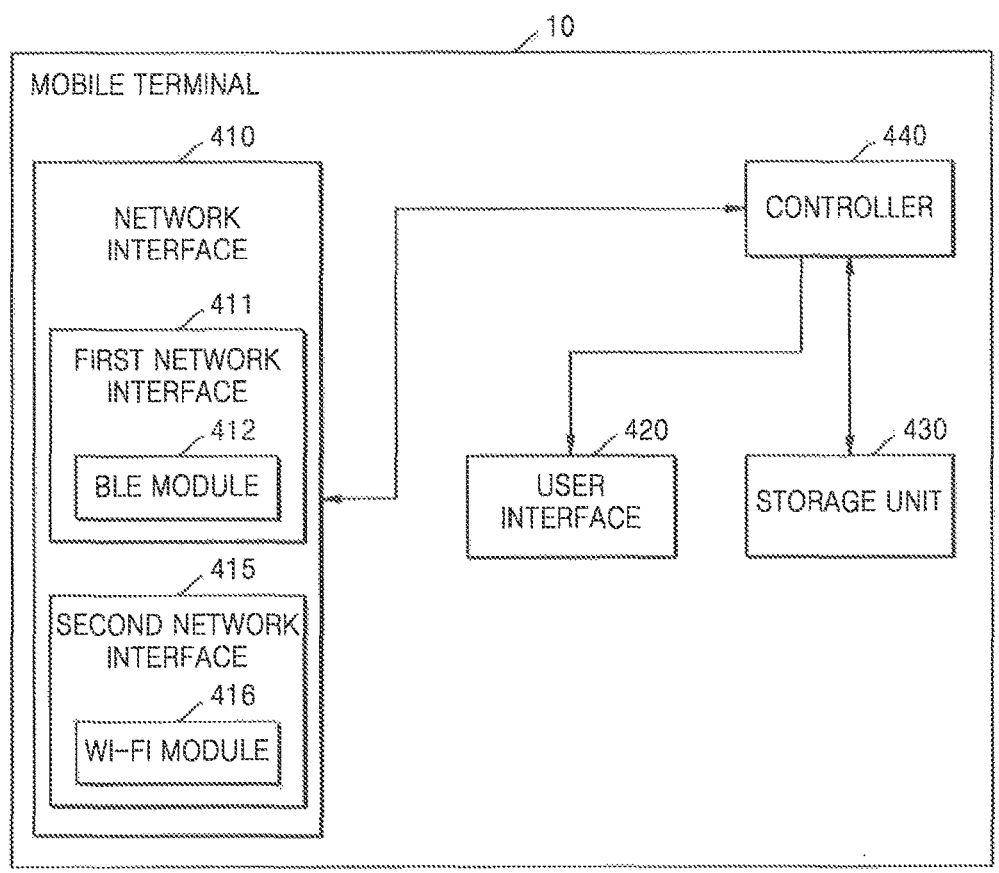
FIG. 4 is a block diagram of the mobile terminal, according to an embodiment.

FIG. 4 is a block diagram of the mobile terminal 10, according to an embodiment.

Referring to FIG. 4, the mobile terminal 10 may include a network interface 410, a user interface 420, a storage unit 430, and a controller 440.

The network interface 410 receives a plurality of packets (advertising packets) including identification information of the image forming apparatus 20 that are broadcasted from the image forming apparatus 20.

The network interface 410 may include a first network interface 411 and a second network interface 415. The first network interface 411 receives, from the image forming apparatus 20, the plurality of packets (the advertising packets) including the identification information of the image forming apparatus 20. The first network interface 411 may transmit, to the image forming apparatus 20, a connection request including the identification information of the image forming apparatus 20. The first network interface 411 may connect the mobile terminal 10 to the image forming apparatus 20 by using wireless communication, and if a request command is transmitted to the image forming apparatus 20, the first network interface 411 may receive a response to the request command by using the wireless communication.

The second network interface 415 connects the mobile terminal 10 to the image forming apparatus 20 by using another wireless communication other than the wireless communication used by the first network interface 411. The second network interface 415 may transmit and receive a large amount of data such as scan data or print data.

For example, the first network interface 411 may include a BLE module 412, and the second network interface 415 may include a Wi-Fi module 416. The BLE module 412 requires small power consumption but has a slow data transmission speed, thus, the BLE module 412 may be used in transmitting and receiving information having a small amount of data. The Wi-Fi module 416 has a data transmission speed faster than that of the BLE module 412, thus, the Wi-Fi module 416 may be used in transmitting and receiving information having large data such as the scan data or the print data.

The user interface 420 may display a user interface and may receive a user input via the displayed user interface.

The storage unit 430 stores a preset time, a preset received signal strength indicator (RSSI) value, and the preset number of advertising packets. The storage unit 430 may also store user information such as a user ID and a password. The storage unit 430 may store a plurality of pieces of identification information of various image forming apparatuses 20. In particular, the storage unit 430 may store a plurality of pieces of capability information that are mapped to correspond to the plurality of pieces of identification information of the various image forming apparatuses 20. The storage unit 430 may also store content to be printed and image data.

The controller 440 may control operations of elements included the mobile terminal 10. The controller 440 may determine whether to transmit a connection request, according to the number of packets (advertising packets) and/or signal strengths of the packets (the advertising packets) that are received during a unit time period. According to a result of the determination, the controller 440 may control the network interface 410 to transmit the connection request to the image forming apparatus 20 and to connect the mobile terminal 10 to the image forming apparatus 20.

If the number of packets (advertising packets), from among the received packets (the received advertising packets), whose signal strengths are equal to or greater than the preset RSSI value is equal to or greater than the preset number of packets (advertising packets), the controller 440 may control the network interface 410 to transmit the connection request to the image forming apparatus 20.

In addition, the controller 440 may control the preset time, the preset RSSI value, and the preset detecting count to be preset according to a user input received via the user interface 420 and may control the storage unit 430 to store the preset time, the preset RSSI value, and the preset detecting count.

The controller 440 may determine whether to transmit a disconnection request, based on the number of packets (advertising packets) and/or the signal strengths of the packets (the advertising packets) that are received during a unit time period by the network interface 410. According to a result of the determining whether to transmit the disconnection request, the controller 440 may control the network interface 410 to transmit the disconnection request to the image forming apparatus 20.

The controller 440 may control the user interface 420 to obtain status information of the image forming apparatus 20 from the packets (the advertising packets) received via the network interface 410 and to display a notification indicating the status information of the image forming apparatus 20.

The controller 440 may control the user interface 420 to receive a user input of selecting the notification, and the user input is received, the controller 440 may control the network interlace 410 to request and to receive Wi-Fi or WFD connection information from the image forming apparatus 20 and then to connect the mobile terminal 10 to the image forming apparatus 20 by using Wi-Fi or WFD communication.

The controller 440 may control the network interface 410 to receive detailed information about the status of the image forming apparatus 20 from the image forming apparatus 20 by using Wi-Fi or WFD communication, and may control the user interface 420 to display the received detailed information about the status of the image forming apparatus 20.

The controller 440 may control the network interface 410 to obtain identification information of the image forming apparatus 20 from the packets (the advertising packets) received via the network interface 410, to check whether the obtained identification information of the image forming apparatus 20 matches with identification information of the image forming apparatus 20 stored in the storage unit 430, if matched, to obtain, from the storage unit 430, Wi-Fi or WFD connection information of the image forming apparatus 20 that is mapped to correspond to the identification information, and to transmit the connection request to the image forming apparatus 20 by using the obtained Wi-Fi or WFD connection information. The controller 440 may control the user interface 420 to receive a user input of selecting content and may control the network interface 410 to transmit the selected content to the image forming apparatus 20.

The controller 440 may control the network interface 410 to transmit the user information to the image forming apparatus 20.

The controller 440 may control the user interface 420 to display a message for receiving a user input, based on whether the connection request has been transmitted. The controller 440 may control the user interface 420 to receive the user input, based on the displayed message. The controller 440 may control the network interface 410 to transmit the connection request to the image forming apparatus 20, based on the user input received by the user interface 420.

The controller 440 may determine a status of an image forming apparatus, based on status information of the image forming apparatus which is included in a packet (an advertising packet), and may control the network interface 41 to transmit a connection request, according to the determined status of the image forming apparatus.

When connected to the image forming apparatus, the controller 440 may control received identification information of the image forming apparatus to be stored, and when a logout with respect to an authenticated user is performed in the image forming apparatus, and connection to the image forming apparatus is disconnected, the controller 440 may control the network interface 410 to limit connection to the image forming apparatus, based on the stored identification information of the image forming apparatus.

Figure 5A:
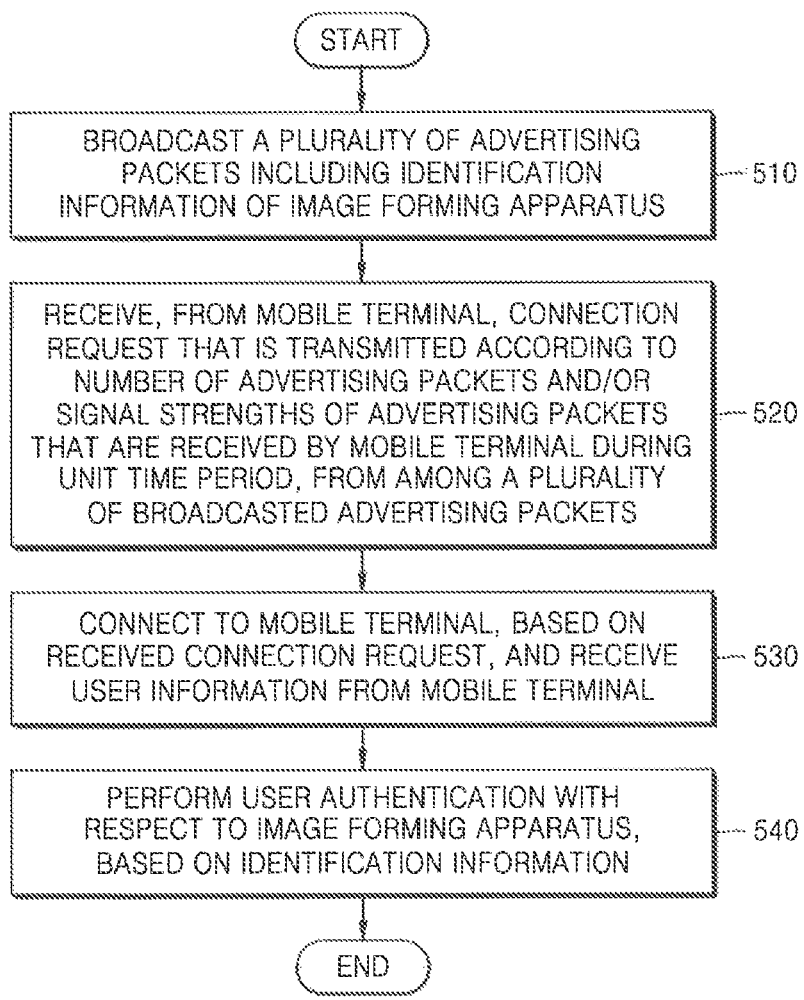
FIG. 5A is a flowchart of a method of performing an operation, the method performed by the image forming apparatus, according to an embodiment.

FIG. 5A is a flowchart illustrating a method of performing an operation, the method performed by the image forming apparatus, according to an embodiment.

Referring to FIG. 5A, in operation 510, the image forming apparatus 20 may broadcast a plurality of packets (advertising packets) including identification information of the image forming apparatus.

In operation 520, the image forming apparatus 20 may receive, from the mobile terminal 10, a connection request that is transmitted according to the number of packets (advertising packets) and/or signal strengths of the packets (the advertising packets) that are received by the mobile terminal 10 during a unit time period and are from among the broadcasted packets (the broadcasted advertising packets). For example, the mobile terminal 10 may transmit the connection request, according to the number of packets (advertising packets) that are received by the mobile terminal 10 during the unit time period and whose signal strengths are equal to or greater than a first threshold value. The first threshold value may be a value predetermined by performing calibration between the image forming apparatus 20 and the mobile terminal 10. Here, since a strength of a received signal may vary in each of mobile terminals under a same condition, the calibration may mean that a preset value is determined by measuring at least once the strength of the received signal of a packet (an advertising packet) of the image forming apparatus 20 by actually using the mobile terminal 10. In more detail, the first threshold value may be a value predetermined by performing the calibration between the image forming apparatus 20 and the mobile terminal 10 while the mobile terminal 10 is distant from the image forming apparatus 20 by a preset distance. In addition, the first threshold value may be predetermined according to Equation 1 below.

$$Th_{rssi} = -10*N*\log(d) + A \quad \text{[Equation 1]}$$

where, $Th_{rssi}$ may mean a first threshold value (e.g., a unit is dBm) with respect to an RSSI, N may mean a variance that varies according to a local geometry (e.g., when the local geometry is a free space, N=2), d may mean a distance from a transmitting apparatus (e.g., a unit is m), and A may mean an RSSI value (this may vary according to a power of a packet transmitted from the transmitting apparatus or a receiving sensitivity of a receiving apparatus) when it is distant from the transmitting apparatus (e.g., an image forming apparatus) by a unit distance (e.g., a unit is m). For example, when the local geometry is the free space, in a place distant from the transmitting apparatus by 0.5 m, when it is −59 [dBm] when it is distant from the transmitting apparatus by 1 m, $Th_{rssi}$ may be −53 [dBm].

A $Th_{rssi}$ value may not be limited in being determined according to the Equation 1 but also may be determined by adding a preset value to or subtracting the preset value from a value determined according to an equation. Also, it is obvious to one of ordinary skill in the art that $Th_{rssi}$ may be predetermined according to various methods by taking into account factors such as a distance from the transmitting apparatus, a local geometry, a transmitting power of a packet transmitted from the transmitting apparatus, or the like.

In operation 530, the image forming apparatus 20 may connect to the mobile terminal 10, based on the connection request received from the mobile terminal 10, and may receive user information from the mobile terminal 10.

In operation 540, the image forming apparatus 20 may perform user authentication with respect to the image forming apparatus 20, based on the user information.

Figure 5B:
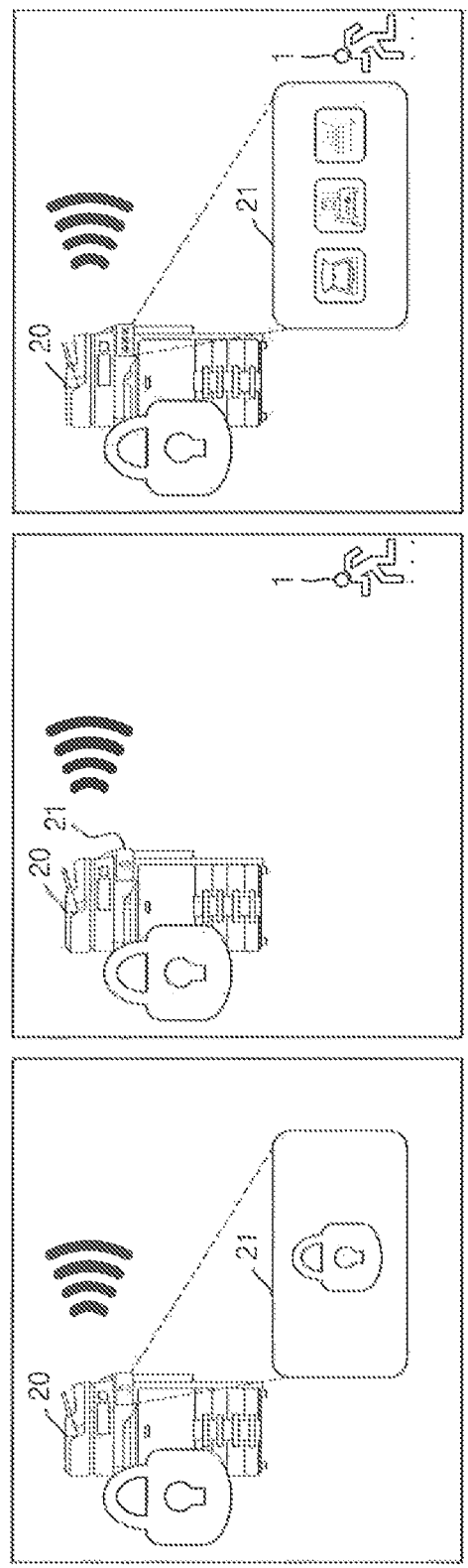
FIG. 5B illustrates a procedure in which, when a user carrying the mobile terminal approaches the image forming apparatus, the image forming apparatus changes and displays a user interface of the image forming apparatus, according to an embodiment.

FIG. 5B illustrates a procedure in which, when a user 1 carrying the mobile terminal 10 approaches the image forming apparatus 20, the image forming apparatus 20 changes a user interface of the image forming apparatus 20 and displays the user interface, according to an embodiment.

A left diagram of FIG. 5B illustrates a user interface 21 of the image forming apparatus 20 when the user 1 carrying the mobile terminal 10 is not in a range of the image forming apparatus 20. Since the user 1 carrying the mobile terminal 10 is not in the range of the image forming apparatus 20, the image forming apparatus 20 does not have user information received from the mobile terminal 10, and thus, does not perform user authentication based on the user information. Accordingly, the user interface 21 may display a locked user interface.

Here, the locked user interface includes a user interface that does not include a portion for receiving a user input and thus is not capable of receiving the user input. However, one or more embodiments are not limited thereto, and a part of the user interface may include the portion (e.g., a portion for receiving a user input with respect to user information for a login is included) for receiving a user input and other parts of the user interface may not include the portion for receiving a user input. For example, the locked user interface may include a log-in screen.

Referring to an intermediate diagram of FIG. 5B, the user 1 carrying the mobile terminal 10 approaches the image forming apparatus 20. While the user 1 approaches the image forming apparatus 20, the image forming apparatus 20 periodically broadcasts packets (advertising packets) including identification information of the image forming apparatus 20. When the user 1 carrying the mobile terminal 10 approaches the image forming apparatus 20, the mobile terminal 10 may receive the packets (the advertising packets) that are periodically broadcasted, and may determine whether to transmit a connection request, according to the number of packets (advertising packets) and/or signal strengths of the packets (the advertising packets) that are received during a unit time period. For example, the mobile terminal 10 may determine to transmit the connection request, if the mobile terminal 10 receives a packet (an advertising packet) whose signal strength is equal to or greater than −56 dB, the number of times of sequentially detecting the packet (the advertising packet) whose signal strength is equal to or greater than −56 dB is equal to or greater than the predetermined number of times stored in the mobile terminal 10, and such status is maintained during a predetermined time period. If the packet (the advertising packet) whose signal strength is equal to or greater than −56 dB is detected three consecutive times that are greater than the predetermined number of times that is 2, and such status is remained over a predetermined time period (e.g., 1 second), the connection request may be transmitted. Here, even if the packet (the advertising packet) whose signal strength is equal to or greater than −56 dB is detected three consecutive times, if a packet (an advertising packet) whose signal strength is less than −56 dB is detected after the three consecutive times, the preset number of times that is 2 is satisfied but such status is not remained over the predetermined time period (e.g., 1 sec.), so that the mobile terminal 10 may determine not to transmit the connection request to the image forming apparatus 20.

When the user 1 carrying the mobile terminal 10 approaches the image forming apparatus 20 and the mobile terminal 10 transmits the connection request to the image forming apparatus 20, the image forming apparatus 20 may connect to the mobile terminal 10. The mobile terminal 10 transmits user information to the image forming apparatus 20 by using wireless communication.

The image forming apparatus 20 may perform user authentication with respect to the image forming apparatus 20 by using the received user information.

Referring to a right diagram of FIG. 5B, if the user authentication with respect to the image forming apparatus 20 has been successfully performed, the image forming apparatus 20 may unlock the locked user interface and may display an unlocked user interface on the user interface 21 of the image forming apparatus 20. Here, the unlocked user interface means a user interface including a portion for receiving a user input. The user 1 may input a command to the image forming apparatus 20 via the unlocked user interface, and the image forming apparatus 20 may perform various tasks, based on the command.

Figure 5C:
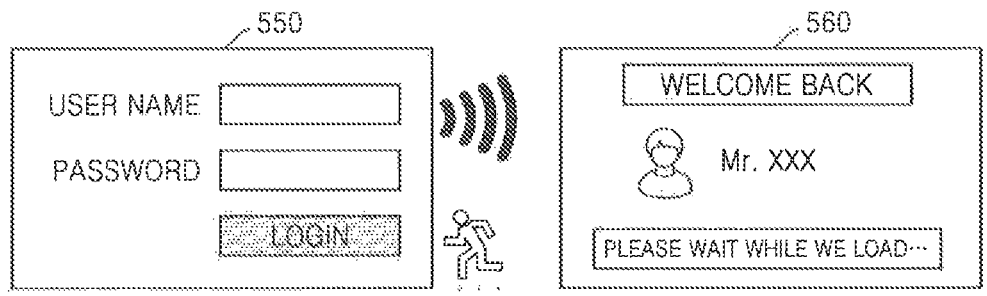
FIGS. 5C through 5E illustrate user interfaces that are displayed by the image forming apparatus after the image forming apparatus performs authentication with respect to a user, according to an embodiment.
Figure 5D:
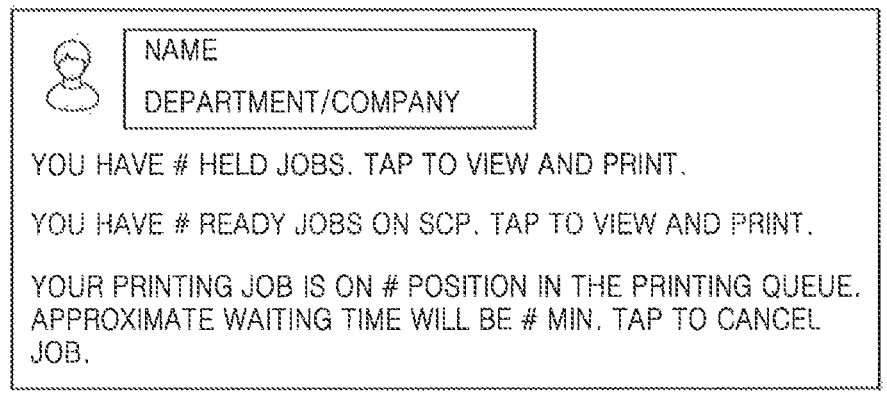
Figure 5E:
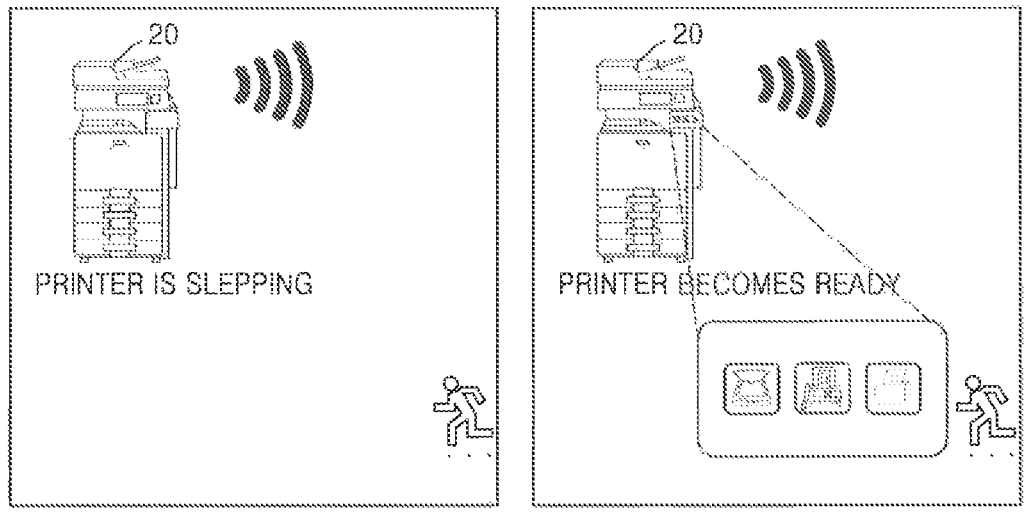

FIGS. 5C through 5E illustrate user interfaces that are displayed by the image forming apparatus after the image forming apparatus performs authentication with respect to a user, according to an embodiment.

Referring to FIG. 5C, it is assumed that the image forming apparatus 20 displays a login screen 550. When a user carrying the mobile terminal 10 approaches the image forming apparatus 20, the image forming apparatus 20 receives user information from the mobile terminal 10 by using short-distance wireless communication, and performs user authentication with respect to the image forming apparatus 20 by using the user information. If the user authentication with respect to the image forming apparatus 20 has been successfully performed, the image forming apparatus 20 may display a welcome screen 560 after the login screen 550. The welcome screen 560 includes a name of a user corresponding to the user information, and a message indicating that a home screen is being loaded. Afterward, when the home screen is ready, the image forming apparatus 20 may display the home screen.

Referring to FIG. 5D, when a print job that is mapped to correspond to the user information is requested to be printed by the image forming apparatus 20 and then is in a held state, if a plurality of the print jobs exist, the image forming apparatus 20 may display a number of the print jobs on the home screen.

If content that is mapped to correspond to the user information was uploaded to a cloud server, the image forming apparatus 20 may transmit, to the cloud server, the user information and a request of checking whether the content that is mapped to correspond to the user information exists in the cloud server, and may receive, from the cloud server, a message indicating the number of pieces of contents that are mapped to correspond to the user information. Accordingly, the image forming apparatus 20 may display, on the home screen, the number of pieces of contents that are mapped to correspond to the user information.

If the print job that is mapped to correspond to the user information is in a stand-by state in the image forming apparatus 20, the image forming apparatus 20 may display, on the home screen, a number of jobs to be performed before the print task, and an approximate wait time.

Referring to FIG. 5E, it is assumed that an operational mode of the image forming apparatus 20 is a sleeping mode. The user 1 carrying the mobile terminal 10 approaches the image forming apparatus 20. If the user 1 is within a sufficient range of the image forming apparatus 20, the mobile terminal 10 transmits a connection request to the image forming apparatus 20, and then the image forming apparatus 20 connects to the mobile terminal 10. In this regard, the image forming apparatus 20 may automatically change its operational mode from the sleeping mode to a normal mode.

Also, when the user 1 carrying the mobile terminal 10 approaches the image forming apparatus 20, the mobile terminal 10 transmits a connection request to the image forming apparatus 20, and then the image forming apparatus 20 connects to the mobile terminal 10. Here, the mobile terminal 10 may receive, from the image forming apparatus 20, information such as an address book, setting information, or the like of the image forming apparatus 20 via connection with the mobile terminal 10. For example, when the user 1 carrying the mobile terminal 10 approaches the image forming apparatus 20, the mobile terminal 10 transmits a BLE-connection request to the image forming apparatus 20, and then the image forming apparatus 20 BLE-connects to the mobile terminal 10. Here, the mobile terminal 10 may receive, from the image forming apparatus 20, information such as an address book, setting information, or the like of the image forming apparatus 20 via BLE-connection with the mobile terminal 10.

Also, the mobile terminal 10 may transmit cloning information such as phone numbers stored in a phone book to the image forming apparatus 20.

FIG. 5F illustrates a procedure in which, when a user carrying the mobile terminal becomes distant from the image forming apparatus, the image forming apparatus changes and displays a user interface of the image forming apparatus, according to an embodiment.

An upper diagram of FIG. 5F illustrates a user interface 21 of the image forming apparatus 20 when the user 1 carrying the mobile terminal 10 approaches the image forming apparatus 20. The image forming apparatus 20 has user information that was received from the mobile terminal 10 by using wireless communication, and user authentication with respect to the image forming apparatus 20 has been successfully performed based on the received user information. In other word, the image forming apparatus 20 may perform the user authentication with respect to the image forming apparatus 20 by using the received user information. If the user authentication has been successfully performed, the image forming apparatus 20 may unlock a locked user interface and may display an unlocked user interface on the user interface 21 of the image forming apparatus 20.

Referring to an intermediate diagram of FIG. 5F, the user 1 carrying the mobile terminal 10 becomes distant from the image forming apparatus 20. If a distance from the mobile terminal 10 is increased so that the mobile terminal 10 exits an available range of the wireless communication, wireless communication connection is disconnected, so that the image forming apparatus 20 may detect that the mobile terminal 10 is distant from the image forming apparatus 20.

Referring to a lower diagram of FIG. 5F, when the image forming apparatus 20 detects that the mobile terminal 10 is distant from the image forming apparatus 20, the image forming apparatus 20 may automatically perform logout and may display a login screen. That is, the image forming apparatus 20 may display again the locked user interface.

In this regard, when the mobile terminal 10 exits the available range of the wireless communication and thus, the wireless communication to the mobile terminal 10 is disconnected, the image forming apparatus 20 may detect that the mobile terminal 10 is distant from the image forming apparatus 20, but one or more embodiments are not limited thereto. That is, when the mobile terminal 10 receives a packet (an advertising packet) that is periodically broadcasted from the image forming apparatus 20, and transmits a disconnection request that is determined based on the number of packets (advertising packets) and/or signal strengths of the packets (the advertising packets) that are received during a unit time period, the image forming apparatus 20 may also disconnect the wireless communication connection. That is the image forming apparatus 20 detects that the mobile terminal 10 becomes distant from the image forming apparatus 20 based on the received packets (the advertising packets).

Referring back to the intermediate diagram of FIG. 5F, the user 1 carrying the mobile terminal 10 becomes distant from the image forming apparatus 20.

The image forming apparatus 20 periodically broadcasts a packet (an advertising packet) including identification information of the image forming apparatus 20. When the user 1 carrying the mobile terminal 10 becomes distant from the image forming apparatus 20, the mobile terminal 10 may receive the packet (the advertising packet) that is periodically broadcasted, and may determine whether to transmit a disconnection request based on the number of packets (advertising packets) and/or signal strengths of the packets (the advertising packets) that are received during a unit time period.

For example, the mobile terminal 10 may determine to transmit the disconnection request when the mobile terminal 10 receives a packet (an advertising packet) whose signal strength is equal to or less than −65 dB, the number of times of sequentially sensing the packet (the advertising packet) whose signal strength is equal to or less than −65 dB is equal to or greater than a preset number of times stored in the mobile terminal 10, and such status is maintained during a predetermined time period. If the advertising packet whose signal strength is equal to or less than −65 dB is detected three consecutive times that are greater than the preset number of times that is 2, and such status is remained over a predetermined time period (e.g., 1 sec.), the mobile terminal 10 may transmit the disconnection request to the image forming apparatus 20. Here, even if the packet (the advertising packet) whose signal strength is equal to or less than −65 dB is detected three consecutive times, if a packet (an advertising packet) whose signal strength is greater than −65 dB is detected after the three consecutive times, the preset number of times that is 2 is satisfied but such status is not remained over the predetermined time period (e.g., 1 sec.), so that the mobile terminal 10 may determine not to transmit the disconnection request to the image forming apparatus 20.

When the mobile terminal 10 transmits the disconnection request to the image forming apparatus 20, the image forming apparatus 20 may disconnect the wireless communication connection between the image forming apparatus 20 and the mobile terminal 10.

FIG. 5G illustrates a procedure in which the mobile terminal transmits user information to the image forming apparatus, and receives a result of user authentication from the image forming apparatus, according to an embodiment.

Referring to FIG. 5G, in operation 571, the mobile terminal 10 may detect that the image forming apparatus 20, which is not stored in an in-range device list, is in a range of the mobile terminal 10, based on a packet (an advertising packet) received from the image forming apparatus 20, and may add the image forming apparatus 20 to the in-range device list. Detailed descriptions thereof will be provided with reference to FIG. 8E.

In operation 572, the mobile terminal 10 checks an authentication flag Auth Flag included in the packet (the advertising packet) that is received from the image forming apparatus 20. When the authentication flag indicates ON, the mobile terminal 10 may add an authentication request message to a message queue by using a preset communication. For example, the mobile terminal 10 may add the authentication request message to the message queue by using a BLE-communication. In this regard, the authentication request message may include an authentication domain, and a user ID and a password that are previously input to the mobile terminal 10 by a user.

In operation 573, the mobile terminal 10 may transmit the authentication request message to the image forming apparatus 20.

A detailed process in which the authentication request message is transmitted from the mobile terminal 10 to the image forming apparatus 20 is referred to a process of FIG. 2. The process of FIG. 2 in which the request data is written to the write characteristic and is transmitted corresponds to the process of FIG. 5G in which the authentication request message is transmitted.

In operation 574, the first network interface 311 of the image forming apparatus 20 may transmit user information included in the authentication request message to the authentication unit 341, and the authentication unit 341 may perform user authentication with respect to the image forming apparatus 20 by using the received user information. In more detail, the authentication unit 341 may compare pre-registered user information in the image forming apparatus 20 with the received user information, and if they are matched, the authentication unit 341 may determine that the user authentication has been successfully performed. The aforementioned user authentication is performed in a local domain, but one or more embodiments are not limited thereto, and the authentication unit 341 of the image forming apparatus 20 may transmit the received user information to a server, and may perform the user authentication by receiving, from the server, an authentication result based on the received user information.

If the user authentication with respect to the image forming apparatus 20 has been successfully performed, the authentication unit 341 of the image forming apparatus 20 may transmit a command of changing a user interface to the user interface 330 of the image forming apparatus 20.

When the user interface 330 of the image forming apparatus 20 receives the command of changing the user interface from the authentication unit 341, the user interface 330 may change and may display the user interface.

The authentication unit 341 transmits a result of the user authentication to the first network interface 311. In response to the authentication request message, the first network interface 311 may transmit, to the mobile terminal 10, the result of the user authentication that is received from the authentication unit 341.

A detailed process in which the result of the user authentication is transmitted from the image forming apparatus 20 to the mobile terminal 10 is referred to a process of FIG. 2. The process of FIG. 2 in which, when data is updated on the read characteristic, the data that is changed on the read characteristic (the response to the request) is notified corresponds to the process of FIG. 5G in which the result of the user authentication is transmitted.

Figure 5H:
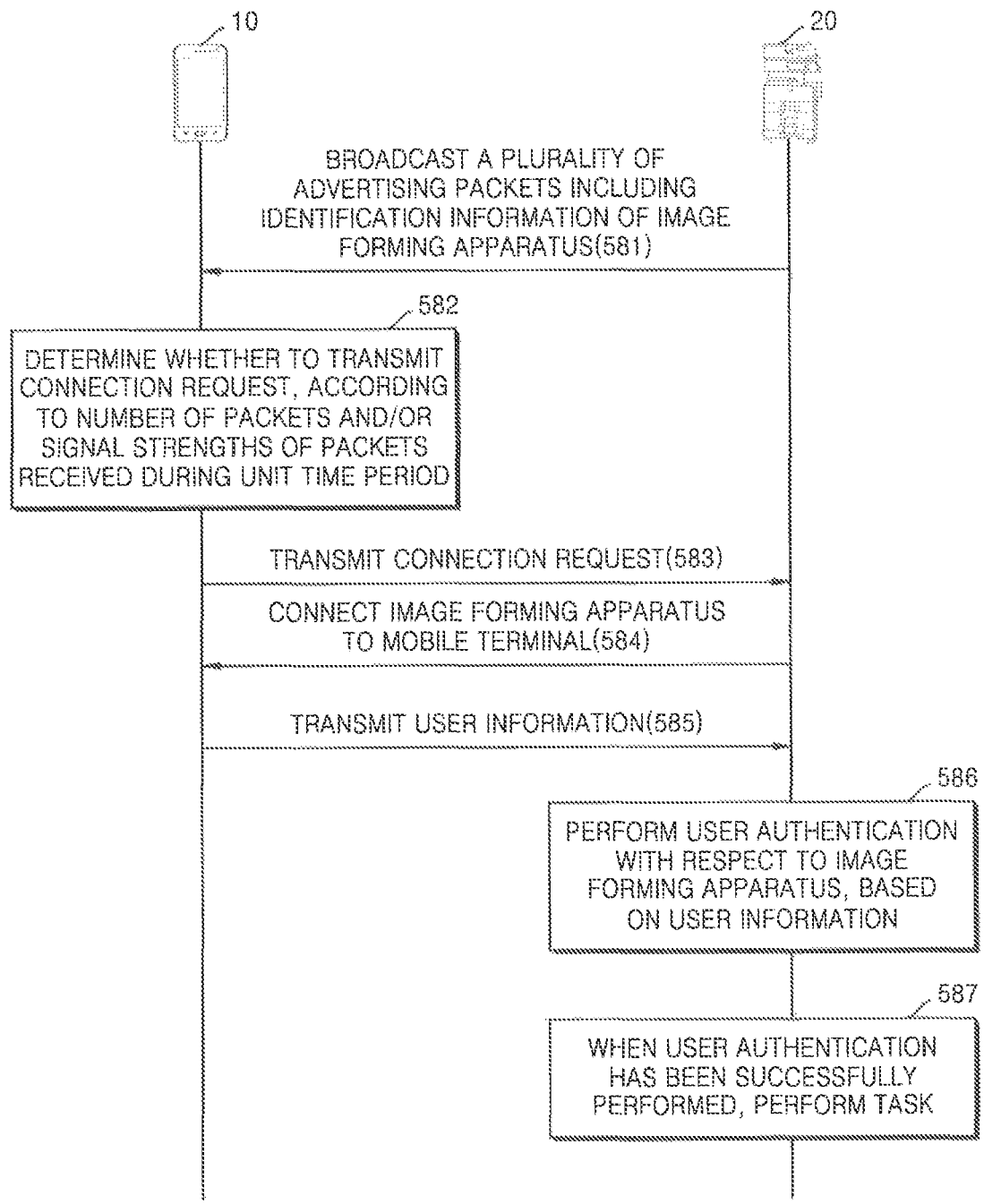
FIG. 5H is a flowchart of a method of performing an operation by using wireless communication when the mobile terminal approaches the image forming apparatus, the method performed by the image forming apparatus 20, according to an embodiment.

FIG. 5H is a flowchart illustrating a method of performing an operation by using wireless communication when the mobile terminal approaches the image forming apparatus, the method performed by the image forming apparatus 20, according to an embodiment.

In operation 581, the image forming apparatus 20 broadcasts a plurality of packets (advertising packets) including identification information of the image forming apparatus 20.

In operation 582, the mobile terminal 10 may receive the plurality of packets (the advertising packets) including the identification information of the image forming apparatus 20 from the image forming apparatus 20, and may determine whether to transmit a connection request, according to the number of packets (advertising packets) and/or signal strengths of the packets (the advertising packets) that are received during a unit time period.

In operation 583, the mobile terminal 10 may transmit, based on a result of the determination in operation 582, the connection request including the identification information of the image forming apparatus 20 to the image forming apparatus 20.

In operation 584, the image forming apparatus 20 may receive the connection request from the mobile terminal 10, and may connect to the mobile terminal 10 based on the connection request.

In operation 585, the mobile terminal 10 may transmit user information to the image forming apparatus 20.

In operation 586, the image forming apparatus 20 may perform user authentication with respect to the image forming apparatus 20, based on the user information received in operation 585.

In operation 587, if user authentication with respect to the image forming apparatus 20 has been successfully performed in operation 586, the image forming apparatus 20 may perform a task. The image forming apparatus 20 may perform the task such as a scan task, a transmission task, a print task, or the like.

Figure 6A:
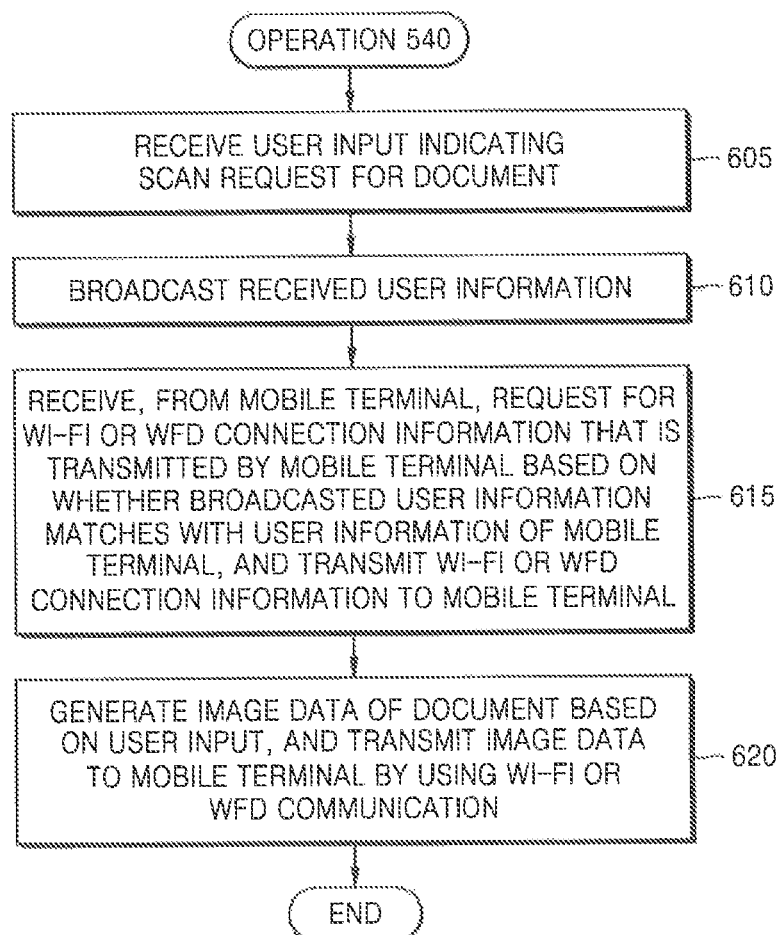
FIG. 6A is a flowchart of a method of performing an operation, the method performed by the image forming apparatus, according to an embodiment.

FIG. 6A is a flowchart illustrating a method of performing an operation, the method performed by the image forming apparatus, according to an embodiment.

In operation 605, the image forming apparatus 20 receives a user input indicating a scan request for a document. Here, if the user authentication has been successfully performed, the image forming apparatus 20 may display a user interface for receiving the user input indicating the scan request for the document, and may receive the user input from a user via the displayed user interface.

In operation 610, the image forming apparatus 20 may broadcast the user information received in operation 530.

In operation 615, the image forming apparatus 20 may receive, from the mobile terminal 10, a request for Wi-Fi or WFD connection information that is transmitted from the mobile terminal 10 based on whether the broadcasted user information matches with user information, and may transmit the Wi-Fi or WFD connection information to the mobile terminal 10.

In operation 620, the image forming apparatus 20 generates image data of the document, based on the user input received in operation 605. The image forming apparatus 20 may transmit, to the mobile terminal 10, the image data of the document by using Wi-Fi or WFD communication.

Figure 6B:
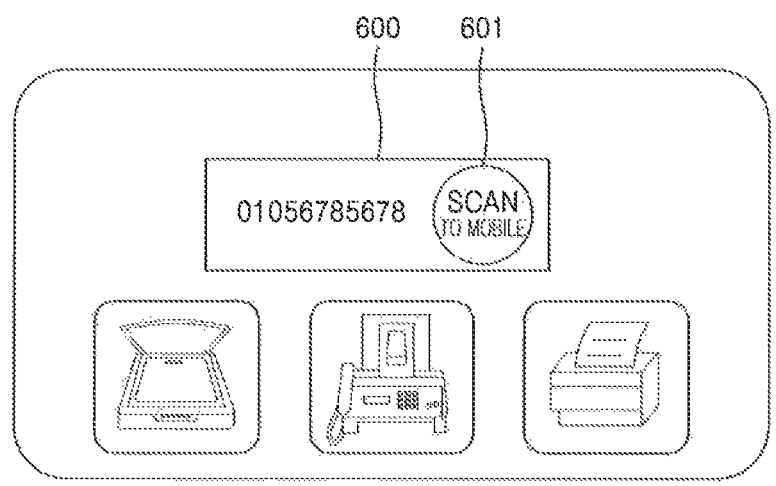
FIGS. 6B and 6C illustrate various states of a user interface that are displayed when a scan task is performed in the image forming apparatus, according to an embodiment.
Figure 6C:
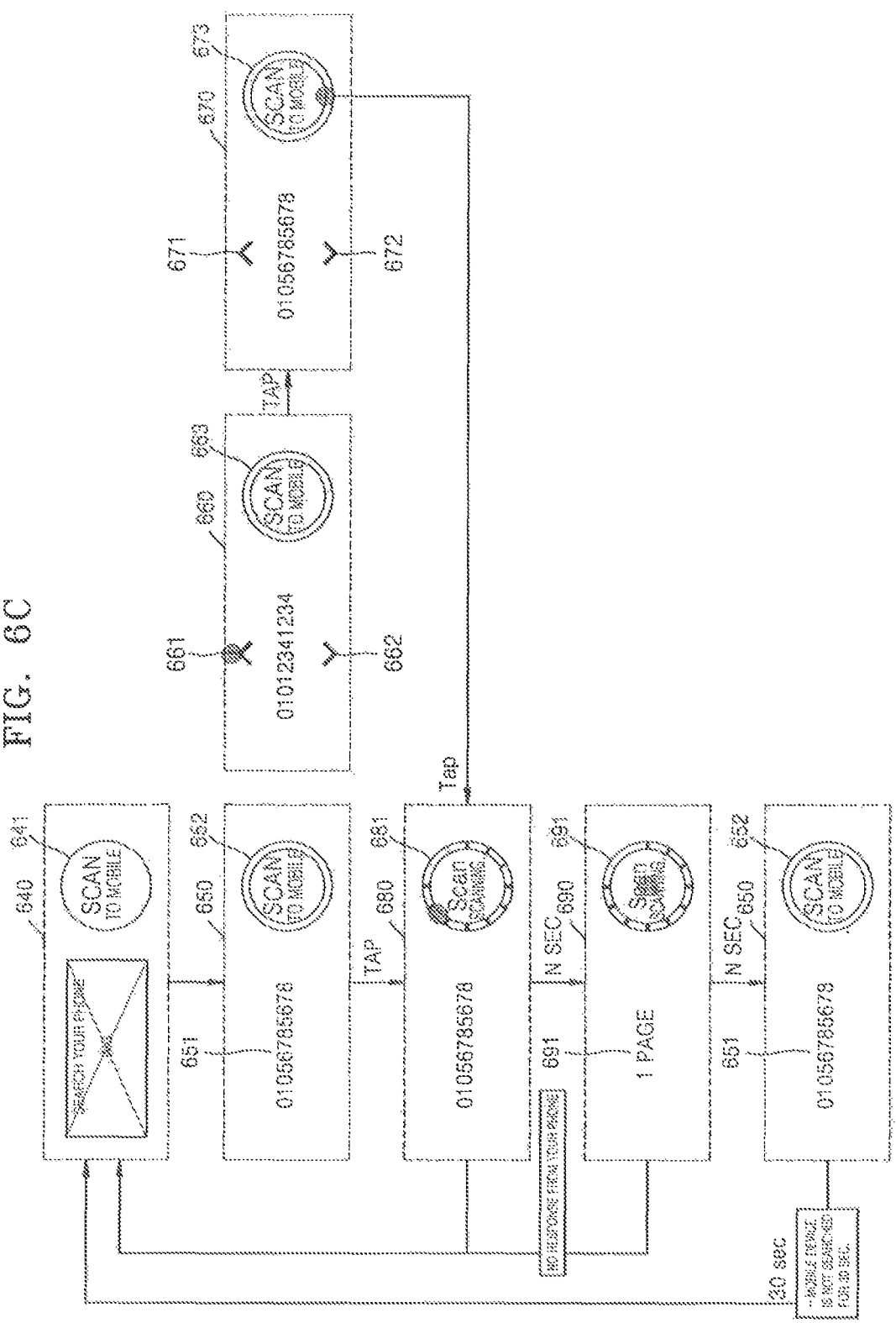

FIGS. 6B and 6C illustrate various states of a user interface that are displayed when a scan task is performed in the image forming apparatus, according to an embodiment.

Referring to FIG. 6B, the image forming apparatus 20 may display a user interface 600 including a phone number of the mobile terminal 10 and a button 601 for transmitting scan data to the mobile terminal 10.

FIG. 6C illustrates changes of the user interface 600 that are displayed on the image forming apparatus 20 and occur in a procedure in which, when a user inputs a scan command via a user interface of the image forming apparatus 20, image data is generated in the image forming apparatus 20 according to the scan command, and is transmitted to the mobile terminal 10.

Referring to FIG. 6C, it is assumed that, when the user carrying the mobile terminal 10 is distant from the image forming apparatus 20, the image forming apparatus 20 is not connected to the mobile terminal 10 and thus does not receive, from the mobile terminal 10, a request of registering the phone number of the mobile terminal 10. In this regard, the image forming apparatus 20 may display a user interface 640 that does not include the phone number of the mobile terminal 10 but includes an inactivated 'Scan to Mobile' button 641.

Also, it is assumed that, when the user carrying the mobile terminal 10 approaches the image forming apparatus 20, the image forming apparatus 20 is connected to the mobile terminal 10 by using preset communication (e.g., BLE communication) and thus receives, from the mobile terminal 10, a request of registering the phone number of the mobile terminal 10. Here, the image forming apparatus 20 may display a user interface 650 that includes a phone number 651 of the mobile terminal 10, and an activated 'Scan to Mobile' button 652.

For example, if the phone number of the mobile terminal 10 of the user is '010-5678-5678', and the user carrying the mobile terminal 10 approaches the image forming apparatus 20, the image forming apparatus 20 may display the user interface 650 including '010-5678-5678'.

Also, it is assumed that, when users carrying the mobile terminals 10 approach the image forming apparatus 20, the image forming apparatus 20 is connected to each of the mobile terminals 10 by using preset communication (e.g., BLE communication) and thus receives, from the mobile terminals 10, requests of registering phone numbers of the mobile terminals 10. In this case, since the mobile terminals 10 approach the image forming apparatus 20 and are registered, the image forming apparatus 20 may display user interfaces 660 and 670 including buttons 661, 662, 671, and 672.

For example, if a phone number of the mobile terminal 10 of a user A is '010-5678-5678', a phone number of the mobile terminal 10 of a user B is '010-1234-1234', and the users A and B carrying the mobile terminals 10 approach the image forming apparatus 20, the image forming apparatus 20 may display the user interface 660 including '010-1234-1234' that is the phone number of the mobile terminal 10 of the user A who first requested registration of the phone number.

Here, the user selects the button 661 or 662 on the user interface 660, the image forming apparatus 20 displays the user interface 670 including '010-5678-5678' that is the phone number of the other mobile terminal 10.

When a user selects a 'Scan to Mobile' button 652, 663, or 673, the image forming apparatus 20 performs a scan task on a document and generates image data of the document.

While the scan task is performed in the image forming apparatus 20, the image forming apparatus 20 displays a user interface 680 including a 'Stop scanning' button 681. When the user selects the 'Stop scanning' button 681, the image forming apparatus 20 stops performing the scan task on the document.

While the scan task is performed in the image forming apparatus 20, the image forming apparatus 20 may display a user interface 690 showing a procedure of the scan task. For example, the image forming apparatus 20 may display a page 691 that is currently completed with respect to the scan task.

When the scan task on the document is completed, the image forming apparatus 20 transmits the image data of the document to the mobile terminal 10 with a phone number that is currently displayed on a user interface of the image forming apparatus 20. A detailed procedure of transmitting the image data will be described with reference to FIG. 6C.

While the user interface 650, 680, or 690 is displayed on the image forming apparatus 20, if connection to the mobile terminal 10 is disconnected or the mobile terminal 10 does not transmit any response, the image forming apparatus 20 may display a user interface 640.

Figure 6D:
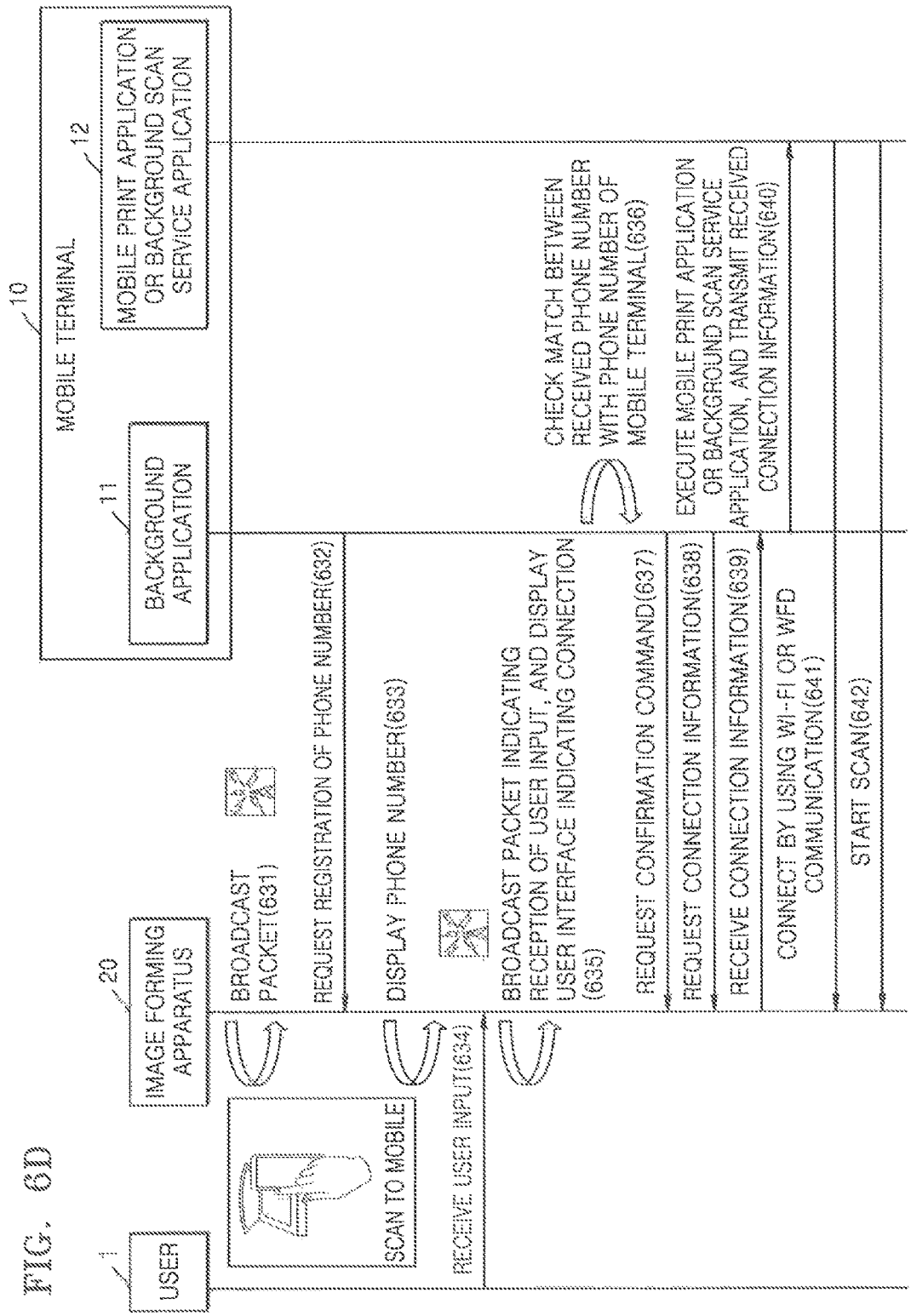
FIG. 6D illustrates a procedure in which the image forming apparatus performs a scan task on a document, generates image data of the document, and transmits the image data to the mobile terminal, according to an embodiment.

FIG. 6D illustrates a procedure in which the image forming apparatus performs a scan task on a document, generates image data of the document, and transmits the image data to the mobile terminal, according to an embodiment.

Referring to FIG. 6D, in operation 631, the image forming apparatus 20 periodically broadcasts a packet (an advertising packet) including identification information of the image forming apparatus 20. Here, the packet (the advertising packet) may include a flag indicating that the image forming apparatus 20 supports a 'Scan to Mobile' function.

Here, it is assumed that the mobile terminal 10 executes a background application 11. The background application 11 determines whether the image forming apparatus 20 is close to the mobile terminal 10, based on the packet (the advertising packet) that is broadcasted from the image forming apparatus 20, and if it is determined that the image forming apparatus 20 is close to the mobile terminal 10, the mobile terminal 10 obtains the identification information of the image forming apparatus 20 from the packet (the advertising packet) including the identification information of the image forming apparatus 20.

In operation 632, the mobile terminal 10 extracts, from the packet (the advertising packet), the flag indicating that the image forming apparatus 20 supports the 'Scan to Mobile' function. If the flag that is extracted from the packet (the advertising packet) and indicates that the image forming apparatus 20 supports the 'Scan to Mobile' function is ON, the mobile terminal 10 requests registration of a phone number of the mobile terminal 10. In more detail, the mobile terminal 10 requests registration of the phone number by using preset communication (e.g., BLE communication).

A detailed process in which a message of a phone number registration request is transmitted from the mobile terminal 10 to the image forming apparatus 20 is referred to the process of FIG. 2. The process of FIG. 2 in which the request data is written to the write characteristic and is transmitted corresponds to the process of FIG. 6C in which the message of the phone number registration request is transmitted.

In operation 633, when the image forming apparatus 20 receives the phone number registration request from the mobile terminal 10, the image forming apparatus 20 displays the phone number of the mobile terminal 10.

In operation 634, the image forming apparatus 20 receives, from a user, a user input for performing a scan task on a document and transmitting image data of the document to the mobile terminal 10. In particular, when the image forming apparatus 20 receives the phone number registration request from the mobile terminal 10, the image forming apparatus 20 may display a user interface for receiving the user input.

In operation 635, the image forming apparatus 20 may update a flag (information), which indicates reception of the user input, as ON, and may broadcast a packet (an advertising packet) that further includes the updated flag (information) and a phone number that is displayed when the user input is received. In this regard, the image forming apparatus 20 may display a user interface indicating that the image forming apparatus 20 is being connected to the mobile terminal 10.

In operation 636, the background application 11 receives the packet (the advertising packet) and obtains, from the packet (the advertising packet), the phone number and the flag (the information) indicating the reception of the user input. The background application 11 may compare the obtained phone number with the phone number of the mobile terminal 10 and may check a match therebetween.

If it is determined that the phone number obtained from the packet (the advertising packet) matches with the phone number of the mobile terminal 10, the background application 11 may request the image forming apparatus 20 for a confirmation command by using the preset communication (e.g., BLE communication).

A detailed process in which the confirmation command is requested by the mobile terminal 10 is referred to the process of FIG. 2. The process of FIG. 2 in which the request data is written to the write characteristic and is transmitted corresponds to the process of FIG. 6C in which the request of the confirmation command is transmitted.

In operation 637, when the image forming apparatus 20 receives the request of the confirmation command from the background application 11, the image forming apparatus 20 transmits the confirmation command to the background application 11 by using the preset communication (e.g., BLE communication). Here, the confirmation command is a message indicating that the image forming apparatus 20 is to start the scan task soon.

In operation 638, when the confirmation command is received from the image forming apparatus 20, the background application 11 requests the image forming apparatus 20 for Wi-Fi or WFD connection information by using the preset communication (e.g., BLE communication).

The reason why the background application 11 separately requests the image forming apparatus 20 for wireless communication (e.g., Wi-Fi or WFD) connection information is because a data transmission and reception speed is slow when a large amount of data is received by using the communication.

In operation 639, the image forming apparatus 20 transmits Wi-Fi or WFD connection information by using the communication when the request for Wi-Fi or WFD connection information is received from the background application 11.

In operation 640, the background application 11 may transmit the Wi-Fi or WFD connection information.

The background application 11 executes the mobile print application or background scan service application 12, and the background application 11 transmits the received connection information to the mobile print application or background scan service application 12.

In operation 641, the mobile print application or background scan service application 12 connects the mobile terminal 10 to the image forming apparatus 20 by using the Wi-Fi or WFD connection information and Wi-Fi or WFD communication.

In operation 642, the mobile print application or background scan service application 12 may transmit a message indicating a start of the scan task to the image forming apparatus 20. The mobile print application or background scan service application 12 may receive, from the image forming apparatus 20 by using the Wi-Fi or WFD communication, the image data that is generated by performing the scan task on the document.

Referring to FIGS. 6B, 6C, and 6D, it is described that the image forming apparatus 20 receives, from a user, a user input indicating that a scan task with respect to a document is performed and image data generated therefrom is transmitted to the mobile terminal, however, the embodiment is not limited thereto and it is obvious to one of ordinary skill in the art that the mobile terminal 10 may receive a user input from the user and may transmit the received user input to the image forming apparatus 20, and the image forming apparatus 20 may receive the user input from the mobile terminal 10. For example, when the mobile terminal 10 receives a packet (an advertising packet) broadcasted by the image forming apparatus 20, the mobile terminal 10 may display a screen for receiving the user input, may receive the user input according to the displayed screen, and may transmit the received user input to the image forming apparatus 20.

Figure 6E:
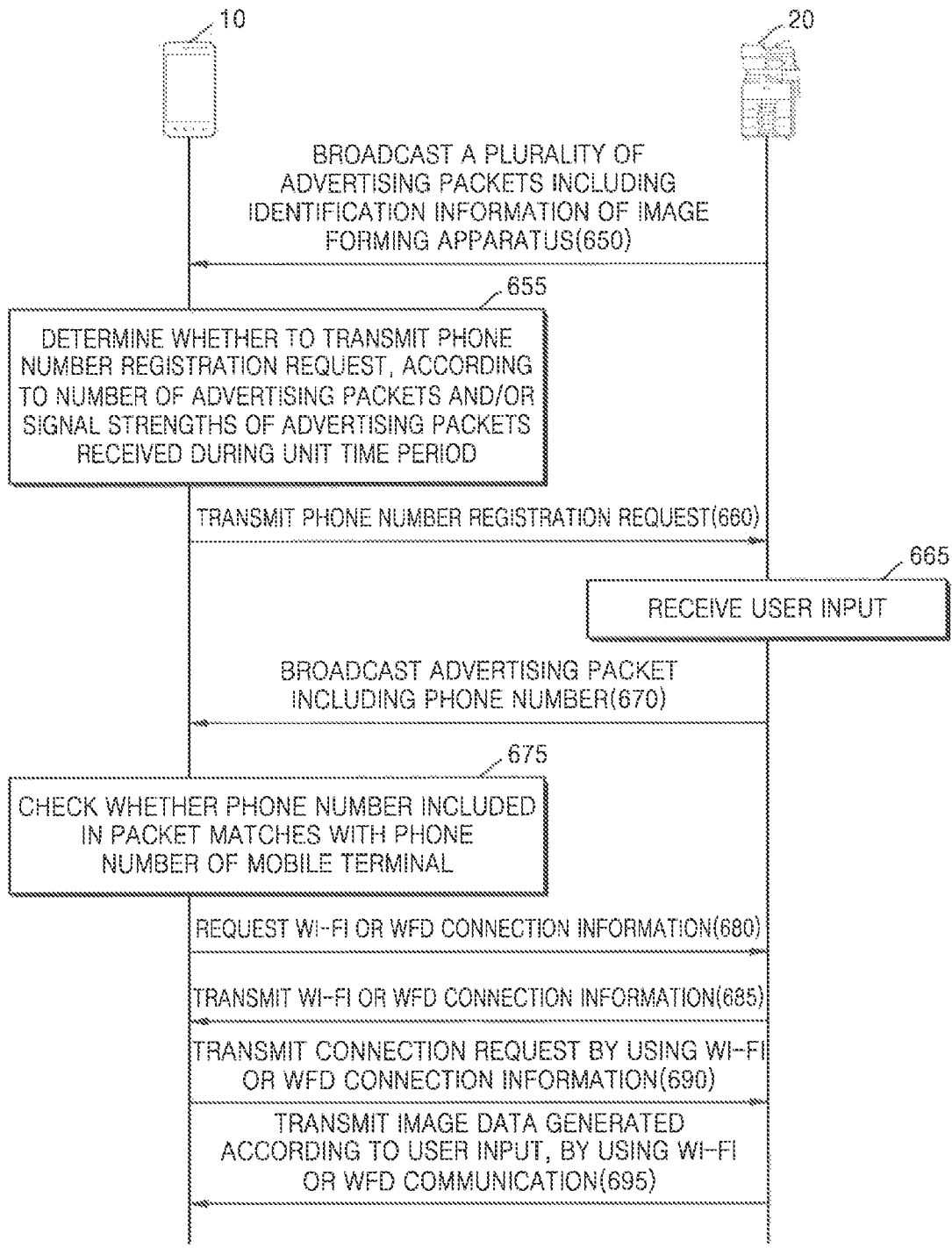
FIG. 6E is a flowchart of a method of performing an operation by using wireless communication when the mobile terminal approaches the image forming apparatus, the method performed by the image forming apparatus 20, according to another embodiment.

FIG. 6E is a flowchart of a method of performing an operation by using wireless communication when the mobile terminal approaches the image forming apparatus, the method performed by the image forming apparatus 20, according to another embodiment.

Referring to FIG. 6E, in operation 610, the image forming apparatus 20 broadcasts a plurality of packets (advertising packets) including identification information of the image forming apparatus 20.

In operation 615, the mobile terminal 10 receives the plurality of packets (the advertising packets) that are broadcasted from the image forming apparatus 20, and determines whether to transmit a phone number registration request, according to a number of packets (advertising packets) and signal strengths of the packets (the advertising packets) that are received during a unit time period.

In operation 620, if the mobile terminal 10 determines to transmit the phone number registration request in operation 615, the mobile terminal 10 transmits the phone number registration request.

When the mobile terminal 10 transmits the phone number registration request to the image forming apparatus 20, as described above with reference to FIG. 5H, it will be obvious to one of ordinary skill in the art that a procedure in which the mobile terminal 10 transmits a connection request to the image forming apparatus 20 and is connected with the image forming apparatus 20 has to be first performed, thus, detailed descriptions thereof are omitted here.

In operation 625, the image forming apparatus 20 receives the phone number registration request from the mobile terminal 10. The image forming apparatus 20 may receive a user input indicating a scan request for a document from a user.

In operation 630, when the user input is received in operation 625, the image forming apparatus 20 may broadcast a packet (an advertising packet) including a phone number included in the phone number registration request that was transmitted from the mobile terminal 10.

In operation 635, the mobile terminal 10 receives the packet (the advertising packet) from the image forming apparatus 20, and checks whether the phone number included in the packet (the advertising packet) matches with a phone number of the mobile terminal 10.

In operation 640, if it is checked that the phone number included in the packet (the advertising packet) matches with the phone number of the mobile terminal 10, the mobile terminal 10 may request the image forming apparatus 20 for Wi-Fi or WFD connection information.

In operation 645, when the image forming apparatus 20 receives the request of the Wi-Fi or WFD connection information from the mobile terminal 10, the image forming apparatus 20 transmits the Wi-Fi or WFD connection information. Then, the mobile terminal 10 may receive the Wi-Fi or WFD connection information from the image forming apparatus 20.

In operation 650, the mobile terminal 10 may transmit a Wi-Fi or WFD connection request to the image forming apparatus 20 by using the Wi-Fi or WFD connection information.

In operation 655, when the image forming apparatus 20 receives the Wi-Fi or WFD connection request from the mobile terminal 10, the image forming apparatus 20 may connect to the mobile terminal 10 by using Wi-Fi or WFD communication, and may transmit, to the mobile terminal 10 by using the Wi-Fi or WFD communication, image data that is generated by performing a scan task on the document according to the user input received in operation 665.

Figure 7A:
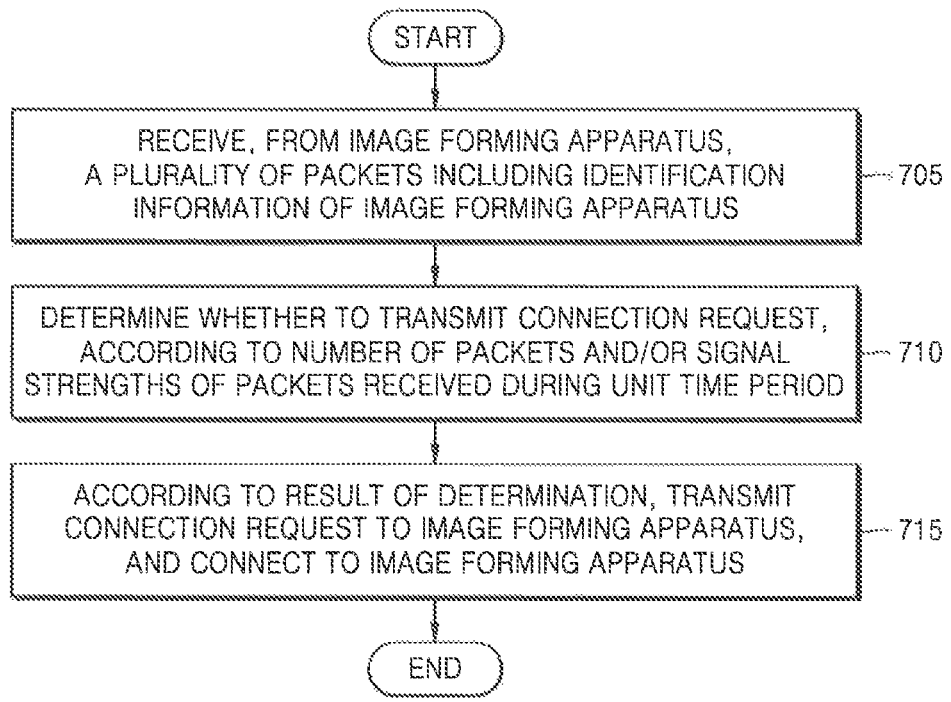
FIG. 7A is a flowchart of an operating method of the mobile terminal, according to an embodiment.

FIG. 7A is a flowchart of an operating method of the mobile terminal, according to an embodiment.

Referring to FIG. 7A, in operation 705, the mobile terminal 10 may receive a plurality of packets (advertising packets) including identification information of the image forming apparatus 20 from the image forming apparatus 20.

In operation 710, the mobile terminal 10 determines whether to transmit a connection request, according to the number of packets (advertising packets) and/or signal strengths of the packets (the advertising packets) that are received during a unit time period. For example, the mobile terminal 10 may determine whether to transmit the connection request, according to the number of packets (advertising packets) that are received during the unit time period and whose signal strengths are equal to or greater than a first threshold value.

Detailed descriptions with respect to the mobile terminal 10 determining whether to transmit the connection request are provided later below with reference to FIG. 7B.

In operation 720, according to a result of the determination in operation 710, the mobile terminal 10 may transmit the connection request to the image forming apparatus 20 and may connect to the image forming apparatus 20.

FIG. 7B illustrates a procedure in which the mobile terminal receives a packet (an advertising packet) broadcasted from the image forming apparatus 20 by executing a background application, and determines, by using the received packet (the received advertising packet), whether to transmit a connection request, according to an embodiment.

Referring to FIG. 7B, the image forming apparatus 20 periodically broadcasts a packet (an advertising packet) including identification information of the image forming apparatus 20. The mobile terminal 10 receives a plurality of packets (advertising packets) that are broadcasted from a plurality of the image forming apparatuses 20, and analyzes the received packets (the advertising packets). The mobile terminal 10 analyzes the packets (the advertising packets) and determines whether the background application supports the image forming apparatuses 20. If the image forming apparatus 20 is supported by the background application, the mobile terminal 10 obtains an RSSI value indicating a signal strength of the packet (the advertising packet), and determines whether the image forming apparatus 20 is close to the mobile terminal 10, based on the RSSI value.

The mobile terminal 10 may approximately determine whether the image forming apparatus 20 is close to the mobile terminal 10, based on the signal strength (the RSSI value) of the advertising packet.

As the received signal strength is increased, it means that a distance between the mobile terminal 10 and the image forming apparatus 20 is decreased. However, since a signal is differently sensed by mobile terminals, it is difficult to exactly determine the distance. For example, a signal that is sensed by three mobile terminals that are distant from the image forming apparatus 20 by 0.5 m may vary as −56 dB, −58 dB, and −69 dB.

If whether mobile terminals are close to the image forming apparatus 20 is determined according to a same received signal strength, one of the mobile terminals may determine that the mobile terminal is close to the image forming apparatus 20 whereas another one of the mobile terminals may determine that the other mobile terminal is distant from the image forming apparatus 20. Also, even if a user carries one mobile terminal, a signal strength of a received packet (an advertising packet) may vary according to how the user carries the mobile terminal, although the mobile terminal remains at a same distance from the image forming apparatus 20. For example, it, it is assumed that the user is distant from the image forming apparatus 20 by 0.5 m, the user holds the mobile terminal in his or her hands, the signal strength may be −58 dB, if the user has the mobile terminal in a front pocket, the signal strength may be −62 dB, and if the user has the mobile terminal in a rear pocket, the signal strength may be −76.5 dB. Thus, if whether the mobile terminal 10 is close to the image forming apparatus 20 is determined according to a same received signal strength, when a user holds the mobile terminal 10 in his or her hands, the mobile terminal 10 may determine that the mobile terminal 10 is close to the image forming apparatus 20, and when the user has the mobile terminal 10 in a rear pocket, the mobile terminal 10 may determine that the mobile terminal 10 is distant from the image forming apparatus 20.

Accordingly, the mobile terminal 10 cannot determine whether the mobile terminal 10 is close to the image forming apparatus 20, according to only the signal strength (the RSSI value) and additional information.

The mobile terminal 10 may divide areas into three areas of a working area 70, a shadow area 71, and a leaving area 72, according to the approximate distance from the image forming apparatus 20, based on the received signal strength of the received packet.

For example, the working area 70 indicates an area in which an approximate distance between the mobile terminal 10 and the image forming apparatus 20 is less than 0.5 m, and when the mobile terminal 10 is positioned in the working area 70, the mobile terminal 10 may transmit a connection request to the image forming apparatus 20, and if connected with the image forming apparatus 20, the mobile terminal 10 may operate a function that is pre-defined with respect to the image forming apparatus 20.

The leaving area 72 indicates an area in which an approximate distance between the mobile terminal 10 and the image forming apparatus 20 is greater than approximately 2 m, and when the mobile terminal 10 is positioned in the leaving area 72, the mobile terminal 10 may be distant from the image forming apparatus 20 and thus may not be connected with the image forming apparatus 20, and may not operate the function that is pre-defined with respect to the image forming apparatus 20.

The shadow area 71 indicates an area in which an approximate distance between the mobile terminal 10 and the image forming apparatus 20 is between the working area 70 and the leaving area 72, and when the mobile terminal 10 is positioned in the shadow area 71, the mobile terminal 10 may not determine whether the mobile terminal 10 is close to the image forming apparatus 20.

The mobile terminal 10 may determine each of the areas by determining the approximate distances between the mobile terminal 10 and the image forming apparatus 20 by using the received signal strength of the received packet. A received signal strength of a packet (an advertising packet) received in the working area 70 has a greatest value, a received signal strength of a packet (an advertising packet) received in the leaving area 72 has a smallest value, and a received signal strength of a packet (an advertising packet) received in the shadow area 71 has a value between the greatest value of the working area 70 and the smallest value of the leaving area 72.

In more detail, when the mobile terminal 10 approaches the image forming apparatus 20, the mobile terminal 10 may determine that the mobile terminal 10 has entered the working area 70 based on conditions described below.

When a signal strength (an RSSI value) of a packet (an advertising packet) received from the image forming apparatus 20 is greater than a preset value, the number of times that the signal strength is sequentially detected is greater than a preset number of times, and such a status is maintained during a predetermined time period, the mobile terminal 10 may determine that the mobile terminal 10 has entered the working area 70. In order to determine whether the mobile terminal 10 has entered the working area 70, information such as a first RSSI value, a first detecting count, and a first staying time may be used.

Here, the first RSSI value is a preset received signal strength value (an RSSI value) for the working area 70, and in this regard, the mobile terminal 10 may determine whether a signal strength of a received packet is equal to or greater than the first RSSI value and thus may determine whether the mobile terminal 10 is in the working area 70.

The first detecting count is a preset count for the working area 70, and in this regard, the mobile terminal 10 may determine whether the number of times that packets whose received signal strengths are equal to or greater than the first RSSI value are sequentially detected is equal to or greater than the first detecting count, and thus may determine whether the mobile terminal 10 is in the working area 70.

The first staying time means a time period in which the first RSSI value and the first detecting count are continuously satisfied for the working area 70. The mobile terminal 10 may determine whether a status in which the number of times that the packets whose received signal strengths are equal to or greater than the first RSSI value are sequentially detected is equal to or greater than the first detecting count is continuously maintained during 1 sec., and thus, may determine whether the mobile terminal 10 is in the working area 70.

For example, when the first RSSI value is −56 dB, the first detecting count is 2, and the first staying time is 1 sec., if the number of times that packets whose received signal strengths are equal to or greater than −56 dB and are received from the image forming apparatus 20 is equal to or greater than 2, and this status is maintained during 1 sec., the mobile terminal 10 may determine that the mobile terminal 10 is in the working area 70. In more detail, if packets with signal strengths of −56 dB, −55 dB, and −57 dB were sequentially received during 1 sec., the received signal strengths of the first two packets are both equal to or greater than −56 dB and thus satisfy the conditions, but afterward, the packet with the signal strength of −57 dB was received, and this means that the packet with the received signal strength equal to or less than −56 dB was received, so that the status in which the number of consecutively detected packets is equal to or greater than 2 is not continuously maintained. Therefore, since the mobile terminal 10 does not continuously satisfy the first received signal strength and the first detecting count during 1 second, the mobile terminal 10 does not determine that the mobile terminal 10 is in the working area 70.

When the mobile terminal 10 becomes distant from the image forming apparatus 20, the mobile terminal 10 may determine that the mobile terminal 10 has entered the leaving area 72 based on conditions below.

When signal strengths (RSSI values) of packets (advertising packets) received from the image forming apparatus 20 are less than a preset value, the number of times the packets (the advertising packets) are sequentially detected is equal to or greater than a preset count, and such a status is maintained during at least predetermined time period, the mobile terminal 10 may determine that the mobile terminal 10 is in the leaving area 72. In order to determine whether the mobile terminal 10 is in the leaving area 72, information such as a second RSSI value, a second detecting count, and a second staying time may be used.

Here, the second RSSI value indicates a preset received signal strength for the leaving area 72, and the mobile terminal 10 may determine whether received signal strengths of the received advertising packets are equal to or less than the second RSSI value, and thus, may determine whether the mobile terminal 10 is in the leaving area 72.

The second detecting count indicates a preset count for the leaving area 72, and the mobile terminal 10 may determine whether the number of times the packets (the advertising packets), whose received signal strengths are equal to or less than the second RSSI value, are sequentially detected is equal to or greater than the second detecting count, and thus, may determine whether the mobile terminal 10 is in the leaving area 72.

The second staying time indicates a time period in which the second RSSI value and the second detecting count are continuously satisfied for the leaving area 72. The mobile terminal 10 may determine whether a status in which the number of times the packets (the advertising packets), whose received signal strengths are equal to or less than the second RSSI value, are sequentially detected is equal to or greater than the second detecting count is continuously satisfied during the second staying time, and thus, may determine whether the mobile terminal 10 is in the leaving area 72.

For example, in a case where the second RSSI value is −65 dB, the second detecting count is 2, and the second staying time is 2 sec., when the number of times packets, which are received from the image forming apparatus 20 and whose received signal strengths are equal to or less than −65 dB, are sequentially detected is 2, and such a status is maintained during 1 sec., the mobile terminal 10 may determine that the mobile terminal 10 is in the leaving area 72. In more detail, if the packets with signal strengths of −65 dB, −66 dB, and −64 dB were sequentially received during 2 sec., the received signal strengths of the first two packets are all equal to or less than −65 dB and thus satisfy the conditions, but afterward, the packet with the signal strength of −64 dB was received, and this means that the packet with the received signal strength equal to or greater than −64 dB was received, so that the condition in which the number of consecutively detected packets is equal to or greater than 2 is not satisfied. Therefore, since the mobile terminal 10 does not continuously satisfy the second received signal strength and the second detecting count during 2 sec., the mobile terminal 10 does not determine that the mobile terminal 10 is in the leaving area 72.

Meanwhile, the first received signal strength, the first detecting count, the first staying time, the second received signal strength, the second detecting count, and the second staying time may be previously set by a user input by using the mobile terminal 10. Detailed descriptions thereof are provided below with reference to FIG. 7C.

Figure 7C:
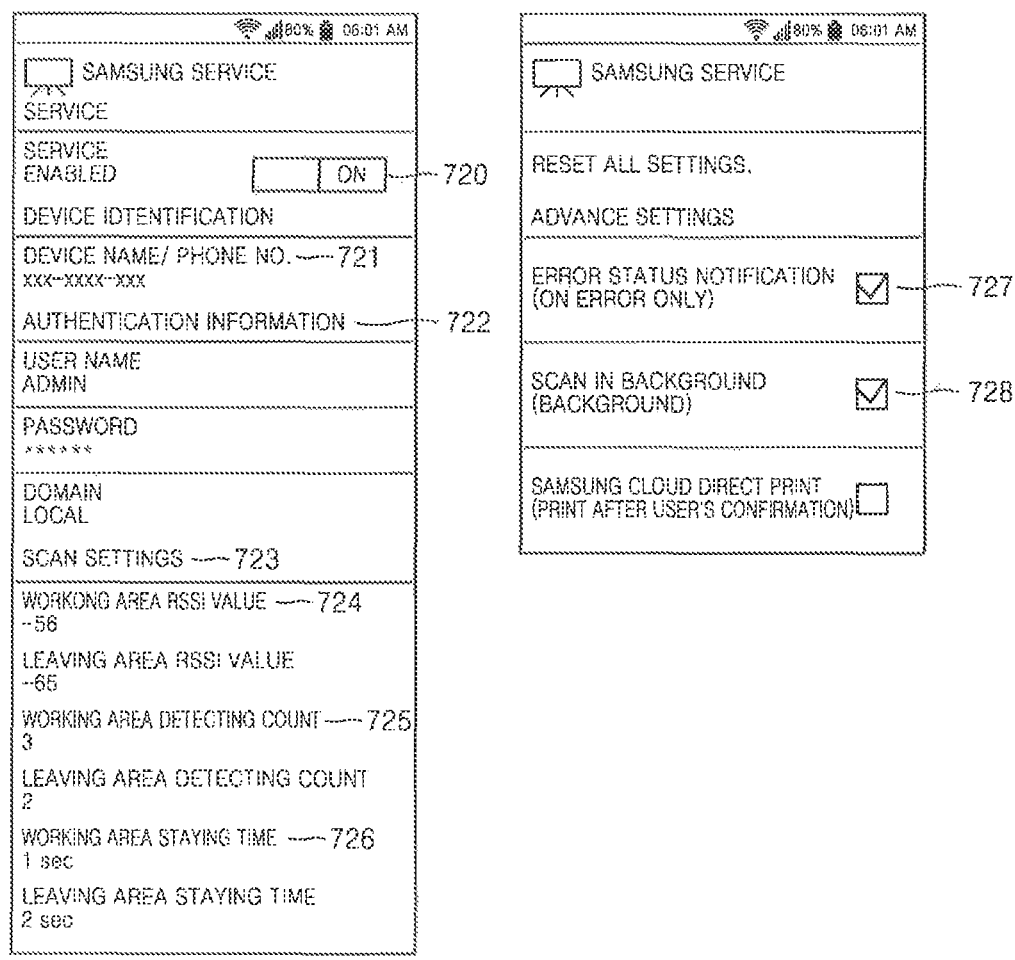
FIG. 7C illustrates a user interface of the mobile terminal for setting a signal strength, a sequentially-detecting count, and a time in which the signal strength and the sequentially-detecting count are continuously satisfied for each of areas shown in FIG. 7B, according to an embodiment.

FIG. 7C illustrates a user interface of the mobile terminal 10 for setting a received signal strength, a sequentially-detecting count, and a time in which the received signal strength and the sequentially-detecting count are continuously satisfied for each of the areas shown in FIG. 7B, according to an embodiment.

A background application provides various user-settable items. A user may previously set the various items and may store them in the mobile terminal 10.

Referring to FIG. 7C, the background application executed by the mobile terminal 10 provides a user interface for providing the various items.

First, a user may set an option item 720 indicating whether to be provided a service by using preset communication (e.g., BLE communication). In this regard, the service to be provided by using the preset communication (e.g., the BLE communication) means a service of receiving required information from the image forming apparatus 20, or transmitting a request to the image forming apparatus 20 and thus allowing the image forming apparatus 20 to perform a task, by using the preset communication (e.g., the BLE communication).

Also, the user may input device identification information to a device identification information item 721.

Since the mobile terminal 10 stores identification information of the mobile terminal 10 in a USIM chip or the like, the mobile terminal 10 may extract the identification information from the USIM chip and may automatically input the identification information to the device identification information item 721, but the user may arbitrarily set the identification information.

The user may input, to an authentication information item 722, information (user 1D/password) that is required for the image forming apparatus 20 to perform user authentication. An authentication domain may also be additionally input.

A scan setting item 723 is an item for previously setting a plurality of pieces of information required to determine each of areas related to the image forming apparatus 20. The user may previously set, via the scan setting item 723, a received signal strength 724 for each area, a sequentially detecting count 725 for each area, and a time period 726 in which the signal strength 724 and the detecting count 725 are continuously satisfied.

The user may set, via an error status notification item 727, whether an error notification will be shown to the user only when an error occurs, or whether a notification will always be shown to the user when the user passes through a set area.

The user may select, via a background scan item 728, whether to perform a scan task in the image forming apparatus 20 by using a background scan application or by using a mobile print application where the user may perform scan setting.

If content is stored in a cloud print server, the user may select, via a cloud direct print item 729, whether the image forming apparatus 20 automatically prints the stored content, or whether the image forming apparatus 20 prints the stored content after the image forming apparatus 20 receives a user's confirmation by using the mobile terminal 10.

Figure 7D:
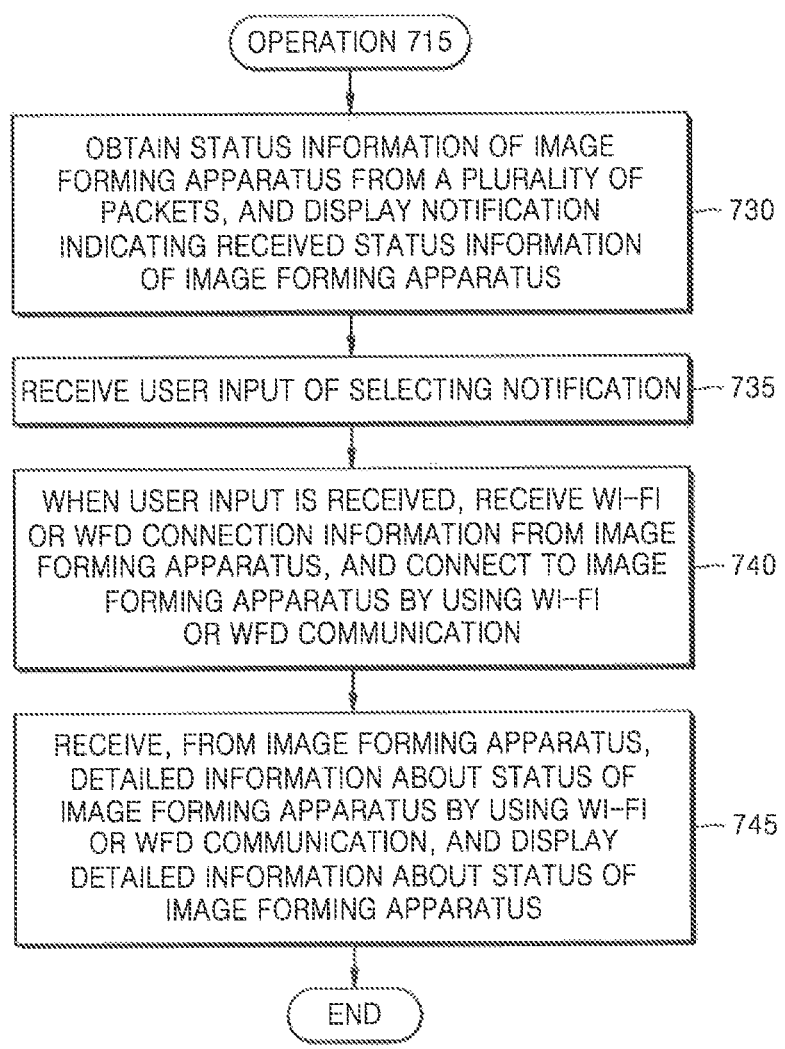
FIG. 7D is a flowchart of a method of performing an operation, the method performed by the mobile terminal, according to an embodiment.

FIG. 7D is a flowchart of a method of performing an operation, the method performed by the mobile terminal, according to an embodiment.

In operation 730, the mobile terminal 10 may obtain status information of the image forming apparatus 20 from a plurality of packets (advertising packets), and may display a notification indicating the received status information of the image forming apparatus 20. A user may check a status of the image forming apparatus 20 via the displayed notification.

In operation 735, the mobile terminal 10 may receive a user input of selecting the notification.

In operation 740, when the mobile terminal 10 receives the user input, the mobile terminal 10 may receive Wi-Fi or WFD connection information from the image forming apparatus 20 and may connect to the image forming apparatus 20 by using Wi-Fi or WFD communication. In more detail, the mobile terminal 10 may transmit a request of the Wi-Fi or WFD connection information to the image forming apparatus 20, and when the mobile terminal 10 receives the Wi-Fi or WFD connection information from the image forming apparatus 20, the mobile terminal 10 may connect to the image forming apparatus 20 by using the Wi-Fi or WFD communication, based on the received Wi-Fi or WFD connection information.

In operation 745, the mobile terminal 10 may receive, from the image forming apparatus 20, detailed information about the status of the image forming apparatus 20 by using the Wi-Fi or WFD communication, and may display the detailed information about the status information of the image forming apparatus 20.

As described above, the mobile terminal 10 obtains the status information of the image forming apparatus 20 from the plurality of packets (the advertising packets) that are received from the image forming apparatus 20, but one or more embodiments are not limited thereto, and in operation 715, when the mobile terminal 10 is connected to the image forming apparatus 20, the mobile terminal 10 may request the image forming apparatus 20 for the status information of the image forming apparatus 20 and may receive the status information of the image forming apparatus 20 from the image forming apparatus 20, via the connection.

FIG. 7E illustrates a procedure in which, when a user carrying the mobile terminal approaches the image forming apparatus, the mobile terminal provides a notification about a status of the image forming apparatus, according to an embodiment.

Referring to FIG. 7E, the user carrying the mobile terminal 10 approaches the image forming apparatus 20.

When an error or a warning occurs, the image forming apparatus 20 may detect a status such as the error or the warning of the image forming apparatus 20, may include status information of the image forming apparatus 20, which includes the detected status of the image forming apparatus 20, in a packet (an advertising packet), and periodically broadcasts the packet (the advertising packet) including the status information of the image forming apparatus 20.

When the mobile terminal 10 approaches the image forming apparatus 20, the image forming apparatus 20 receives the packet (the advertising packet) that is broadcasted from the image forming apparatus 20, and determines, based on this, whether the mobile terminal 10 is in a working area. When the mobile terminal 10 determines that the mobile terminal 10 is in the working area, the mobile terminal 10 may analyze the packet (the advertising packet) received from the image forming apparatus 20 and may obtain the status information of the image forming apparatus 20.

The mobile terminal 10 notifies the user of the obtained status information of the image forming apparatus 20 by using a notification bar 750.

For example, the mobile terminal 10 may obtain, from the packet (the advertising packet) of the image forming apparatus 20, the status information of the image forming apparatus 20 that includes a current toner status 751 and a status 752 of the image forming apparatus 20, and may display, on the notification bar 750, the current toner status 751 and the status 752 of the image forming apparatus 20.

The user may check, from the notification bar 750, the status information of the image forming apparatus 20 from the image forming apparatus 20, without performing a separate operation.

When the user selects, from the notification bar 750, a notification check button 753 about the status of the image forming apparatus 20, the mobile terminal 10 may execute a separate application for checking detailed status information, or may execute a web browser for details of the status information of the image forming apparatus 20.

When the user selects the notification check button 753 about the status of the image forming apparatus 20, the mobile terminal 10 may request the image forming apparatus 20 for Wi-Fi or WFD connection information by using preset communication (e.g., BLE communication), and the image forming apparatus 20 transmits the Wi-Fi or WFD connection information to the mobile terminal 10. The mobile terminal 10 may connect to the image forming apparatus 20 by using Wi-Fi or WFD communication, based on the Wi-Fi or WFD connection information received from the image forming apparatus 20.

In this regard, the mobile terminal 10 may display a message 754 indicating that Wi-Fi or WFD connection to the image forming apparatus 20 is being performed.

After the mobile terminal 10 is connected to the image forming apparatus 20 by using the Wi-Fi or WFD communication, the mobile terminal 10 may display a mobile smart panel screen 755. The mobile terminal 10 may receive, from the image forming apparatus 20, detailed information about the status of the image forming apparatus 20 by using the Wi-Fi or WFD communication, and may display the detailed information (input tray information and a troubleshooting guide about the status of the image forming apparatus 20) about the status of the image forming apparatus 20.

With reference to FIG. 7E, it is described that the mobile terminal 10 notifies the user about the status information of the image forming apparatus by using the notification bar 750, however, the present embodiment is not limited thereto and it is obvious to one of ordinary skill in the art that the mobile terminal 10 may display, in the form of a pop-up, status information of the image forming apparatus, e.g., information about consumables. Here, the mobile terminal 10 may also display vendor information with respect to the consumables such as a toner to be installed in the image forming apparatus. For example, the mobile terminal 10 may display both the information about consumables and an icon indicating a telephone number of a vendor with respect to the consumables such as a toner, and when a user selects the displayed icon, the mobile terminal 10 may phone-connect to the telephone number of the vendor with respect to the consumables. Alternatively, the mobile terminal 10 may not always display the vendor information with respect to the consumables, and when the mobile terminal 10 determines that it is require to change the consumables with respect to the image forming apparatus, based on the received status information of the image forming apparatus, the mobile terminal 10 may display the vendor information.

FIG. 7F is a flowchart of a procedure in which the mobile terminal provides a notification about a status of the image forming apparatus, according to an embodiment.

Referring to FIG. 7F, in operation 760, the mobile terminal 10 receives a packet (an advertising packet) that is broadcasted from the image forming apparatus 20. The mobile terminal 10 discovers the image forming apparatus 20.

In operation 761, the mobile terminal 10 determines whether the mobile terminal 10 is in a working area, based on a received signal strength of the received packet (the advertising packet). For example, when the received signal strength of the received packet is greater than a predetermined threshold value, the mobile terminal 10 may determine that the mobile terminal 10 is in the working area.

Here, the working area may mean an area within an approximate distance from the image forming apparatus, in which the user carrying the mobile terminal 10 may manipulate the image forming apparatus 20. The received signal strength may have an approximate value at a distance from the image forming apparatus. The received signal strength may vary according to a type and a carried position of the mobile terminal, and in general, the received signal strength may be inverse-proportional to a distance, that is, the received signal strength is decreased while the distance from the image forming apparatus is increased. Therefore, the mobile terminal 10 may previously determine an approximate value of the received signal strength by taking into account the distance from the image forming apparatus. For example, in a case where it is experimentally set that, when a distance from the image forming apparatus 20 is approximately 5 m, a received signal strength is about −56 dB, the mobile terminal 10 may determine the predetermined threshold value as −56 dB. Here, the predetermined threshold value may be a value greater than a communication-enabled minimum received signal strength.

An approximate distance corresponding to the communication-enabled minimum received signal strength may be significantly distant from the image forming apparatus 20, and when the mobile terminal 10 receives a packet having a received signal strength greater than the communication-enabled minimum received signal strength, the mobile terminal 10 may be connected to the image forming apparatus 20 but the user carrying the mobile terminal 10 cannot manipulate the image forming apparatus 20.

Therefore, the mobile terminal 10 may set the approximate distance corresponding to the predetermined threshold value to be sufficiently close from the image forming apparatus 20 by determining the predetermined threshold value to be greater than the communication-enabled minimum received signal strength, so that the mobile terminal 10 may be connected to the image forming apparatus 20 when the user carrying the mobile terminal 10 is located within a distance where the user can manipulate the image forming apparatus 20.

However, one or more embodiments are not limited thereto, and the mobile terminal 10 may determine the predetermined threshold value by performing calibration with respect to the image forming apparatus 20.

In addition, the mobile terminal 10 may determine whether the mobile terminal 10 is in the working area, based on the received signal strength of the received packet and additional information. The description with respect to that the mobile terminal 10 determines whether the mobile terminal 10 is in the working area, based on the received signal strength of the received packet and the additional information is provided with reference to FIG. 7B.

In operation 762, if the mobile terminal 10 determines that the image forming apparatus 20 that supports preset communication (e.g., BLE communication) is in the working area, the mobile terminal 10 checks the advertising packet, obtains status information of the image forming apparatus from the packet (the advertising packet), and checks, based on the obtained status information, whether the image forming apparatus has an error status or the status information is different from previously-obtained status information.

In operation 763, if the status information obtained from the packet (the advertising packet) indicates that the image forming apparatus 20 has the error status or is different from the previously-obtained status information, the mobile terminal 10 shows a user of a notification about a status of the image forming apparatus 20, based on the obtained status information.

Referring to FIG. 7F, in operation 770, the mobile terminal 10 receives a user input of selecting the displayed notification about the status of the image forming apparatus 20.

In operation 771, when the mobile terminal 10 receives the user input of selecting the notification about the status of the image forming apparatus 20, the mobile terminal 10 determines whether the mobile terminal 10 and the image forming apparatus 20 are in a same network. For example, the mobile terminal 10 determines whether the mobile terminal 10 and the image forming apparatus 20 are connected to a same AP by using Wi-Fi communication, and thus, are in a same network.

When the mobile terminal 10 determines that the mobile terminal 10 and the image forming apparatus 20 are in the same network, the mobile terminal 10 may request the image forming apparatus 20 for Wi-Fi connection information of the image forming apparatus 20, e.g., an IP address of the image forming apparatus 20, and may receive the Wi-Fi connection information from the image forming apparatus 20.

When the mobile terminal 10 determines that the mobile terminal 10 and the image forming apparatus 20 are not in the same network, in operation 772, the mobile terminal 10 determines whether the image forming apparatus 20 supports WFD communication. In operation 773, the mobile terminal 10 may request the image forming apparatus 20 for WFD connection information by using preset communication (e.g., BLE communication), and may receive the WFD connection information from the image forming apparatus 20.

In operation 774, the mobile terminal 10 transmits Wi-Fi or WFD connection information to a mobile print application so as to execute the mobile print application for displaying explanation about an error and a troubleshooting video of the image forming apparatus 20. When the mobile print application is executed in the mobile terminal 10, the mobile terminal 10 may be connected to the image forming apparatus 20 by using Wi-Fi or WFD) communication, and may receive detailed status information of the image forming apparatus 20 via connection using the WFD communication.

Figure 7G:
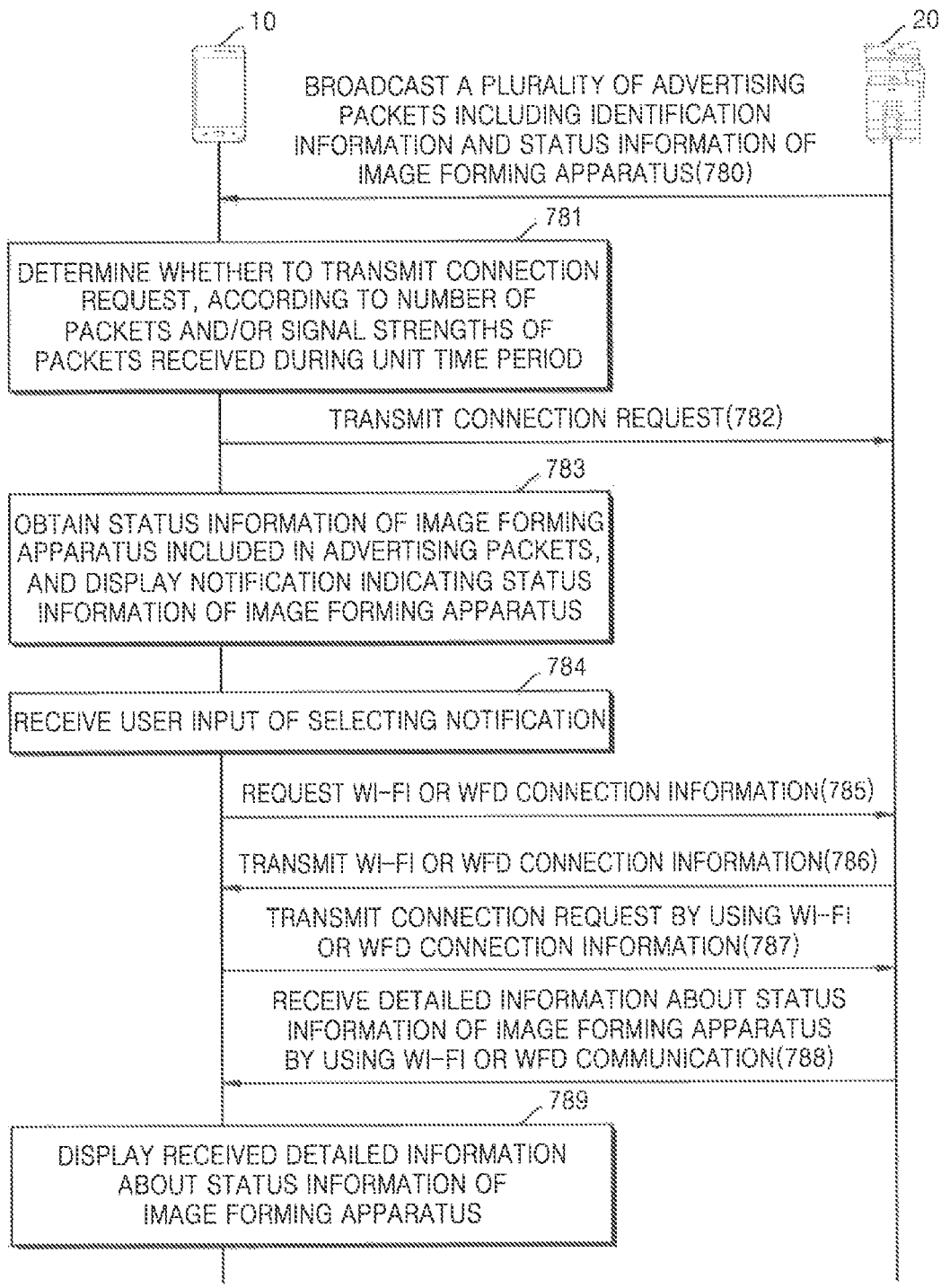
FIG. 7G is a flowchart of a method of performing an operation by using wireless communication when the mobile terminal approaches the image forming apparatus, the method performed by the mobile terminal, according to an embodiment.

FIG. 7G is a flowchart of a method of performing an operation by using wireless communication when the mobile terminal approaches the image forming apparatus, the method performed by the mobile terminal, according to an embodiment.

Referring to FIG. 7G, in operation 780, the image forming apparatus 20 broadcasts a plurality of packets (advertising packets) including identification information and status information of the image forming apparatus 20. The mobile terminal 10 receives the plurality of packets (the advertising packets) from the image forming apparatus 20.

In operation 781, the mobile terminal 10 may determine whether to transmit a connection request, according to the number of packets (advertising packets) and/or signal strengths of the packets (the advertising packets) that are received during a unit time period.

In operation 782, the mobile terminal 10 may transmit the connection request to the image forming apparatus 20, based on a result of determining whether to transmit the connection request in operation 781.

In operation 783, the mobile terminal 10 may obtain the status information of the image forming apparatus 20 included in the received packets (the advertising packets), and may display a notification indicating the status information of the image forming apparatus 20.

In operation 784, the mobile terminal 10 may receive, from a user, a user input of selecting the notification.

In operation 785, the mobile terminal 10 may request the image forming apparatus 20 for Wi-Fi or WFD connection information. In this regard, when the mobile terminal 10 is connected to the image forming apparatus 20, base on the connection request transmitted from the mobile terminal 10 in operation 782, the mobile terminal 10 may request the image forming apparatus 20 for the Wi-Fi or WFD connection information.

In operation 786, when the image forming apparatus 20 receives a request for the Wi-Fi or WFD connection information from the mobile terminal 10, the image forming apparatus 20 may transmit, in response to the request, the Wi-Fi or WFD connection information to the mobile terminal 10.

In operation 787, the mobile terminal 10 may transmit a connection request to the image forming apparatus 20 by using the Wi-Fi or WFD connection information received from the image forming apparatus 20. When the image forming apparatus 20 receives the connection request from the mobile terminal 10, the image forming apparatus 20 may connect to the mobile terminal by using Wi-Fi or WFD communication.

In operation 788, the mobile terminal 10 may receive detailed information about the status information of the image forming apparatus 20 from the image forming apparatus 20 by using the Wi-Fi or WFD communication.

In operation 789, the mobile terminal 10 may display the received detailed information about the status information of the image forming apparatus 20.

Figure 8A:
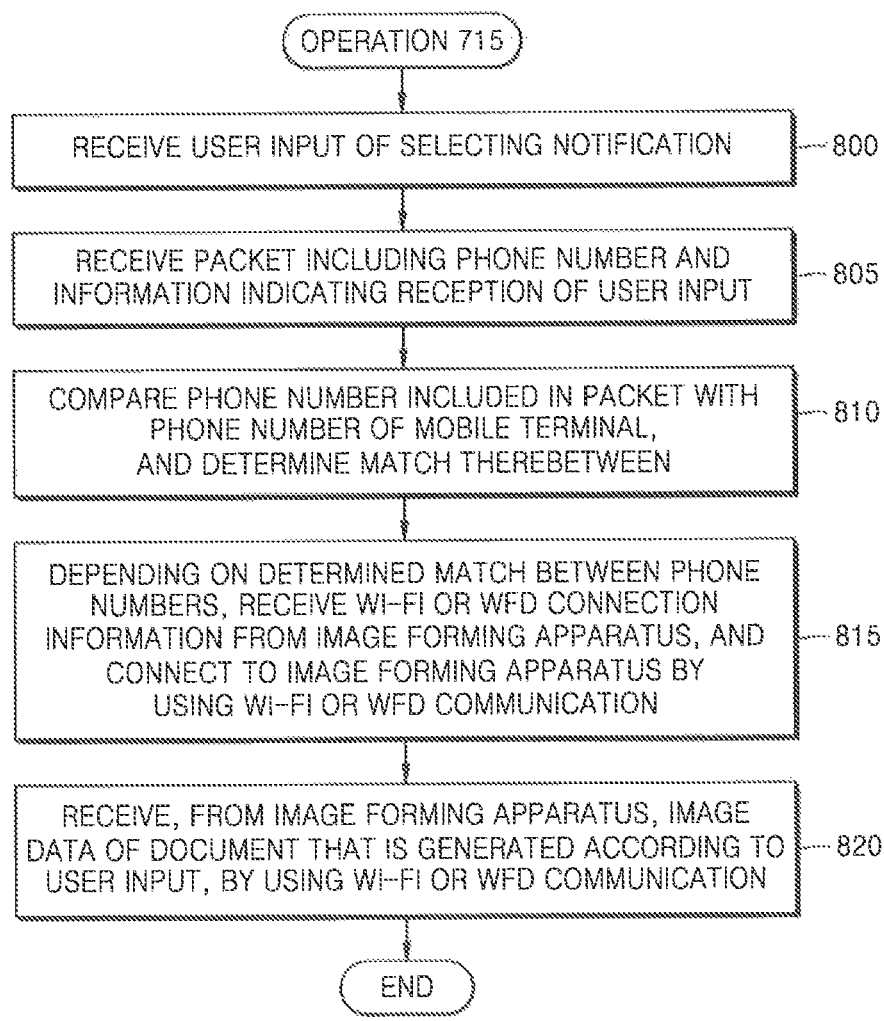
FIG. 8A is a flowchart of an operating method of the mobile terminal, according to another embodiment.

FIG. 8A is a flowchart of an operating method of the mobile terminal, according to an embodiment.

In operation 800, when the mobile terminal 10 is connected to the image forming apparatus 20 based on the connection request transmitted in operation 715, the mobile terminal 10 may transmit the phone number registration request to the image forming apparatus 20 via the connection.

In operation 805, the mobile terminal 10 may receive a packet (an advertising packet) from the image forming apparatus 20. In this regard, the image forming apparatus 20 may include a phone number in the packet (the advertising packet), according to the phone number registration request from the mobile terminal 10. If the image forming apparatus 20 receives a user input indicating a start of a scan task on a document, according to the phone number registration request, the image forming apparatus 20 may include information indicating reception of the user input in the packet (the advertising packet).

In operation 810, the mobile terminal 10 may compare the phone number included in the packet (the advertising packet) with a phone number of the mobile terminal 10, and may determine whether the phone numbers match each other.

In operation 815, depending on the match between the phone numbers determined in operation 810, the mobile terminal 10 may receive Wi-Fi or WFD connection information from the image forming apparatus 20 and may connect to the image forming apparatus 20 by using Wi-Fi or WFD communication.

In operation 820, the mobile terminal 10 may receive, from the image forming apparatus 20, image data of a document that is generated according to a user input, by using the Wi-Fi or WFD communication.

Figure 8B:
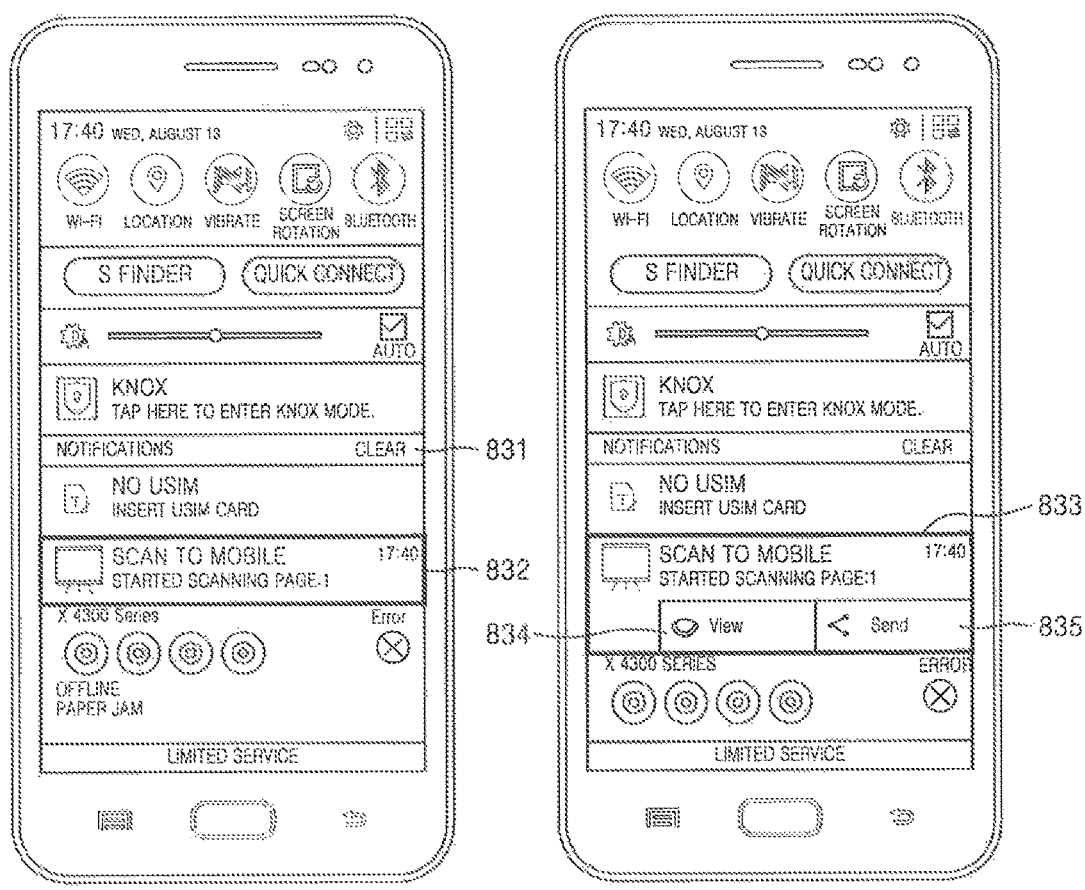
FIG. 8B illustrates a procedure in which, when a background scan service application is performed in the mobile terminal, status information of the image forming apparatus is provided as a notification to the mobile terminal while a scan task is performed in the image forming apparatus, according to an embodiment.

FIG. 8B illustrates a procedure in which, when a background scan service application is performed in the mobile terminal, status information of the image forming apparatus is provided as a notification to the mobile terminal while a scan task is performed in the image forming apparatus, according to an embodiment.

Referring to FIG. 8B, it is assumed that a user has executed a background application by using the mobile terminal 10. The mobile terminal 10 may determine whether to transmit a connection request, based on a plurality of packets (advertising packets) received from the image forming apparatus 20, may transmit the connection request to the image forming apparatus 20, depending on a result of determining whether to transmit the connection request, and may be connected to the image forming apparatus 20.

The background application of the mobile terminal 10 may transmit a phone number registration request to the image forming apparatus 20 by using preset communication (e.g., BLE communication). Here, the background application may transmit the phone number registration request by an interval of 10 sec., by using the preset communication (e.g., the BLE communication). This is performed to check whether a user carrying the mobile terminal 10 is away from the image forming apparatus 20.

The image forming apparatus 20 may display a phone number of the mobile terminal 10 on a display panel of the image forming apparatus 20.

When the user selects a Scan to Mobile button in the image forming apparatus 20, the image forming apparatus 20 may update a phone number included in a packet (an advertising packet). The image forming apparatus 20 may periodically broadcast the updated packet (the advertising packet).

The background application of the mobile terminal 10 receives the updated packet (the advertising packet) from the image forming apparatus 20, and obtains the phone number from the updated packet (the advertising packet). The background application of the mobile terminal 10 checks whether the phone number from the updated packet (the advertising packet) matches with a phone number of the mobile terminal 10. If matched, the background application of the mobile terminal 10 requests the image forming apparatus 20 for a confirmation command. When the image forming apparatus 20 receives the request for the confirmation command from the mobile terminal 10, the image forming apparatus 20 transmits the confirmation command indicating a scan task is started soon to the mobile terminal 10, by using the preset communication (e.g., the BLE communication).

The background application of the mobile terminal 10 requests the image forming apparatus 20 for Wi-Fi or WFD connection information by using communication (e.g., the BLE communication).

When the image forming apparatus 20 receives the Wi-Fi or WFD connection information from the mobile terminal 10, the image forming apparatus 20 transmits the Wi-Fi or WFD connection information to the mobile terminal 10.

When the background application of the mobile terminal 10 receives the Wi-Fi or WFD connection information from the image forming apparatus 20, the background application of the mobile terminal 10 executes the background scan service application, and transmits the Wi-Fi or WFD connection information to the background scan service application. The background scan service application connects the mobile terminal 10 to the image forming apparatus 20 by using Wi-Fi or WFD communication, according to the Wi-Fi or WFD connection information.

The background scan service application of the mobile terminal 10 may display a scanning procedure status on the mobile terminal 10 by using a notification 831. The background scan service application may receive the scanning procedure status from the image forming apparatus 20, by using the Wi-Fi or WFD communication. For example, the mobile terminal 10 may display a notification 833 indicating a scanning procedure status 832 showing that a first page is being scanned. When the image forming apparatus 20 completes performing the scan task on the document, the mobile terminal 10 may display the notification 833 indicating completion of the scan task. Here, the notification 833 may display both a View button 834 and a Send button 835. When the user selects the View button 834, the user may view image data received from the image forming apparatus 20. When the user selects the Send button 835, the mobile terminal 10 may transmit the image data via an email or a messenger. In more detail, when the user selects the Send button 835, all applications capable of transmitting the image data may be displayed.

Figure 8C:
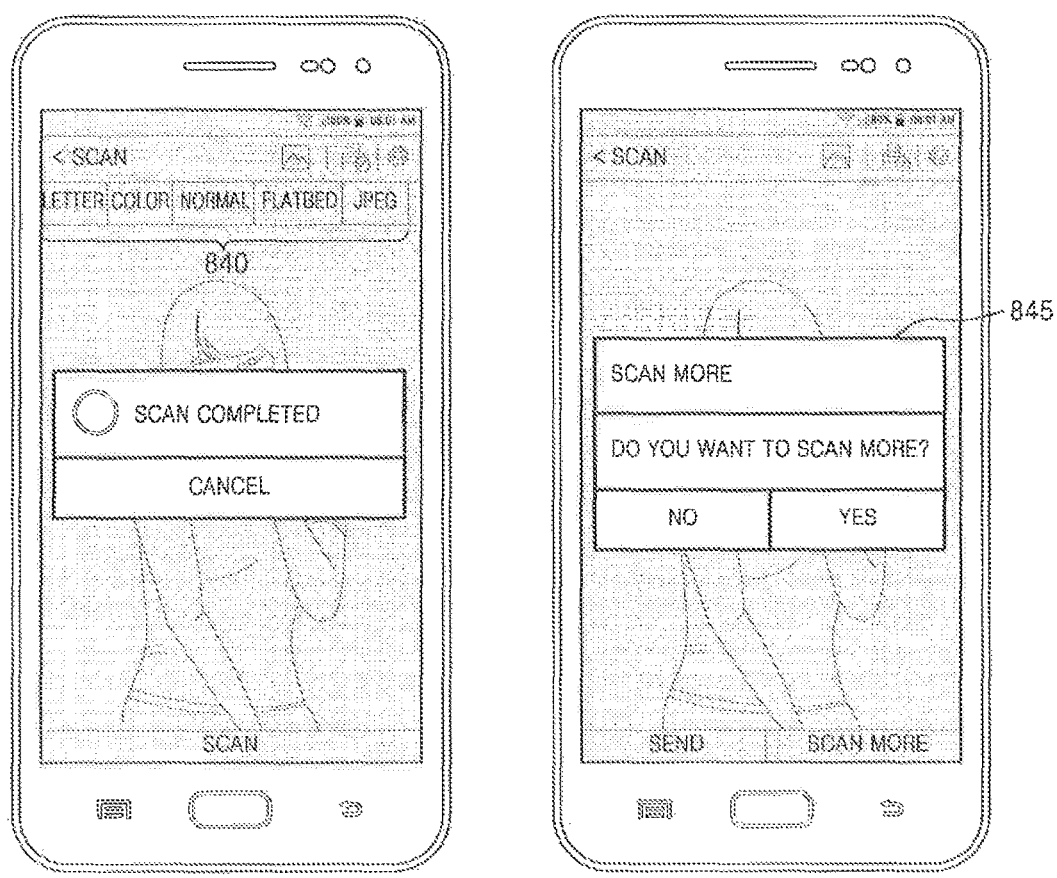
FIG. 8C illustrates a procedure in which, when a mobile print application is executed in the mobile terminal, the image forming apparatus performs a scan task on a document by using the mobile print application, according to an embodiment.

FIG. 8C illustrates a procedure in which, when a mobile print application is executed in the mobile terminal, the image forming apparatus performs a scan task on a document by using the mobile print application, according to an embodiment.

A procedure before the background application of the mobile terminal 10 executes the mobile print application is the same as the procedure before the background application of the mobile terminal 10 executes the background scan service application, which was described with reference to FIG. 8B, thus, detailed descriptions thereof are omitted here.

Referring to FIG. 8C, when the background application executes the mobile print application, a user may change scan settings (a size, a color/monochrome scan, a scan position, and a scanned file format), may preview image data, or may scan several pages from a flatbed, by using the mobile print application.

Referring to a left diagram of FIG. 8C, the user may set various scan options 840 by using the mobile print application, the mobile terminal 10 may transmit the set scan options 840 to the image forming apparatus 20, and the image forming apparatus 20 may perform a scan task according to the transmitted scan options 840.

Referring to a right diagram of FIG. 8C, the mobile terminal 10 displays a message 845 indicating whether to further perform a scan task, after one page is scanned from the flatbed by using the mobile print application. The user may select to further perform the scan task and may scan several pages by using the mobile print application.

Figure 8D:
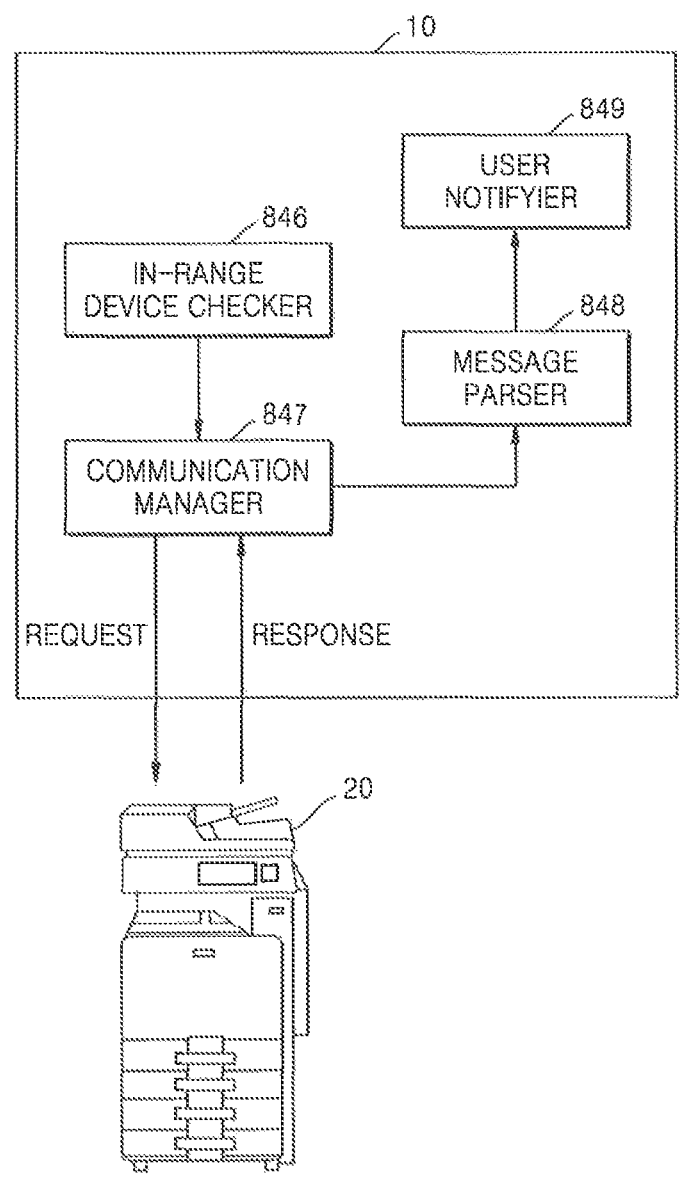
FIG. 8D illustrates a procedure in which an operation is performed by the background application executed in the mobile terminal, according to an embodiment.

FIG. 8D illustrates a procedure in which an operation is performed by the background application executed in the mobile terminal, according to an embodiment.

Referring to FIG. 8D, the mobile terminal 10 periodically receives a packet (an advertising packet) that is periodically broadcasted from the image forming apparatus 20.

Referring to FIG. 8D, the mobile terminal 10 periodically determines whether the image forming apparatus 20 that supports preset communication (e.g., BLE communication) is close to the mobile terminal 10. An in-range device checker 846 receives the packet (the advertising packet) from the image forming apparatus 20 and determines, based on a received signal strength of the received packet, whether the image forming apparatus 20 is close to the mobile terminal 10. If the in-range device checker 846 determines that the image forming apparatus 20 is close to the mobile terminal 10, the in-range device checker 846 adds the image forming apparatus 20 to an in-range device list so as to connect to the image forming apparatus 20 by using the preset communication (e.g., the BLE communication).

If the mobile terminal 10 determines that the mobile terminal 10 becomes distant from the image forming apparatus 20 that supports the preset communication (e.g., the BLE communication), the mobile terminal 10 may delete the image forming apparatus 20 from the in-range device list.

The mobile terminal 10 may extract a feature flag from the packet (the advertising packet) received from the image forming apparatus 20, and may add a message to a message queue, based on the extracted feature flag. For example, if an extracted authentication flag indicates ON, the mobile terminal 10 may add an authentication request message to the message queue so as to transmit the authentication request message to the image forming apparatus 20. If an extracted flag indicating that a scan to mobile function is supported indicates ON, the mobile terminal 10 may add a phone number registration request message to the message queue so as to transmit the phone number registration request message.

If an extracted flag indicating that a scan button is selected in the image forming apparatus 20 indicates ON, the mobile terminal 10 may add a connection information request message to the message queue so as to transmit the connection information request message to the image forming apparatus 20. The message queue transmits messages to a communication manager 847, in an order according to the messages are received. The communication manager 847 may control the network interface 410 to transmit the messages to the image forming apparatus 20.

When the mobile terminal 10 receives a response to the requested message from the image forming apparatus 20, the mobile terminal 10 may control a message parser 848 to parse the response, and if status information of the image forming apparatus 20 is received, according to the parsed response, the mobile terminal 10 may control a user notifier 849 to display a notification to the user. If Wi-Fi or WFD connection information is received from the image forming apparatus 20, the mobile terminal 10 may transmit the Wi-Fi or WFD connection information to an executed application such as a mobile print application or a cloud print application, and the executed application may perform a function related to the image forming apparatus 20 by using Wi-Fi or WFD communication.

Figure 8E:
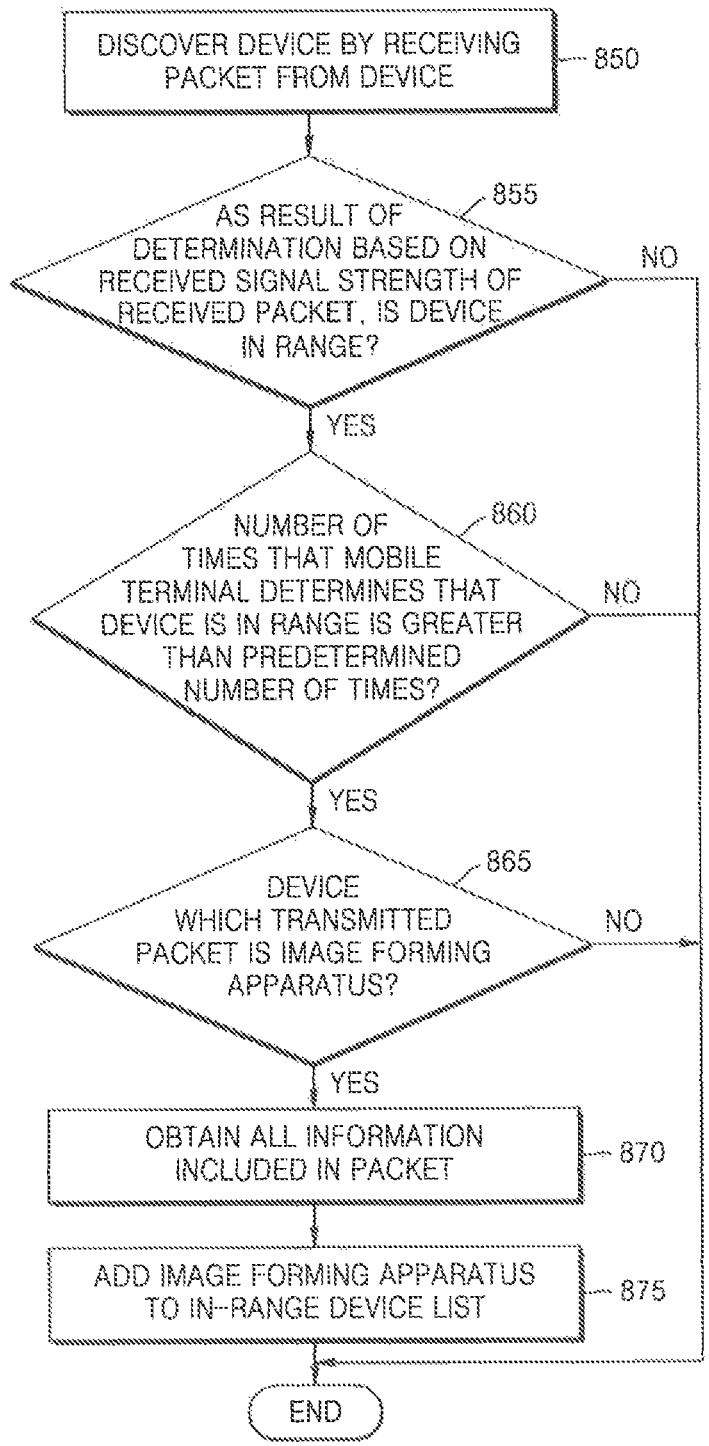
FIG. 8E is a flowchart illustrating a procedure in which a background application executed in the mobile terminal adds, to an in-range device list, the image forming apparatus approaching the mobile terminal, and manages the image forming apparatus, according to an embodiment.

FIG. 8E is a flowchart illustrating a procedure in which a background application executed in the mobile terminal adds, to an in-range device list, the image forming apparatus approaching the mobile terminal, and manages the image forming apparatus, according to an embodiment.

Referring to FIG. 8E, in operation 850, the mobile terminal 10 periodically performs a scanning operation so as to discover a device that supports preset communication (e.g., BLE communication). The mobile terminal 10 receives a packet (an advertising packet) from the device, and thus, checks an existence of the device that supports the preset communication (e.g., the BLE communication).

In operation 855, the mobile terminal 10 determines whether the device is in a range, according to a result of determination based on a received signal strength of the received packet (the advertising packet).

In operation 860, if the mobile terminal 10 determines that the device is in the range, the mobile terminal 10 checks whether the number of times that the mobile terminal 10 determines that the device is in the range is greater than the preset number of times.

In operation 860, if the number of times that the mobile terminal 10 determines that the device is in the range is greater than the preset number of times, in operation 865, the mobile terminal 10 checks a header of the packet (the advertising packet). By checking the header, the mobile terminal 10 checks whether a device which transmitted the packet (the advertising packet) to the mobile terminal 10 is the image forming apparatus 20.

In operation 870, if the device which transmitted the packet (the advertising packet) to the mobile terminal 10 is the image forming apparatus 20, the mobile terminal 10 may obtain information included in the packet (the advertising packet).

In operation 875, the mobile terminal 10 may add the image forming apparatus 20 to the in-range device list.

FIG. 9A illustrates an environment of a cloud print system using the mobile terminal, according to an embodiment.

Referring to FIG. 9A, a user 1 carrying the mobile terminal 10 approaches the image forming apparatus 20. The image forming apparatus 20 periodically broadcasts a packet (an advertising packet) including identification information of the image forming apparatus 20.

When the mobile terminal 10 receives the packet (the advertising packet) that is broadcasted from the image forming apparatus 20, the mobile terminal 10 determines whether the mobile terminal 10 approaches the image forming apparatus 20, based on a received signal strength of the packet (the advertising packet) received from the image forming apparatus 20. For example, if the mobile terminal 10 is located outside an area 3, the mobile terminal 10 may determine that the mobile terminal 10 does not approach the image forming apparatus 20, based on the received signal strength of the received packet (the advertising packet). In this case, the mobile terminal 10 may not obtain information from the packet (the advertising packet) received from the image forming apparatus 20, and may not separately transmit a request to a cloud server 30.

For example, if the mobile terminal 10 is located in an area 2, the mobile terminal 10 may determine that the mobile terminal 10 approaches the image forming apparatus 20, based on the received signal strength of the received packet (the advertising packet). In this case, the mobile terminal 10 may receive the packet (the advertising packet) that is received from the image forming apparatus 20 when the user 1 approaches the image forming apparatus 20, and may transmit, to the cloud server 30, the identification information of the image forming apparatus 20 and a request for printing content that is mapped to correspond to the identification information of the image forming apparatus 20 that are included in the received packet (the advertising packet). Here, the identification information of the image forming apparatus 20 may be an MAC address of the image forming apparatus 20.

The cloud server 30 may receive the identification information of the image forming apparatus 20 from the mobile terminal 10, and may determine, based on the identification information of the image forming apparatus 20, the image forming apparatus 20 from among a plurality of image forming apparatuses that are mapped to correspond to a plurality of pieces of identification information (e.g., a phone number) of mobile terminals.

For example, a phone number of the mobile terminal 10 is '010-6462-5961', and a plurality of image forming apparatuses are stored in the cloud server 30 while the image forming apparatuses are mapped to correspond to phone numbers. Here, the image forming apparatuses have unique MAC addresses that are mapped to correspond to the phone numbers, respectively. The cloud server 30 may compare the received MAC address of the image forming apparatus 20 with an MAC address mapped to correspond to the phone number of the mobile terminal 10, and may check a match between the MAC addresses. If matched, the cloud server 30 may transmit the content to the matched image forming apparatus 20 firom among the image fonning apparatuses.

When the image forming apparatus 20 receives the content from the cloud server 30, the image forming apparatus 20 may perform an image forming job on the content. The image forming apparatus 20 may print the content received from the cloud server 30.

With reference to FIG. 9A, it is described that, when the mobile terminal 10 approaches the image forming apparatus 20, the mobile terminal 10 transmits the request for printing content to the cloud server 30, however, the present embodiment is not limited thereto and it is obvious to one of ordinary skill in the art that, when the mobile terminal 10 approaches the image forming apparatus 20, the mobile terminal 10 may transmit various types of requests to the cloud server 30. For example, when the mobile terminal 10 receives an input of a preset command from a user, the mobile terminal 10 stores the input command, and then, when the mobile terminal 10 approaches the image forming apparatus 20, the mobile terminal 10 may transmit the preset command to the cloud server 30.

Alternatively, it may be determined that the mobile terminal 10 transmits a preset request when the mobile terminal 10 approaches the image forming apparatus 20. Here, when the mobile terminal 10 approaches the image forming apparatus 20, the mobile terminal 10 may transmit the preset request, based on the determination. Before transmitting the preset request, the mobile terminal 10 may display a message for confirming the user in whether to transmit the present request, may receive a user input indicating whether to transmit the present request, according to the displayed message, and may transmit the present request to the cloud server 30, according to the received user input.

For example, the mobile terminal 10 may transmit, to the cloud server 30, a firmware update request with respect to the image forming apparatus 20 and identification information of the image forming apparatus, based on the packet (the advertising packet) received from the image forming apparatus 20, and the cloud server 30 may determine one image forming apparatus from among a plurality of image forming apparatuses, based on the received identification information of the image forming apparatus, and may transmit the firmware update request to the determined image forming apparatus 20. The image forming apparatus 20 may perform a firmware update task with respect to the image forming apparatus 20, based on the firmware update request received from the cloud server 30.

FIG. 9B illustrates a procedure in which, when a user carrying the mobile terminal approaches the image forming apparatus, the image forming apparatus outputs content that was uploaded to the cloud server, according to an embodiment.

In operation 901, the image forming apparatus 20 broadcasts a packet (an advertisement packing) including identification information of the image forming apparatus 20. In this regard, the identification information of the image forming apparatus 20 may be an MAC address of the image forming apparatus 20.

It is assumed that the user 1 approaches the image forming apparatus 20 while the user 1 carries the mobile terminal 10.

In operation 902, the background application 11 executed in the mobile terminal 10 receives the packet (the advertising packet) broadcasted from the image forming apparatus 20, and determines whether the mobile terminal 10 approaches the image forming apparatus 20. If the mobile terminal 10 approaches the image forming apparatus 20, the background application 11 obtains, from the packet (the advertising packet), information indicating whether the image forming apparatus 20 supports a cloud print service. In more detail, the background application 11 obtains feature flags from the packet (the advertising packet).

In operation 903, if the obtained information indicates that the cloud print service is supported, the background application 11 may obtain the MAC address of the image forming apparatus 20 from the packet (the advertising packet). In more detail, the background application 11 may obtain the feature flags, may check a flag among the feature flags which indicates whether the image forming apparatus 20 supports the cloud print service, and if the checked flag indicates ON, the background application 11 may obtain the MAC address of the image forming apparatus 20 from the packet (the advertising packet).

In operation 904, the background application 11 may transmit the MAC address of the image forming apparatus 20 to a cloud service application 13. Here, the mobile terminal 10 may execute the cloud service application 13 and may transmit the MAC address of the image forming apparatus 20 to the executed cloud service application 13.

In operation 905, the cloud service application 13 receives the MAC address of the image forming apparatus 20 from the background application 11. The cloud service application 13 may transmit, to the cloud server 30, a request for checking whether content corresponding to identification information of the mobile terminal 10 is uploaded to the cloud server 30.

In operation 906, the cloud service application 13 receives, from the cloud server 30, the content that corresponds to the identification information of the mobile terminal 10 and is uploaded to the cloud server 30. In particular, the cloud service application 13 may receive content in a pending state. The cloud service application 13 may receive the content corresponding to the identification information of the mobile terminal 10. However one or more embodiments are not limited thereto. The cloud service application 13 may also receive, from the cloud server 30, a message indicating whether the cloud server 30 stores the content that corresponds to the identification information of the mobile terminal 10 and is uploaded to the cloud server 30.

In operation 907, if the cloud server 30 stores the pending content, the cloud service application 13 may display a notification indicating # pending tasks that are printable in the image forming apparatus 20. In operation 908, the mobile terminal 10 receives a user input of selecting the notification from the user 1.

In operation 909, the cloud service application 13 transmits the MAC address of the image forming apparatus 20 to the cloud server 30 so as to allow the pending content to be printed.

In operation 910, when the cloud server 30 receives the MAC address of the image forming apparatus 20, the cloud server 30 may transmit the pending content to the image forming apparatus 20 that is mapped to correspond to the MAC address. When the image forming apparatus 20 receives the pending content from the cloud server 30, the image forming apparatus 20 may print the received content.

In operation 911, the cloud server 30 may transmit, to the cloud service application 13, a message indicating that the pending content has been transmitted to the image forming apparatus 20, and the cloud service application 13 may display, to the user 1, a notification indicating that the pending content has been transmitted to the image forming apparatus 20, so that the user 1 may see the notification.

Figure 9C:
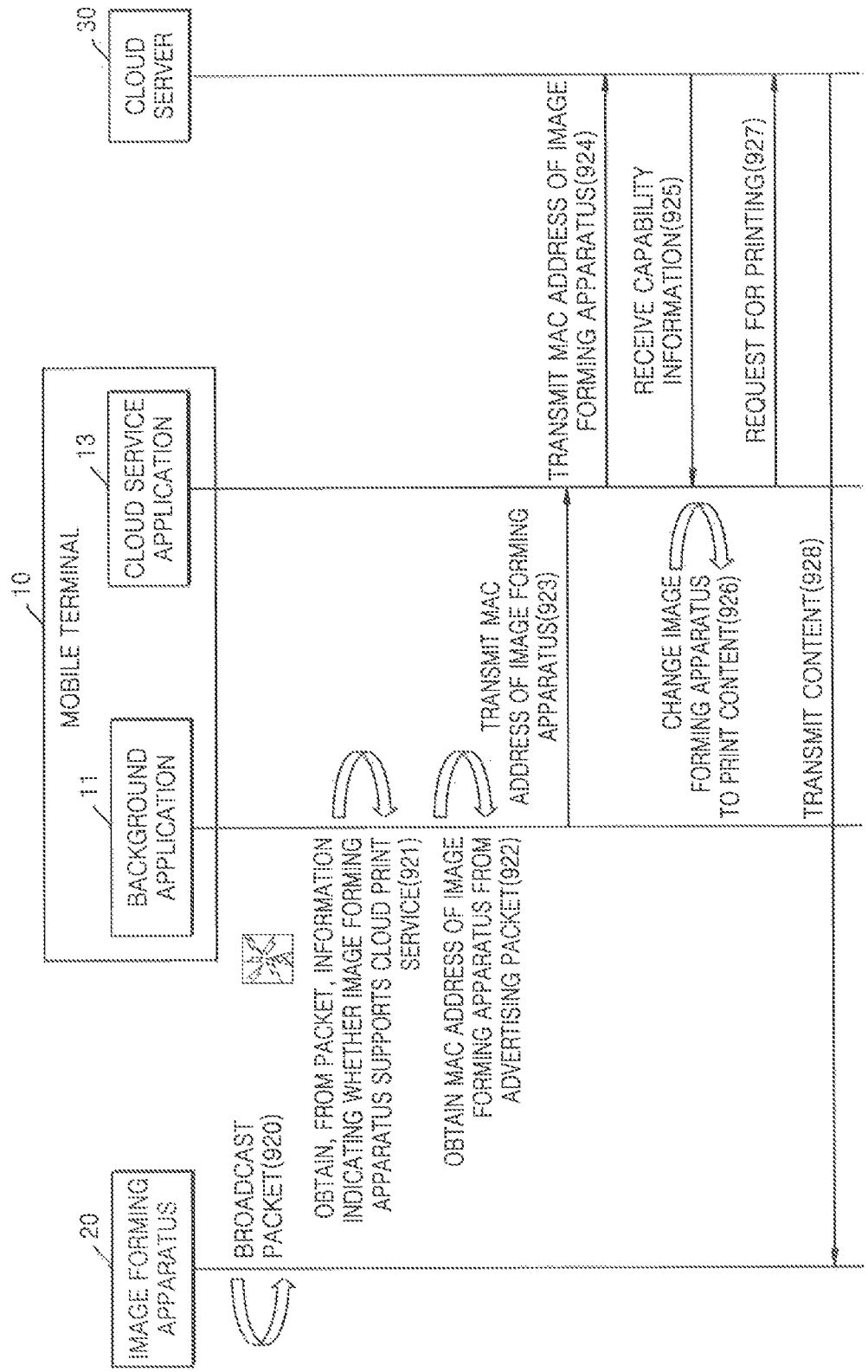
FIG. 9C is a flowchart of a method of printing content uploaded to the cloud server when the mobile terminal approaches the image forming apparatus in a cloud print system, the method performed by the image forming apparatus, according to an embodiment.

FIG. 9C is a flowchart of a method of printing content uploaded to the cloud server when the mobile terminal approaches the image forming apparatus in a cloud print system, the method performed by the image forming apparatus, according to an embodiment.

Referring to FIG. 9C, in operation 920, the image forming apparatus 20 periodically broadcasts a packet (an advertising packet) including identification information of the image forming apparatus 20.

In operation 921, the background application 11 of the mobile terminal 10 determines whether the mobile terminal 10 approaches the image forming apparatus 20, according to a received signal strength of the received packet (the advertising packet), and if the background application 11 determines that the mobile terminal 10 approaches the image forming apparatus 20, the background application 11 obtains information indicating whether the image forming apparatus 20 supports a cloud print service, from the packet (the advertising packet) received from the image forming apparatus 20.

In operation 922, if the background application 11 determines that the image forming apparatus 20 supports the cloud print service, according to the information indicating whether the image forming apparatus 20 supports the cloud print service, the background application 11 obtains an MAC address of the image forming apparatus 20 from the received packet (the advertising packet).

In operation 923, the background application 11 may transmit the MAC address of the image forming apparatus 20 to the cloud service application 13. In operation 924, the cloud service application 13 of the mobile terminal 10 may transmit the MAC address of the image forming apparatus 20 to the cloud server 30.

In operation 925, the cloud server 30 may transmit, to the mobile terminal 10, capability information that is mapped to correspond to the MAC address of the image forming apparatus 20 that is received from the mobile terminal 10. For example, the capability information may include information about capabilities of the image forming apparatus 20, e.g., a model number of the image forming apparatus 20, whether the image forming apparatus 20 supports a monochrome image or a color image, etc.

In operation 926, when the cloud service application 13 of the mobile terminal 10 receives the capability information that is mapped to correspond to the MAC address of the image forming apparatus 20, the cloud service application 13 may change, based on the capability information, an image forming apparatus to print content to the image forming apparatus 20 that is related to the capability information.

In operation 927, the cloud service application 13 of the mobile terminal 10 may transmit, to the cloud server 30, a request for printing the content uploaded to the cloud server 30, and the MAC address of the image forming apparatus 20 that is selected by a user 1.

In operation 928, the cloud server 30 may transmit the content to the image forming apparatus 20 that corresponds to the MAC address. When the image forming apparatus 20 receives the content from the cloud server 30, the image forming apparatus 20 may perform an image forming job on the content.

Figure 9D:
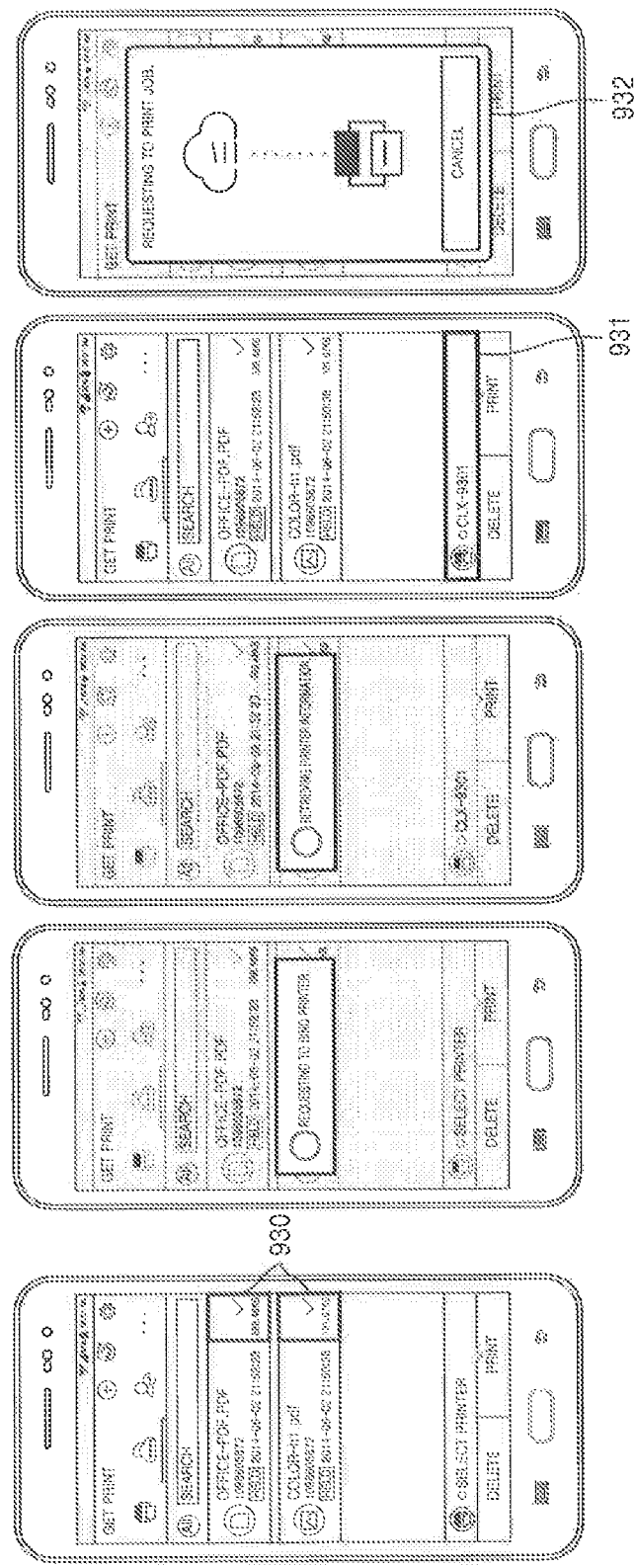
FIG. 9D illustrates a procedure in which, when a user carrying the mobile terminal approaches the image forming apparatus, the mobile terminal automatically selects the image forming apparatus, and the image forming apparatus prints content, according to an embodiment.

FIG. 9D illustrates a procedure in which, when a user carrying the mobile terminal approaches the image forming apparatus, the mobile terminal automatically selects the image forming apparatus, and the image forming apparatus prints content, according to an embodiment.

It is assumed that the user approaches the image forming apparatus 20 while the user carries the mobile terminal 10 in which the background application 11 is executed.

First, the user receives, from the cloud server 30 and by using the mobile terminal 10, information about a plurality of pieces of contents stored in the cloud server 30 while the plurality of pieces of contents are mapped to correspond to identification information of the mobile terminal 10, and then, the user selects one or more pieces of content 930 from among the plurality of pieces of stored contents.

When the user carrying the mobile terminal 10 approaches the image forming apparatus 20, the mobile terminal 10 may determine whether the mobile terminal 10 approaches the image forming apparatus 20, according to a received signal strength of a packet (an advertising packet) that is received from the image forming apparatus 20.

When the mobile terminal 10 determines that the mobile terminal 10 approaches the image forming apparatus 20, the mobile terminal 10 transmits a connection request to the image forming apparatus 20 by using preset communication (e.g., BLE communication), and connects to the image forming apparatus 20.

When connected, the mobile terminal 10 receives identification information of the image forming apparatus 20 from the image forming apparatus 20 by using the preset communication (e.g., the BLE communication), and transmits the identification information of the image forming apparatus 20 to the cloud server 30. Based on the received identification information of the image forming apparatus 20, the cloud server 30 transmits, to the mobile terminal 10, capability information of the image forming apparatus 20 that is mapped to correspond to the identification information of the image forming apparatus 20. The cloud server 30 may check whether identification information of the image forming apparatus 20 stored in the cloud server 30 matches with the identification information of the image forming apparatus 20 received from the mobile terminal 10, and if matched, the cloud server 30 may select the image forming apparatus 20 as an image forming apparatus to perform a print task.

When the mobile terminal 10 receives the capability information of the image forming apparatus 20 from the cloud server 30, the mobile terminal 10 may display the capability information of the image forming apparatus 20 on the mobile terminal 10, based on the capability information. The mobile terminal 10 may display a message 931 indicating that the image forming apparatus 20 is selected so as to print the content 930.

The mobile terminal 10 transmits a request for printing the content 930 to the cloud server 30. Here, the mobile terminal 10 may display a message 932 indicating that the request for printing the content 930 has been transmitted to the cloud server 30.

When the cloud server 30 receives the request for printing the content 930 from the mobile terminal 10, the cloud server 30 transmits the content 930 to the image forming apparatus 20. When the image forming apparatus 20 receives the content 930 from the cloud server 30, the image forming apparatus 20 performs an image forming task As described above, the cloud server 30 may check whether the identification information of the image forming apparatus 20 stored in the cloud server 30 matches with the identification information of the image forming apparatus 20 received from the mobile terminal 10, and if matched, the cloud server 30 may select the image forming apparatus 20 as the image forming apparatus to perform the print task. However, the present embodiment is not limited thereto, thus, the cloud server 30 may not select the image forming apparatus 20 but may transmit the capability information of the image forming apparatus 20 to the mobile terminal 10, and the mobile terminal 10 may display the capability information of the image forming apparatus 20. The mobile terminal 10 may change the image forming apparatus 20 to an image forming apparatus that is related to the capability information of the image forming apparatus 20 and that is from among image forming apparatuses, and may display the changed image forming apparatus. Here, when the mobile terminal 10 transmits the request for printing the content 930 which the user selected, the mobile terminal 10 may also transmit identification information of the changed image forming apparatus to the cloud server 30. The cloud server 30 may transmit the content 930 to the changed image forming apparatus that is mapped to correspond to the identification information of the changed image forming apparatus. Detailed descriptions thereof are described above with reference to FIG. 9C.

The present embodiment is not limited thereto, and when the mobile terminal 10 approaches the image forming apparatus 20, the mobile terminal 10 may not execute the cloud service application 13 but may execute the mobile print application 12, may extract the identification information of the image forming apparatus 20 from the packet (the advertising packet) received from the image forming apparatus 20, may check whether identification information of an image forming apparatus registered in the mobile terminal 10 matches with the extracted identification information of the image forming apparatus 20, and if matched, may select the registered image forming apparatus. The mobile terminal 10 may connect to the image forming apparatus 20 by using connection information that is mapped to correspond to the identification information of the registered image forming apparatus, and may transmit the content 930 to the image forming apparatus 20. The image forming apparatus 20 may receive the content 930 from the mobile terminal 10, and may perform an image forming job on the content 930.

FIG. 9E is a flowchart of a procedure in which the mobile terminal requests the image forming apparatus for connection information, and when the mobile terminal receives the connection information, the mobile terminal transmits content to the image forming apparatus by using the connection information, and the image forming apparatus prints the content, according to an embodiment.

Referring to FIG. 9E, the image forming apparatus 20 broadcasts a packet (an advertising packet) including identification information of the image forming apparatus 20.

In operation 934, when the background application 11 of the mobile terminal 10 determines that the mobile terminal 10 approaches the image forming apparatus 20, according to a received signal strength of the received packet (the advertising packet), the background application 11 may obtain the identification information of the image forming apparatus 20 from the packet (the advertising packet), and may transmit a connection request to the image forming apparatus 20 by using the identification information of the image forming apparatus 20.

In operation 935, the background application 11 of the mobile terminal 10 may request the image forming apparatus 20 for connection information according to a different communication standard.

In operation 936, the background application 11 of the mobile terminal 10 may receive the connection information according to the different communication standard from the image forming apparatus 20.

In operation 937, the background application 11 of the mobile terminal 10 may execute the mobile print application 12, and may transmit the connection information according to the different communication standard to the mobile print application 12. The background application 11 of the mobile terminal 10 may execute the mobile print application 12, and may connect to the image forming apparatus 20 by using the connection information according to the different communication standard.

In operation 938, when the mobile terminal 10 receives a user input of selecting print-target content from a user, the mobile print application 12 of the mobile terminal 10 may transmit the print-target content to the image forming apparatus 20. When the image forming apparatus 20 receives the print-target content from the mobile print application 12, the image forming apparatus 20 may print the print-target content.

Hereinafter, with reference to FIGS. 10A through 20, a method of easily performing user authentication with respect to the image forming apparatus according to user's intention, and performing a logout with respect to an authenticated user will be described in detail below. Also, a method of differently displaying a login screen of the image forming apparatus according to authentication method settings of the image forming apparatus, the method performed to make the user easily recognize an authenticable method, will be described in detail below.

Figure 10A:
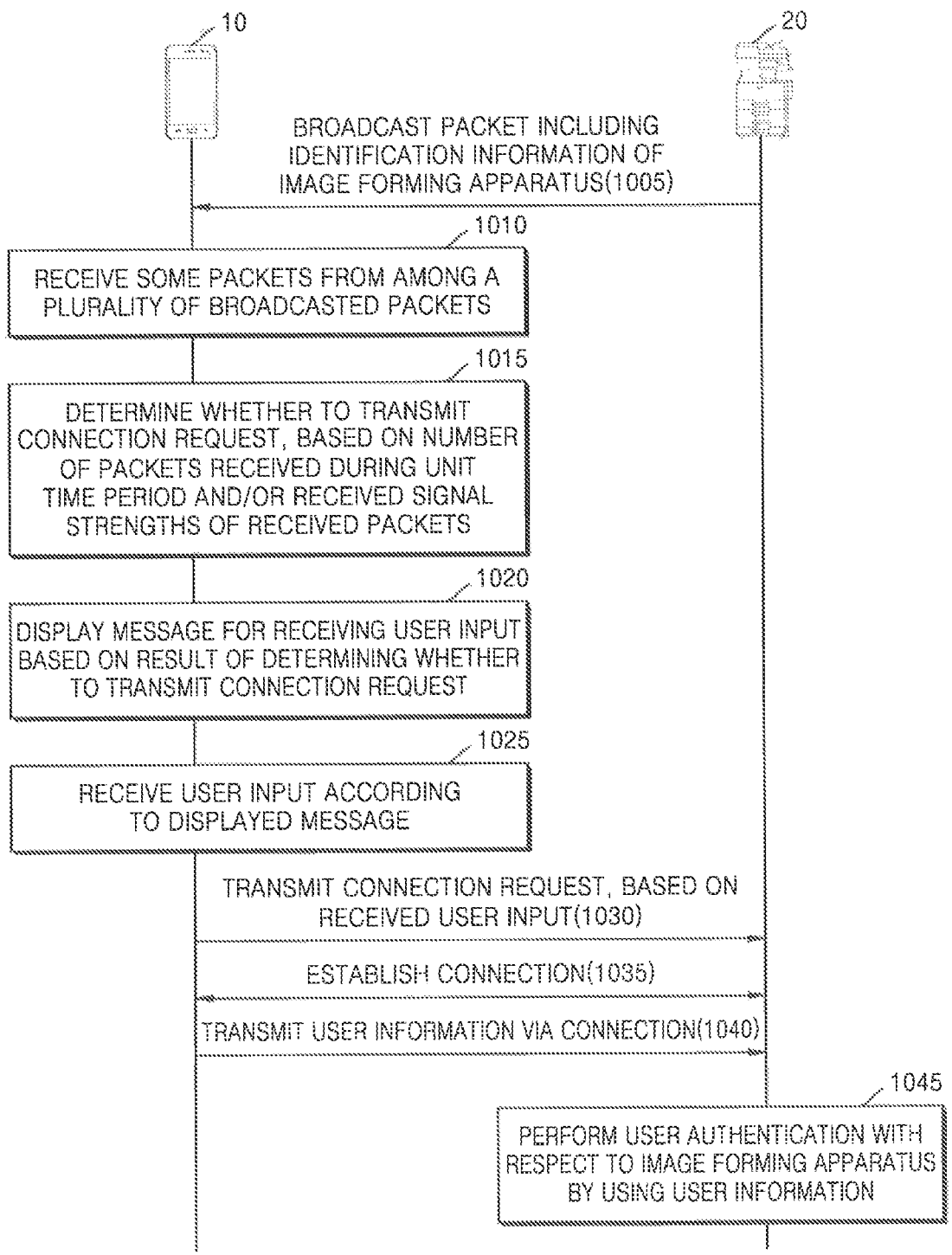
FIG. 10A is a flowchart for describing a procedure in which the mobile terminal displays a message, and the image forming apparatus performs user authentication by using a user input received according to the displayed message, according to an embodiment.

FIG. 10A is a flowchart for describing a procedure in which the mobile terminal displays a message, and the image forming apparatus performs user authentication by using a user input received according to the displayed message, according to an embodiment.

Referring to FIG. 10A, in operation 1005, the image forming apparatus 20 may broadcast a packet (an advertising packet) including identification information of the image forming apparatus 20. Here, the image forming apparatus 20 may periodically broadcast the packet (the advertising packet).

For example, when a BLE module is activated, the image forming apparatus 20 may broadcast the packet (the advertising packet) including the identification information of the image forming apparatus 20.

In operation 1010, the mobile terminal 10 may receive, from the image forming apparatus 20, some packets (advertising packets) from among a plurality of broadcasted packets (advertising packets). In more detail, the mobile terminal 10 may receive some packets from among the plurality of packets (the advertising packets) that are periodically broadcasted from the image forming apparatus 20.

In operation 1015, the mobile terminal 10 may determine whether to transmit a connection request (e.g., a BLE connection request), based on the number of some packets (the advertising packets) received during a unit time period and/or received signal strengths of the received some packets (the advertising packets).

In operation 1020, the mobile terminal 10 may display a message for receiving a user input based on a result of determining whether to transmit the connection request (e.g., the BLE connection request). Here, the displayed message may be a message for receiving a user's confirmation with respect to whether to transmit the connection request (e.g., the BLE connection request).

In operation 1025, the mobile terminal 10 may receive the user input according to the displayed message. For example, the mobile terminal 10 may receive a user input indicating transmission of the connection request (e.g., the BLE connection request), according to the message for receiving the user's confirmation with respect to whether to transmit the connection request (e.g., the BLE connection request).

In operation 1030, the mobile terminal 10 may transmit the connection request (e.g., the BLE connection request) to the image forming apparatus 20, based on the received user input.

In operation 1035, the image forming apparatus 20 receives the connection request (e.g., the BLE connection request) from the mobile terminal 10, and in response to the connection request, the image forming apparatus 20 establishes a connection (e.g., a BLE connection) with the mobile terminal 10.

In operation 1040, the mobile terminal 10 may transmit user information to the image forming apparatus 20 via the connection (e.g., the BLE connection).

In operation 1045, the image forming apparatus 20 may perform user authentication with respect to the image forming apparatus by using the received user information.

According to the present embodiment, when the mobile terminal 10 approaches the image forming apparatus 20, the mobile terminal 10 does not automatically transmit the connection request (e.g., the BLE connection request) without the user's confirmation.

The mobile terminal 10 displays the message for receiving the user input, and transmits the connection request (e.g., the BLE connection request) to the image forming apparatus 20 based on the user input received according to the message, and by doing so, even if a user carrying the mobile terminal 10 approaches the image forming apparatus 20, only when the user wants to connect the mobile terminal 10 to the image forming apparatus, the mobile terminal 10 may be connected to the image forming apparatus.

Figure 10B:
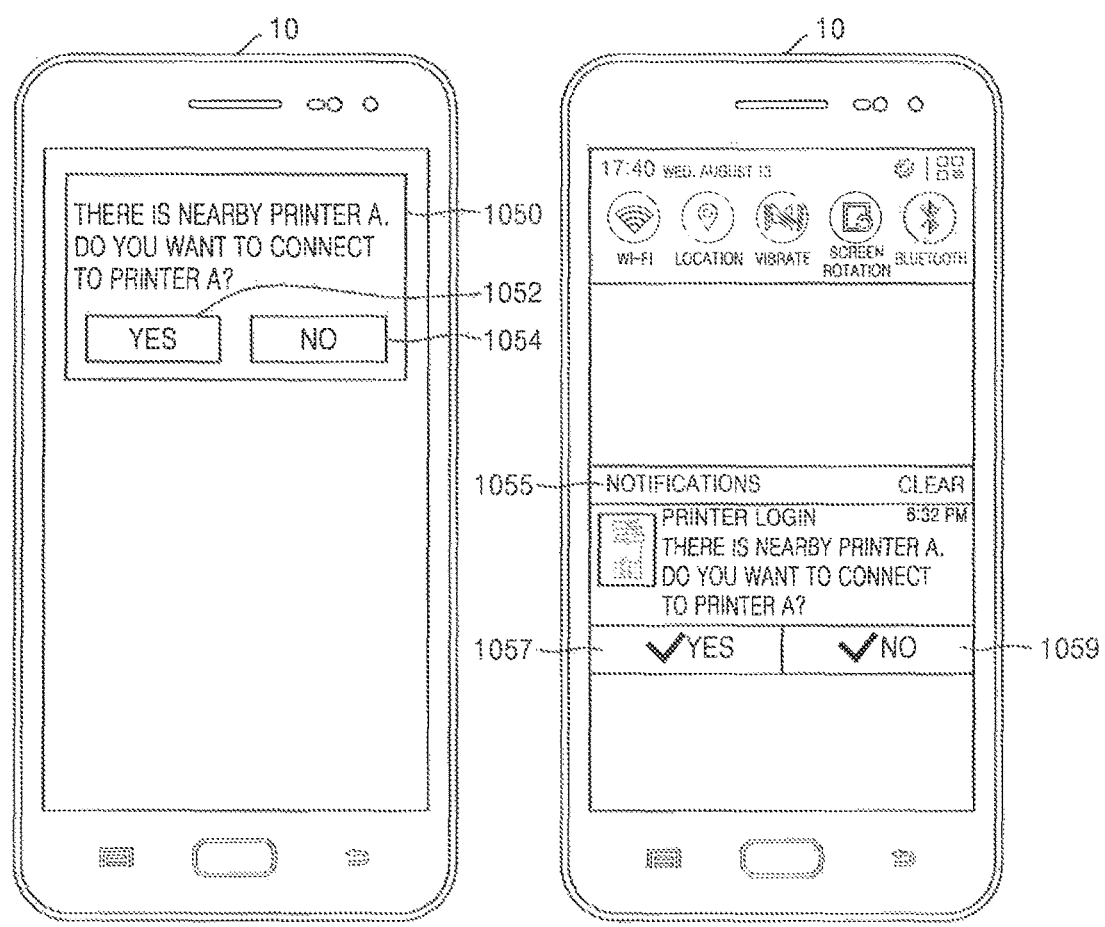
FIG. 10B illustrates a pop-up screen and a notification screen that are displayed on the mobile terminal so as to receive a user's confirmation with respect to whether to transmit a connection request, according to an embodiment.

FIG. 10B illustrates a pop-up screen and a notification screen that are displayed on the mobile terminal so as to receive a user's confirmation with respect to whether to transmit a connection request, according to an embodiment.

Referring to FIG. 10B, the mobile terminal 10 may display a pop-up 1050, according to determination by which a connection request (e.g., a BLE connection request) is transmitted to the image forming apparatus 20.

When a user has an intention to use the image forming apparatus 20, the user may select a YES 1052 on the pop-up 1050. When the user selects the YES 1052, the mobile terminal 10 may establish a connection (e.g., a BLE connection) with the image forming apparatus 20 by transmitting the connection request (e.g., the BLE connection request) to the image forming apparatus 20. If the user does not have the intention to use the image forming apparatus 20, the user may select a NO 1054 on the pop-up 1050. When the user selects the NO 1054, the mobile terminal 10 does not transmit the connection request (e.g., the BLE connection request) to the image forming apparatus 20, thus, the mobile terminal 10 may not be connected with the image forming apparatus 20.

When the mobile terminal 10 determines to transmit the connection request (e.g., the BILE connection request) to the image forming apparatus 20, the mobile terminal 10 may display a notification 1055, instead of the pop-up 1050.

When the user has the intention to use the image forming apparatus 20, the user may select a YES 1057 on the notification 1055. When the user selects the YES 1057, the mobile terminal 10 may establish a connection (e.g., a BLE connection) with the image forming apparatus 20 by transmitting the connection request (e.g., the BLE connection request) to the image forming apparatus 20. When the user does not have the intention to use the image forming apparatus 20, the user may select a NO 1059 on the notification 1055. When the user selects the NO 1059, the mobile terminal 10 does not transmit the connection request (e.g., the BLE connection request) to the image forming apparatus 20, thus, the mobile terminal 10 may not be connected with the image forming apparatus 20.

FIG. 10C is a flowchart for describing in detail a procedure in which, when a user carrying the mobile terminal approaches the image forming apparatus, the image forming apparatus performs user authentication by using a user input received according to a displayed message, according to an embodiment.

Referring to FIG. 10C, in operation 1060, the image forming apparatus 20 may activate a predetermined communication function (e.g., a BLE function) so as to establish a connection (e.g., a BLE connection). For example, the user may activate the predetermined communication function (e.g., the BLE function) via an UI of the image forming apparatus 20 or by accessing a web server in the image forming apparatus 20 and using a manager setting menu. Here, the predetermined communication function (e.g., the BLE function) may indicate that the image forming apparatus 20 that performs preset communication (e.g., BLE communication) by using a predetermined communication module (e.g., the BLE function) and performs a function by using the preset communication (e.g., the BLE communication). In addition, the image forming apparatus 20 may activate a user authentication mode so as to perform user authentication with respect to the image forming apparatus. The user authentication mode indicates a mode during which the user authentication with respect to the image forming apparatus is performed by using user information. Likewise, the user may activate the user authentication mode via a UI or by accessing the web server in the image forming apparatus.

In operation 1063, a user 1 executes a background application by using the mobile terminal 10. The background application (e.g., a BLE background application) means an application that is capable of performing various functions in the image forming apparatus via the preset communication (e.g., the BLE communication) and is executed in a background of the mobile terminal. The meaning of being executed in the background may mean that it is executed in the mobile terminal without displaying a message to the user.

In operation 1066, the user 1 may input, by using the mobile terminal 10, IDIPW for performing the user authentication with respect to the image forming apparatus. Here, the mobile terminal 10 may receive an input of ID/PW by using the background application.

In operation 1069, the user 1 may access the image forming apparatus 20 while the user 1 carries the mobile terminal 10.

In operation 1070, when the predetermined communication function (e.g., the BLE function) is activated, the image forming apparatus 20 may broadcast a packet (an advertising packet).

In operation 1073, the mobile terminal 10 receives the packet (the advertising packet) periodically broadcasted from the image forming apparatus 20, and displays a pop-up or a notification so as to receive a user's confirmation with respect to whether to establish a connection (e.g., a BLE connection), based on the received packet (the advertising packet).

In operation 1076, the user 1 may select whether to establish the connection (e.g., the BLE connection), according to the pop-up or the notification displayed on the mobile terminal 10. The mobile terminal 10 may receive a user input, from the user 1, indicating the user's confirmation with respect to whether to establish the connection (e.g., the BLE connection).

In operation 1079, when the user 1 selects to transmit a request of the connection (e.g., the BLE connection), the mobile terminal 10 may transmit the request of the connection (e.g., the BLE connection) to the image forming apparatus 20 and may establish the connection (e.g., the BLE connection) with the image forming apparatus 20.

In operation 1080, the mobile terminal 10 may transmit ID/PW, which was input to the background application, to the image forming apparatus 20 via the connection (e.g., the BLE connection).

In operation 1083, the image forming apparatus 20 may receive ID/PW from the mobile terminal 10 and may perform the user authentication with respect to the image forming apparatus by using ID/PW received from the mobile terminal 10.

In operation 1086, the image forming apparatus 20 may display a result of the user authentication.

Figure 10D:
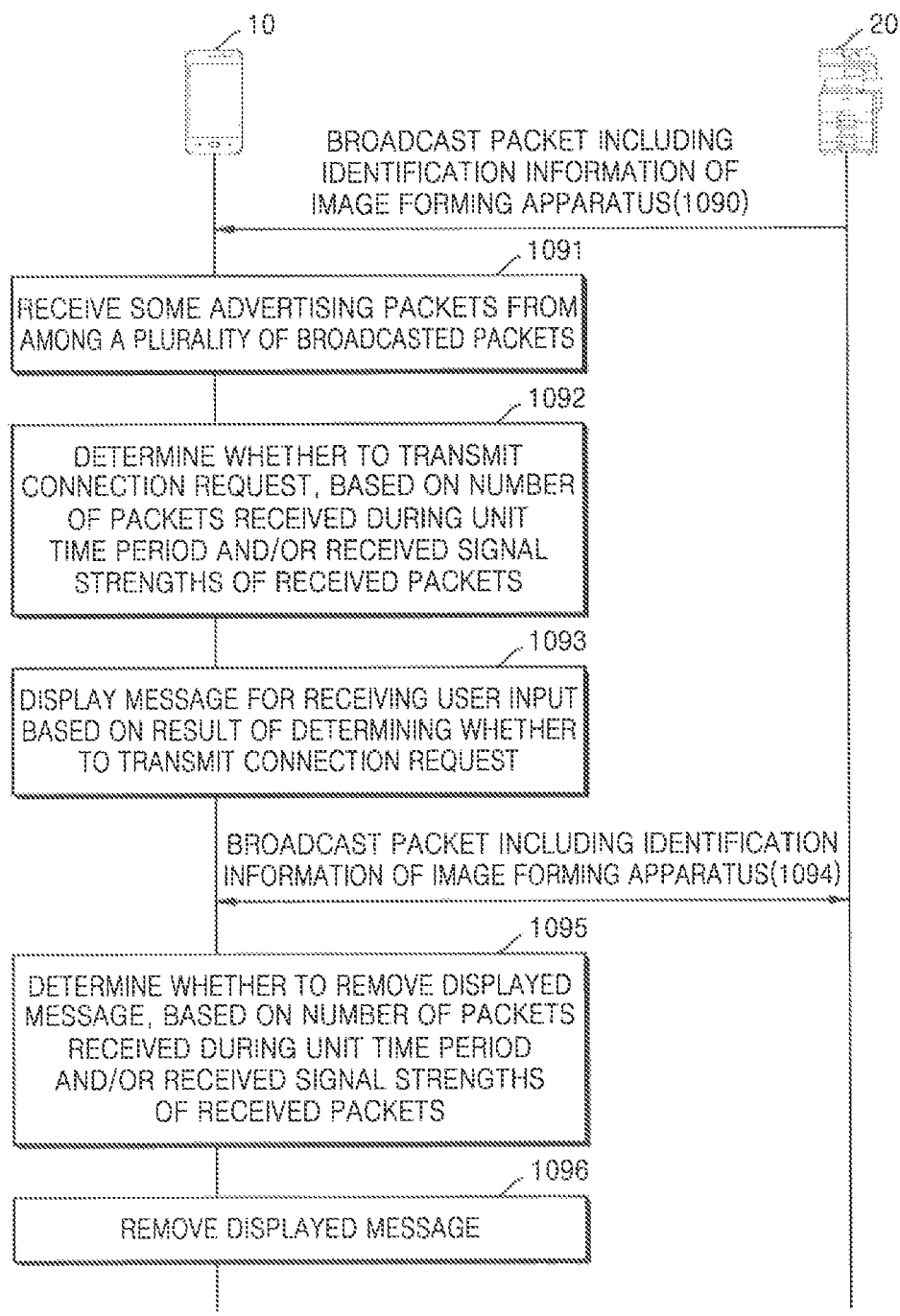
FIG. 10D is a flowchart for describing in detail a procedure in which, since a user carrying the mobile terminal becomes distant from the image forming apparatus, a displayed message is deleted, according to an embodiment.

FIG. 10D is a flowchart for describing in detail a procedure in which, since a user carrying the mobile terminal becomes distant from the image forming apparatus 20, a displayed message is removed, according to an embodiment.

Referring to FIG. 10D, in operation 1090, the image forming apparatus 20 may broadcast a packet (an advertising packet) including identification information of the image forming apparatus.

In operation 1091, the mobile terminal 10 may receive some packets (advertising packets) from among a plurality of broadcasted packets (advertising packets).

In operation 1092, the mobile terminal 10 may determine whether to transmit a connection request (e.g., a BLE connection request), based on the number of some packets (the advertising packets) received during a unit time period and/or received signal strengths of the received some packets (the advertising packets).

In operation 1093, the mobile terminal 10 may display a message for receiving a user input based on a result of determining whether to transmit the connection request (e.g., the BLE connection request). Here, it is assumed that the mobile terminal 10 does not receive the user input, according to the displayed message.

In operation 1094, the image forming apparatus 20 may broadcast the packet (the advertising packet) including the identification information of the image forming apparatus. The mobile terminal 10 may receive some packets (advertising packets) from the image forming apparatus 20.

In operation 1095, the mobile terminal 10 may determine whether to remove the displayed message, based on the number of some packets (the advertising packets) received during a unit time period and/or received signal strengths of the received some packets (the advertising packets). For example, when the number of packets (advertising packets) during a unit time period, whose received signal strengths are equal to or less than a first threshold value, is equal to or greater than a preset detecting count, the mobile terminal 10 may determine to remove the displayed message.

In operation 1096, the mobile terminal 10 may remove the displayed message, based on a result of determining whether to delete the message.

According to the present embodiment, while the mobile terminal 10 does not receive the user input according to the displayed message, if a user carrying the mobile terminal 10 becomes distant from the image forming apparatus 20, the displayed message is removed and thus the unnecessary message is not continuously displayed, so that user convenience may be increased.

With reference to FIG. 10D, it is described that the mobile terminal 10 removes the displayed message, based on the number of some packets (the advertising packets) received during the unit time period and/or the received signal strengths of the received some packets (the advertising packets), however, the present embodiment is not limited thereto and it is obvious to one of ordinary skill in the art that the message may be removed after a preset time elapses after the message is displayed.

FIG. 11 is a flowchart for describing in detail a procedure in which the image forming apparatus displays user information and performs user authentication with respect to the image forming apparatus by using a user input received according to the displayed user information, according to an embodiment.

Referring to FIG. 11, in operation 1105, the image forming apparatus 20 may broadcast a packet (an advertising packet) including identification information of the image forming apparatus.

In operation 1110, the mobile terminal 10 may receive, from the image forming apparatus 20, some packets (advertising packets) from among a plurality of broadcasted packets (advertising packets).

In operation 1115, the mobile terminal 10 may determine whether to transmit a connection request (e.g., a BLE connection request), based on the number of some packets (the advertising packets) received during a unit time period and/or received signal strengths of the received some packets (the advertising packets).

In operation 1120, the mobile terminal 10 may transmit the connection request (e.g., the BLE connection request) to the image forming apparatus 20, based on a result of determining whether to transmit the connection request (e.g., the BLE connection request). When the mobile terminal 10 determines to transmit the connection request (e.g., the BLE connection request), the mobile terminal 10 may transmit the connection request (e.g., the BLE connection request) to the image forming apparatus 20.

In operation 1125, the image forming apparatus 20 may establish a connection (e.g., a BLE connection) with the mobile terminal 10 by receiving the connection request (e.g., the BLE connection request) from the mobile terminal 10.

In operation 1130, the mobile terminal 10 may transmit user information to the image forming apparatus 20 via the connection (e.g., the BLE connection).

In operation 1135, the image forming apparatus 20 may receive a user input, according to the displayed user information. For example, the image forming apparatus 20 may receive, from the user, a user input indicating that the user authentication with respect to the image forming apparatus is performed.

In operation 1140, the image forming apparatus 20 may perform the user authentication with respect to the image forming apparatus, based on the user input received according to the displayed user information. For example, when the received user input indicates that the user authentication is performed, the image forming apparatus 20 may perform the user authentication with respect to the image forming apparatus.

FIG. 12 is a flowchart for describing a procedure in which the mobile terminal transmits a scan request, receives application identification information for performing an application, and performs user authentication with respect to the image forming apparatus, according to an embodiment.

Referring to FIG. 12, in operation 1205, the image forming apparatus 20 may broadcast a packet (an advertising packet) including identification information of the image forming apparatus.

In operation 1210, the mobile terminal 10 may receive the packet (the advertising packet) broadcasted from the image forming apparatus 20.

In operation 1215, the mobile terminal 10 may transmit a scan request to the image forming apparatus 20, based on the received packet (the advertising packet).

In operation 1220, the image forming apparatus 20 may receive the scan request from the mobile terminal 10, and may transmit a response with respect to the scan request to the mobile terminal 10. Here, the response with respect to the scan request may include a Universally Unique Identifier (UUID) indicating an identifier of a background application. The mobile terminal 10 may receive the response with respect to the scan request from the image forming apparatus 20.

In operation 1225, the mobile terminal 10 may execute the background application by using the identifier of the background application which is included in the response with respect to the scan request. The mobile terminal 10 may receive, by using the background application, some packets (advertising packets) from among a plurality of packets (advertising packets) that are broadcasted from the image forming apparatus 20.

In operation 1230, the mobile terminal 10 may determine whether to transmit a connection request (e.g., a BLE connection request), based on the number of some packets (the advertising packets) received during a unit time period and/or received signal strengths of the received some packets (the advertising packets).

In operation 1235, when the mobile terminal 10 determines to transmit the connection request (e.g., the BLE connection request), the mobile terminal 10 may display a message for receiving a user's confirmation with respect to transmission of the connection request (e.g., the BLE connection request).

In operation 1240, the mobile terminal 10 may receive a user input indicating the user's confirmation with respect to the transmission of the connection request (e.g., the BLE connection request), according to the displayed message. For example, the mobile terminal 10 may receive a user input with respect to whether to transmit the connection request (e.g., the BLE connection request), according to the displayed message.

In operation 1245, the mobile terminal 10 may transmit the connection request (e.g., the BLE connection request) to the image forming apparatus 20, based on the received user input. For example, when the mobile terminal 10 receives a user input indicating the transmission of the connection request (e.g., the BLE connection request), the mobile terminal 10 may transmit the connection request (e.g., the BLE connection request) to the image forming apparatus 20.

In operation 1250, the image forming apparatus 20 may receive the connection request (e.g., the BLE connection request) from the mobile terminal 10, and may establish a connection (e.g., a BLE connection) with the mobile terminal 10.

In operation 1255, the mobile terminal 10 may transmit user information to the image forming apparatus 20 via the connection (e.g., the BLE connection).

In operation 1260, the image forming apparatus 20 may receive the user information from the mobile terminal 10 via the connection (e.g., the BLE connection), and may perform the user authentication with respect to the image forming apparatus by using the received user information.

According to the present embodiment, the mobile terminal 10 may actively transmit the scan request to the image forming apparatus 20, and may receive the response with respect to the scan request from the image forming apparatus 20, so that the mobile terminal 10 may receive information that is not included in the packet (the advertising packet).

When identification information of a predetermined application, e.g., UUID information, is not included in the packet (the advertising packet) according to a type of an operating system (OS) of the mobile terminal, the mobile terminal 10 may not be able to execute the predetermined application according to the received packet (the advertising packet). Therefore, the mobile terminal cannot perform operations such as a display of a pop-up, transmission of the connection request (e.g., the BLE connection request), and transmission of the user information via the connection (e.g., the BLE connection).

Even if the packet (the advertising packet) including the identification information of the predetermined application is attempted to be transmitted, since a size of the packet (the advertising packet) is limited to a certain size, it is difficult to include the identification information of the predetermined application in the packet (the advertising packet) and then to broadcast the packet (the advertising packet).

Accordingly, the image forming apparatus 20 according to an embodiment first broadcasts a packet (an advertising packet) that does not include the identification information of the predetermined application. When the mobile terminal 10 receives the packet (the advertising packet), the mobile terminal 10 may transmit a scan request to the image forming apparatus 20, based on the received packet (the advertising packet), and the image forming apparatus 20 may transmit, in response to the scan request, the identification information of the predetermined application to the mobile terminal 10. Therefore, the mobile terminal may obtain the identification information of the predetermined application from the response with respect to the scan request, and may perform operations of the mobile terminal by executing the predetermined application by using unique information about the predetermined application.

According to the present embodiment, the response with respect to the scan request includes the identification information of the predetermined application, but the present embodiment is not limited thereto, and thus, the response with respect to the scan request may include not only the identification information of the predetermined application but may also include information having a size too large to be included in the packet (the advertising packet). For example, the image forming apparatus may include status information of the image forming apparatus in the response with respect to the scan request.

Figure 13:
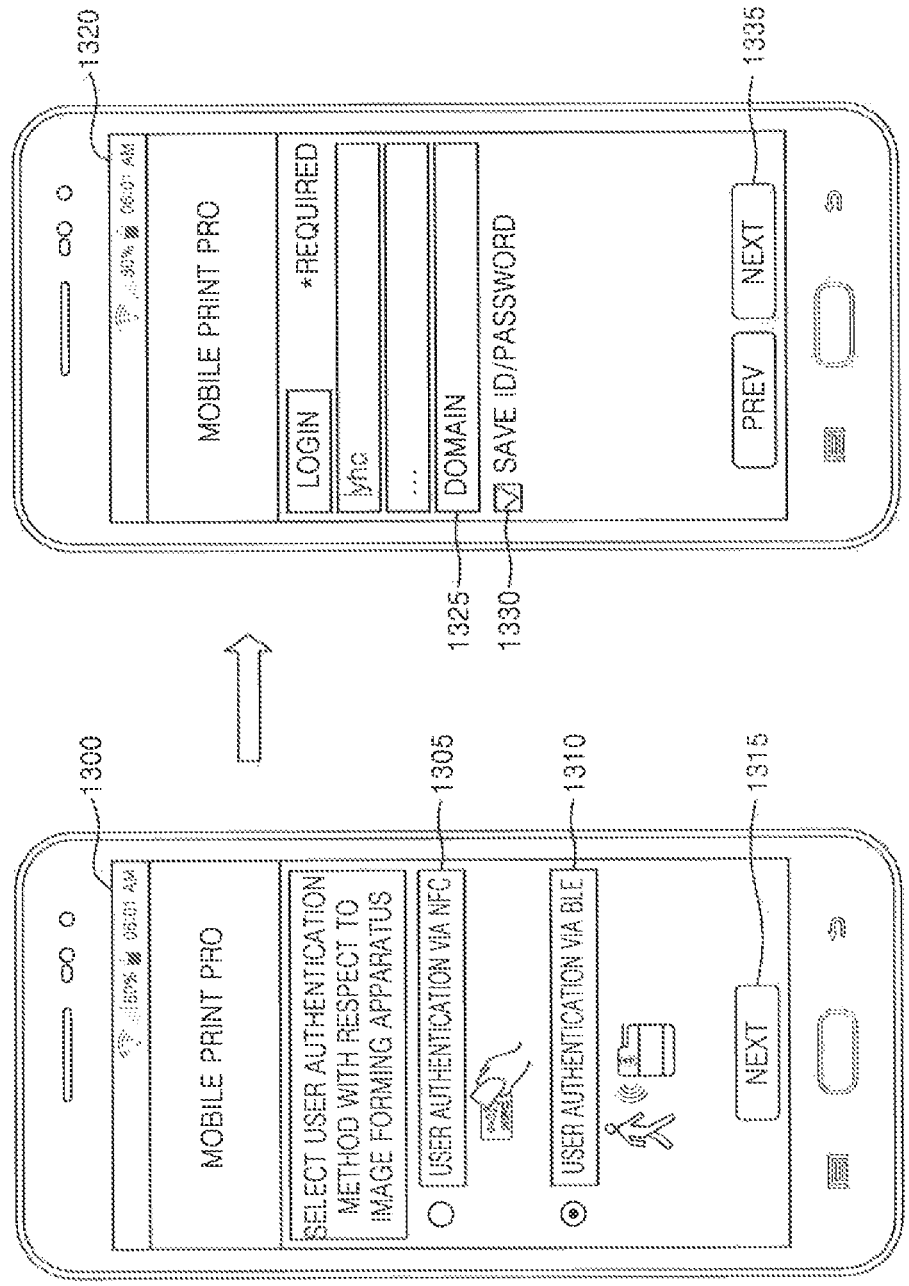
FIG. 13 illustrates screens displayed on the mobile terminal so as to receive an input of selecting a user authentication method with respect to the image forming apparatus and an input of user information, according to an embodiment.

FIG. 13 illustrates screens displayed on the mobile terminal so as to receive an input of selecting a user authentication method with respect to the image forming apparatus and an input of user information, according to an embodiment.

Referring to FIG. 13, when a mobile print application is executed, the mobile terminal 10 may display an authentication method selection screen 1300. A user may select, on the authentication method selection screen 1300, an authentication method with respect to the image forming apparatus.

According to an embodiment, the user may select, on the authentication method selection screen 1300, one of a user authentication via NFC 1305 and a user authentication via BLE 1310. For example, when the user selects the user authentication via BLE 1310 and then selects a Next 1315 on the authentication method selection screen 1300, the mobile terminal 10 may display a login screen 1320.

The user may input ID/PW necessary to perform user authentication on the login screen 1320. Also, an authentication domain 1325 may be selected. An authentication domain may include a local domain or a network domain. When the user selects the local domain as the authentication domain 1325, the image forming apparatus 20 may perform the user authentication by using user information stored in the image forming apparatus. When the user selects the network domain as the authentication domain 1325, the image forming apparatus 20 may perform the user authentication with respect to the image forming apparatus 20 by transmitting, via a network, ID/PW to a separate user authentication server outside the image forming apparatus and receiving a result thereof from the user authentication server.

In order to prevent that the user repeatedly inputs ID/PW whenever the user authentication is performed, the user may select a check-box 1330 on the login screen 1320. If the user selects the check-box 1330, the mobile terminal 10 may store ID/PW and may transmit ID/PW to the image forming apparatus 20 so as to perform the user authentication with respect to the image forming apparatus 20.

The present embodiment is described with only the user authentication using NFC and the user authentication using BLE communication, but is not limited to, and the user may select one from among user authentication methods using various communication modules. Also, referring to the present embodiment, only one user authentication method is selected, but it is obvious to one of ordinary skill in the art that a plurality of user authentication methods may be selected.

Figure 14A:
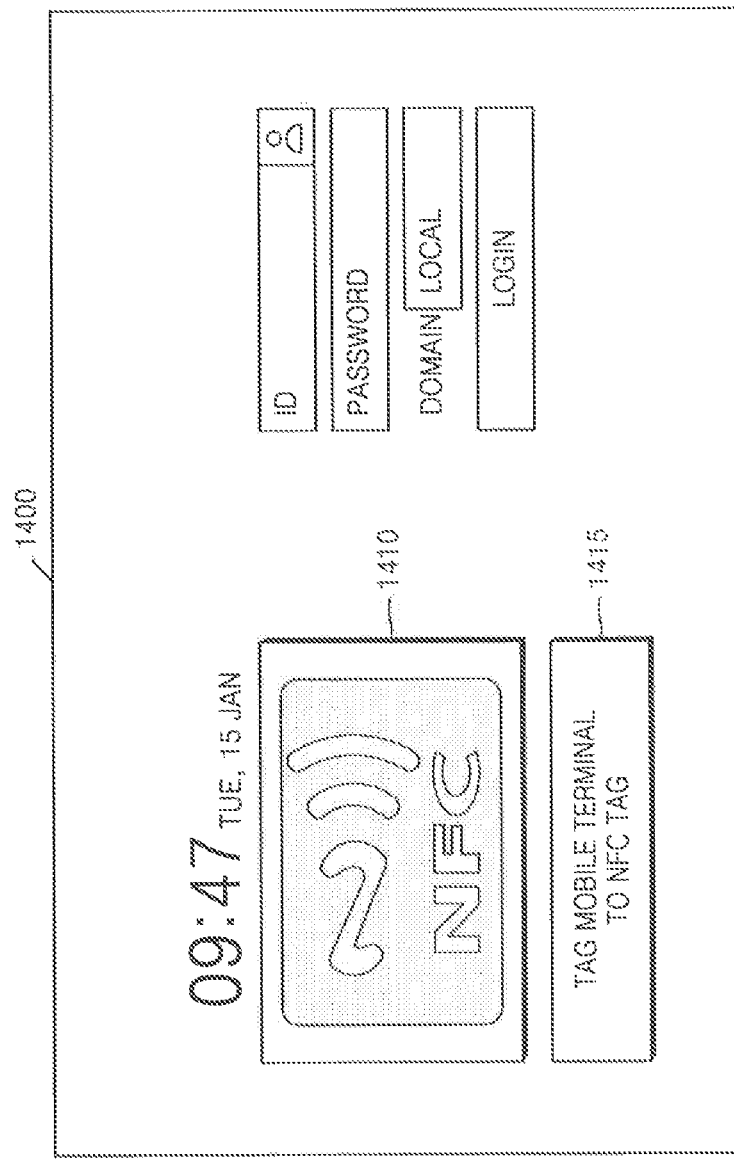
FIG. 14A illustrates a login screen that is displayed when a user authentication mode using NFC is activated in the image forming apparatus, according to an embodiment.

FIG. 14A illustrates a login screen that is displayed when a user authentication mode using NFC is activated in the image forming apparatus, according to an embodiment.

Referring to FIG. 14A, the image forming apparatus displays a login screen 1400. In the present embodiment, it is assumed that an option for performing user authentication by using an NFC module is activated in the image forming apparatus 20, and an option for performing the user authentication by using a BLE module or another communication module is not activated.

A user may preset an option for performing user authentication by using an UI panel of the image forming apparatus, or may preset an option for performing user authentication by accessing a web server in the image forming apparatus by using an external device, so that an option for performing user authentication by using a particular communication module may be activated.

The image forming apparatus 20 may display an NFC tagging guide image 1410 and an NFC tagging guide message 1415 on the login screen 1400. That is, since the option for performing user authentication by using the NFC module is activated in the image forming apparatus 20, the image forming apparatus 20 may display the NFC tagging guide image 1410 and the NFC tagging guide message 1415.

Here, the user of the image forming apparatus 20 may check the NFC tagging guide image 1410 and the NFC tagging guide message 1415 and then may perform user authentication with respect to the image forming apparatus 20 by tagging the mobile terminal 10 to an NFC tag attached to the image forming apparatus 20 or an NFC module of the image forming apparatus 20. When the user tags the mobile terminal 10 to the NFC tag attached to the image forming apparatus 20 or the NFC module of the image forming apparatus 20, the mobile terminal 10 may transmit user information to the image forming apparatus 20 by using NFC, and the image forming apparatus 20 may receive the user information from the mobile terminal 10 by using NFC and may perform the user authentication with respect to the image forming apparatus by using the received user information.

Figure 14B:
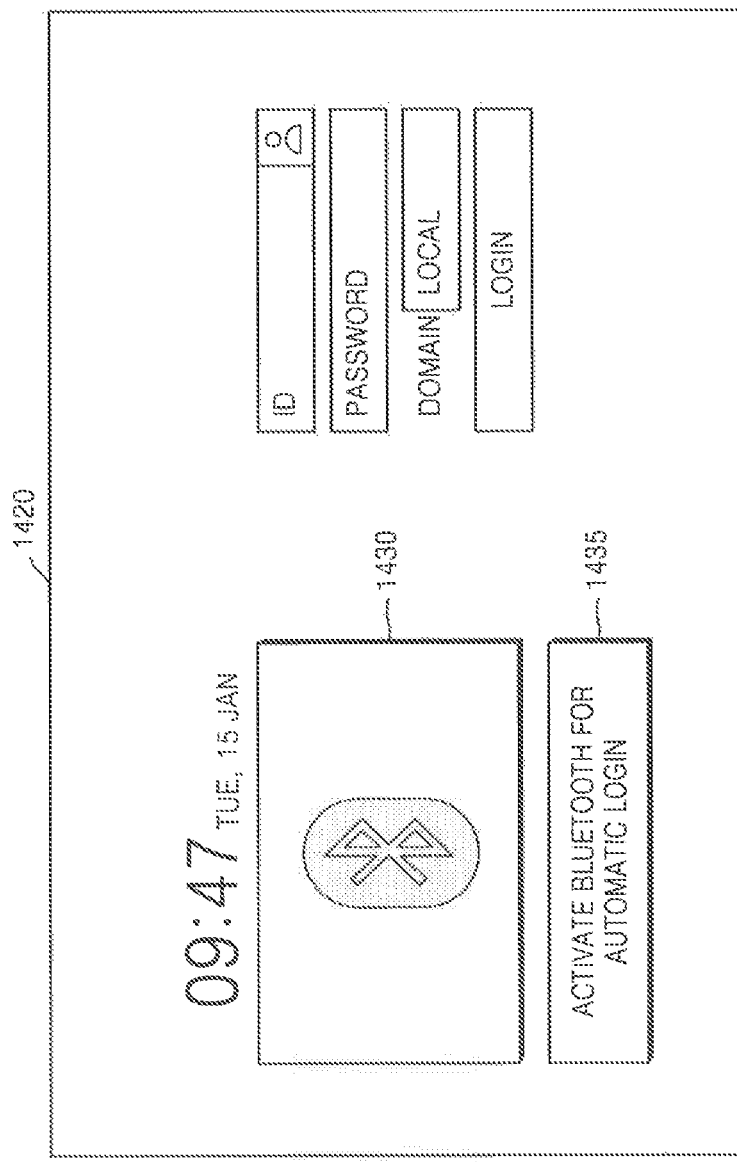
FIG. 14B illustrates a login screen that is displayed when a user authentication mode using BLE is activated in the image forming apparatus, according to an embodiment.

FIG. 14B illustrates a login screen that is displayed when a user authentication mode using BLE is activated in the image forming apparatus, according to an embodiment.

Referring to FIG. 14B, the image forming apparatus 20 may display a Bluetooth usage guide image 1430 and a Bluetooth usage guide message 1435 on a login screen 1420.

When an option for performing user authentication by using a BLE module is activated, the image forming apparatus 20 may display the Bluetooth usage guide image 1430 and the Bluetooth usage guide message 1435. Here, a user of the image forming apparatus 20 may check the Bluetooth usage guide image 1430 and the Bluetooth usage guide message 1435 and may bring the mobile terminal 10 closer to the image forming apparatus. The mobile terminal 10 receives a packet (an advertising packet) broadcasted from the image forming apparatus 20. The mobile terminal 10 may transmit a BLE connection request, based on the received packet (the advertising packet), and the image forming apparatus 20 may receive the BLE connection request and may establish a BLE connection with the mobile terminal 10. The mobile terminal 10 may transmit ID/PW to the image forming apparatus 20 via the BLE connection, and the image forming apparatus 20 may receive ID/PW from the mobile terminal 10 via the BLE connection. The image forming apparatus 20 may perform user authentication with respect to the image forming apparatus 20 by using received ID/PW. That is, the image forming apparatus 20 may receive user information from the mobile terminal 10 by using the BLE module and may perform the user authentication with respect to the image forming apparatus.

Figure 14C:
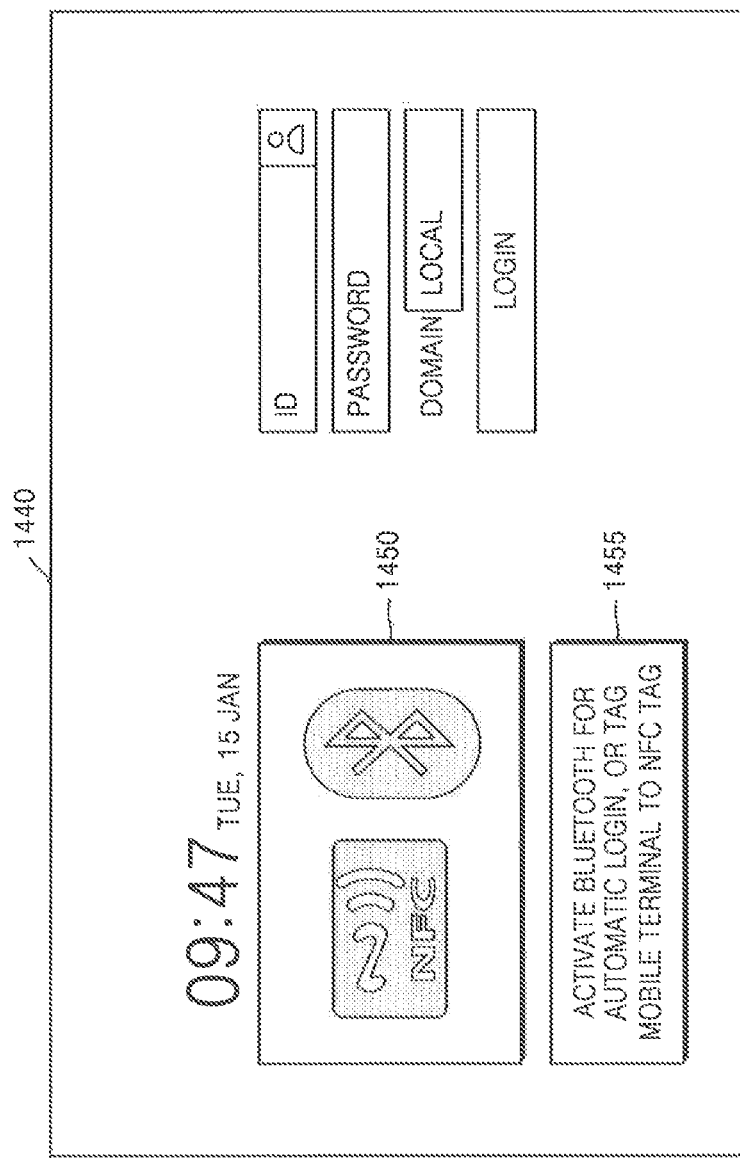
FIG. 14C illustrates a login screen that is displayed when a user authentication mode using NFC and BLE is activated in the image forming apparatus, according to an embodiment.

Referring to FIG. 14C, the image forming apparatus 20 may display a Bluetooth usage and NFC tagging guide image 1450 and a Bluetooth usage and NFC tagging guide message 1455 on a login screen 1440.

Since an option for performing user authentication by using a BLE module and an option for performing user authentication by using an NFC module are activated, the image forming apparatus 20 may display the Bluetooth usage and NFC tagging guide image 1450 and the Bluetooth usage and NFC tagging guide message 1455.

Here, a user of the image forming apparatus 20 checks the Bluetooth usage and NFC tagging guide image 1450 and the Bluetooth usage and NFC tagging guide message 1455 and then brings the mobile terminal 10 closer to the image forming apparatus.

The user of the image forming apparatus 20 may check the Bluetooth usage and NFC tagging guide image 1450 and the Bluetooth usage and NFC tagging guide message 1455 and then may perform the user authentication by tagging the mobile terminal 10 to an NFC tag attached to the image forming apparatus 20 or an NFC module of the image forming apparatus. When the user tags the mobile terminal 10 to the NFC tag attached to the image forming apparatus 20 or the NFC module of the image forming apparatus, the mobile terminal 10 may transmit user information to the image forming apparatus 20 by using NFC, and the image forming apparatus 20 may receive the user information from the mobile terminal 10 by using NFC and may perform the user authentication with respect to the image forming apparatus by using the received user information.

Also, the mobile terminal 10 may receive a packet (an advertising packet) broadcasted from the image forming apparatus 20. The mobile terminal 10 may transmit a BLE connection request, based on the received packet (the advertising packet), and the image forming apparatus 20 may receive the BLE connection request and may establish a BLE connection with the mobile terminal 10. The mobile terminal 10 may transmit ID/PW to the image forming apparatus 20 via the BLE connection, and the image forming apparatus 20 may receive ID/PW from the mobile terminal 10 via the BLE connection. The image forming apparatus 20 may perform user authentication with respect to the image forming apparatus 20 by using received ID/PW. That is, the image forming apparatus 20 may receive user information from the mobile terminal 10 by using the BLE module and may perform the user authentication with respect to the image forming apparatus.

According to the present embodiment, the image forming apparatus 20 may set an option for activating at least one communication module from among a plurality of communication modules that are usable to perform the user authentication, and may differently display a guide image and a guide message according to a set communication module activation option, so that the user may easily check a guide message and may perform user authentication with respect to the image forming apparatus.

For example, the image forming apparatus 20 may support a function for performing the user authentication with respect to the image forming apparatus by receiving the user information from an NFC card or the mobile terminal 10 via NFC. Also, the image forming apparatus 20 may support a function for performing the user authentication with respect to the image forming apparatus 20 by receiving the user information from the mobile terminal via both NFC and BLE communication. Here, an NFC or BLE communication module that supports NFC/BLE communication may be supported in the form of an accessory of the image forming apparatus. For example, the image forming apparatus 20 may not include the NFC or BLE communication but may have an NFC/BLE module accessory such as an USB dongle or the like mounted in the image forming apparatus 20, so that the image forming apparatus 20 may perform the user authentication by using the NFC module or the BLE communication module. The image forming apparatus may have an NFC module accessory, a BLE module accessory, or an NFC/BLE module accessory mounted in the image forming apparatus, and according to the mounted accessory, the image forming apparatus may differently display a login screen.

The image forming apparatus 20 may activate only some communication modules from among communication modules included in the image forming apparatus, according to user settings, and may differently display a login screen according to the activated communication module, so that the user may easily perform user authentication by using the activated communication module, according to the displayed login screen.

Figure 15:
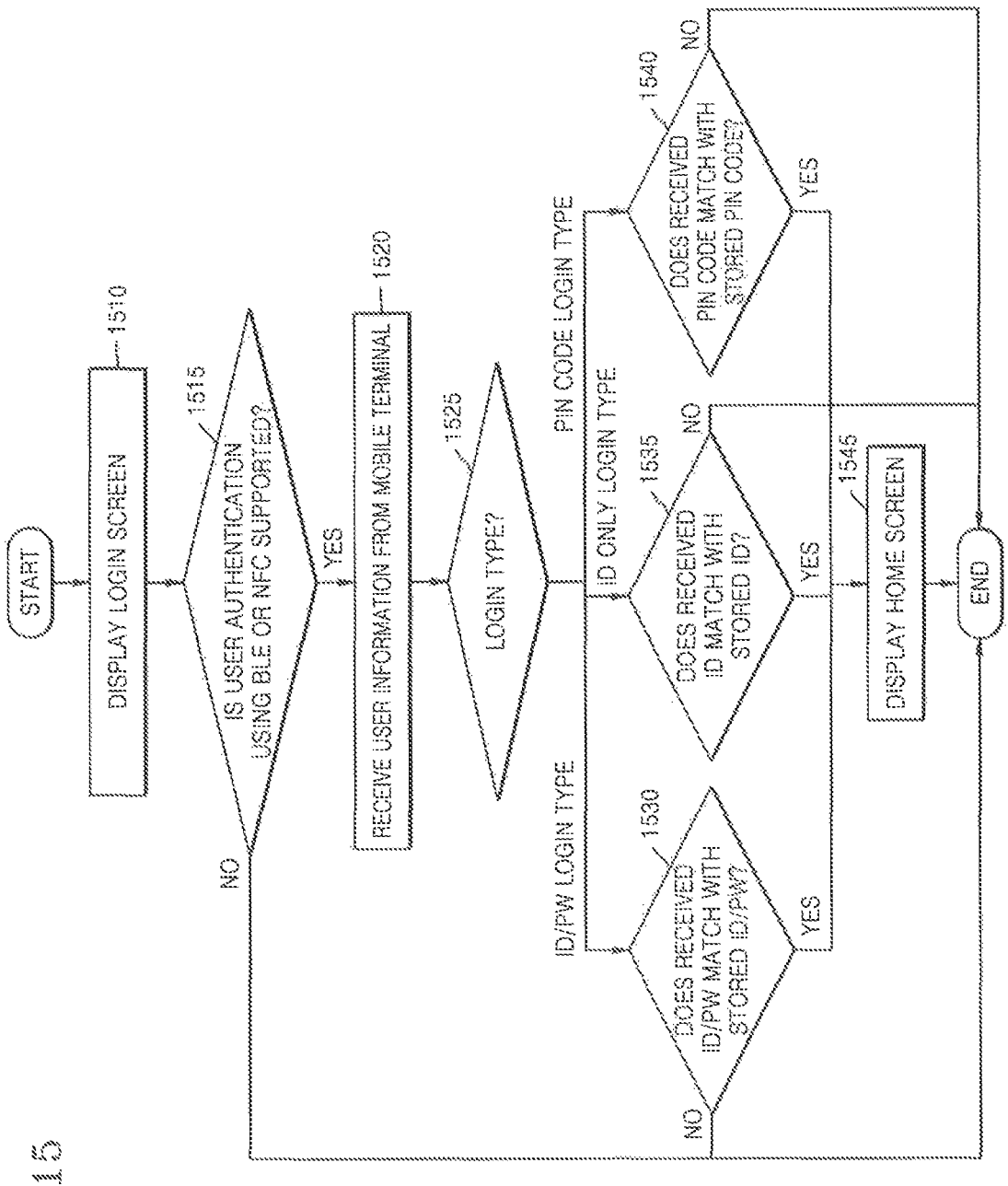
FIG. 15 is a flowchart for describing a procedure in which user authentication is performed in the image forming apparatus according to a login type, according to an embodiment.

FIG. 15 is a flowchart for describing a procedure in which user authentication is performed in the image forming apparatus according to a login type, according to an embodiment.

Referring to FIG. 15, in operation 1510, the image forming apparatus 20 may display a login screen. The login screen may indicate a screen displayed on the image forming apparatus 20 so as to perform user authentication with respect to the image forming apparatus. While the login screen is displayed on the image forming apparatus 20, a user cannot perform a task by using the image forming apparatus 20.

In operation 1515, the image forming apparatus 20 may determine whether user authentication using BLE communication or user authentication using NFC is supported.

In operation 1520, the image forming apparatus 20 determines whether the user authentication using BLE or the user authentication using NFC is supported, and when the image forming apparatus 20 determines that the user authentication using at least one of them is supported, the image forming apparatus 20 may receive user information from the mobile terminal 10.

For example, when the image forming apparatus 20 determines that the user authentication using BLE is supported and the user authentication using NFC is not supported, the image forming apparatus 20 may establish a BLE connection with the mobile terminal 10 and may receive the user information from the mobile terminal 10.

When the image forming apparatus 20 determines that the user authentication using NFC is supported and the user authentication using BLE is not supported, the user may perform NFC tagging on the image forming apparatus 20 by using the mobile terminal 10, and here, the image forming apparatus 20 may perform user authentication with respect to the image forming apparatus by using the user information received from the mobile terminal 10.

In operation 1525, the image forming apparatus 20 may determine a login type from among a plurality of login types. The plurality of login types may include an ID/PW login type, an ID-only login type, and a PIN code login type. The image forming apparatus 20 may determine the login type from among the plurality of login types, based on login-type information received from the mobile terminal 10. Alternatively, the image forming apparatus 20 may previously determine a login type, and may determine the login type from among the plurality of login types according to the previously-determined login type.

In operation 1530, when the determined login type is the ID/PW login type, the image forming apparatus 20 determines whether ID/PW included in the received user information matches with ID/PW stored in the image forming apparatus. If matched, the image forming apparatus 20 proceeds to operation 1545. If not matched, the image forming apparatus 20 may display a message indicating a login failure due to a mismatch between IDs or PWs. Here, if a login is failed more than a predetermined number of times, the image forming apparatus 20 may limit a user authentication attempt with respect to a corresponding user during a preset time period.

In operation 1535, when the determined login type is the ID-only login type, the image forming apparatus 20 may determine whether ID included in the received user information matches with stored ID. If matched, the image forming apparatus 20 proceeds to operation 1545. If not matched, the image forming apparatus 20 may display a message indicating a login failure due to a mismatch between IDs. Here, if a login is failed more than a predetermined number of times, the image forming apparatus 20 may limit a user authentication attempt with respect to all users during a preset time period.

When the determined login type is the PIN code login type, the image forming apparatus 20 may determine whether a PIN code included in the received user information matches with a stored PIN code. In this regard, the stored PIN code means a PIN code that is preset and is stored in the image forming apparatus 20. If the PIN codes are matched with each other, the image forming apparatus 20 proceeds to operation 1545. If not matched, the image forming apparatus 20 may display a message indicating a login failure due to a mismatch between the PIN codes. Here, if a login is failed more than a predetermined number of times, the image forming apparatus 20 may limit a user authentication attempt with respect to all users during a preset time period.

In operation 1545, the mobile terminal 10 may display a home screen. Accordingly, the user may perform an operation of the image forming apparatus 20 according to the displayed home screen. Here, the home screen indicates a screen that is displayed, when the user authentication with respect to the image forming apparatus has been successfully performed, so as to make the user perform the operation of the image forming apparatus 20.

Figure 16A:
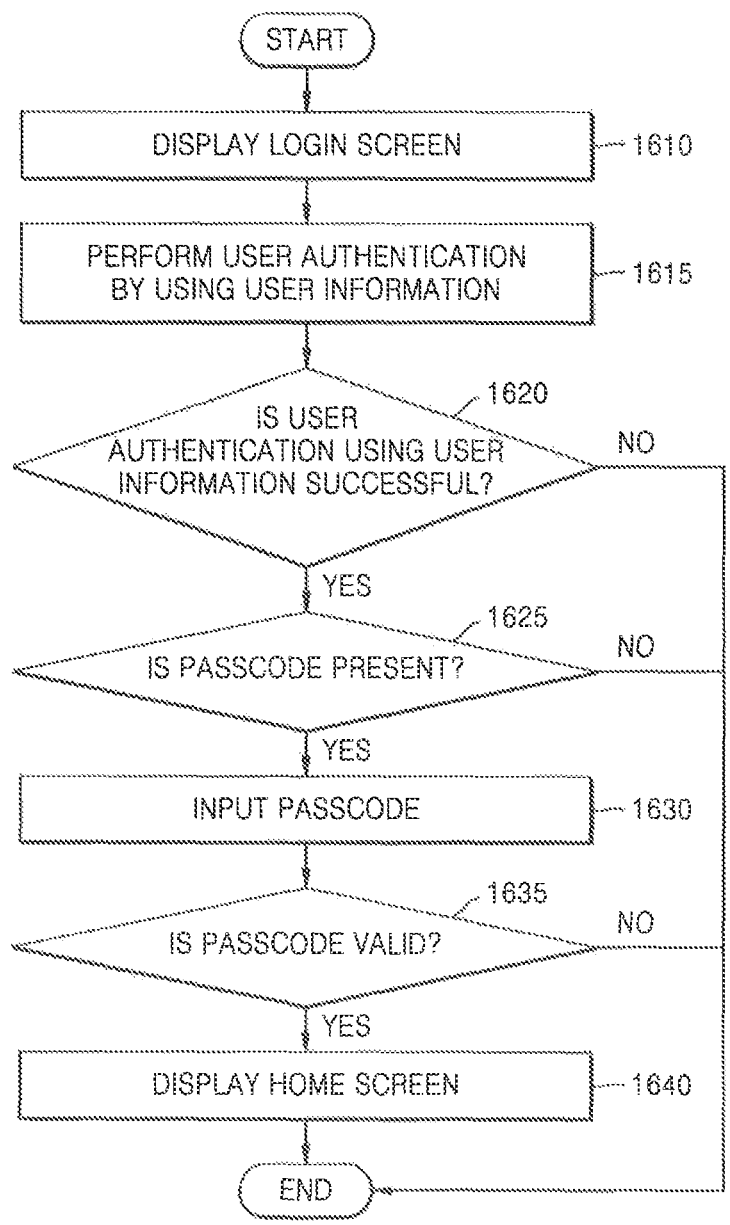
FIG. 16A is a flowchart of a method of performing user authentication by using a passcode, the method being performed in the image forming apparatus, according to an embodiment.

FIG. 16A is a flowchart of a method of performing user authentication by using a passcode, the method performed in the image forming apparatus, according to an embodiment.

According to an embodiment, the image forming apparatus 20 may perform user authentication by using the passcode, in addition to performing user authentication by using user information.

Referring to FIG. 16A, in operation 1610, the image forming apparatus 20 displays a login screen.

In operation 1620, the image forming apparatus 20 may receive user information from the mobile terminal 10, and may perform user authentication by using the user information.

In operation 1625, the image forming apparatus 20 may determine whether the user authentication using the user information has been successful. The image forming apparatus 20 compares the received user information with stored user information and thus determines whether they match with each other. When the user authentication has been successful, the mobile terminal 10 may transmit, to the image forming apparatus 20, Unique ID (UID) that corresponds to the mobile terminal. The Unique ID (UID) may be previously registered in the image forming apparatus 20.

In operation 1625, when the user authentication has been successful, the image forming apparatus 20 determines whether a stored passcode corresponding to the UID is present. If the stored passcode is not present, the image forming apparatus 20 may display a message indicating that the user authentication has been failed. A user may register, by using the mobile terminal 10, a passcode corresponding to the UID in the image forming apparatus 20, and then may re-perform user authentication with respect to the image forming apparatus 20 by using the mobile terminal 10.

In operation 1630, when the stored passcode corresponding to the UID is present, the image forming apparatus 20 may receive an input of a passcode from the user. The image forming apparatus 20 may display a passcode input screen for receiving the input of the passcode from the user.

Figure 16B:
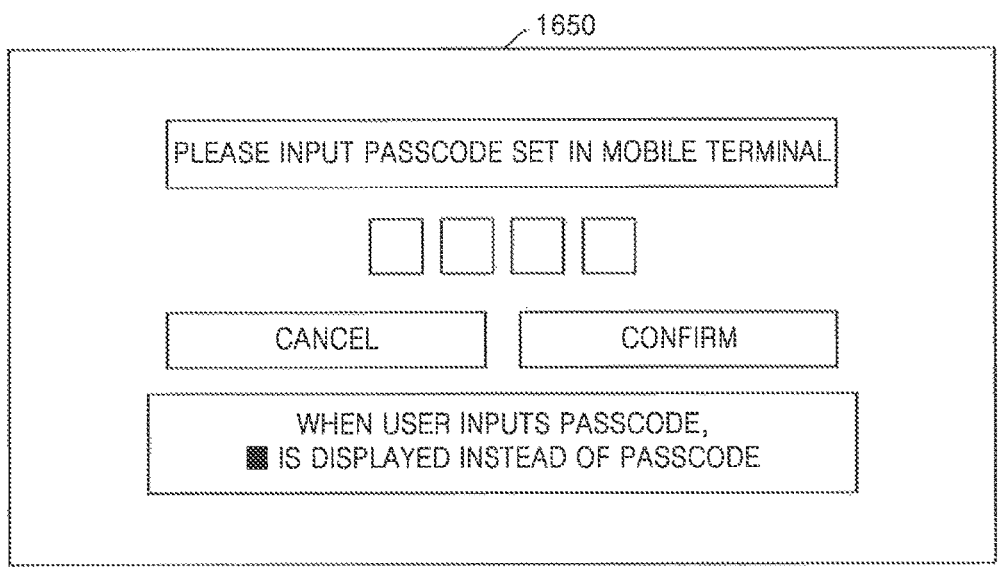
FIG. 16B illustrates a screen displayed on the image forming apparatus so as to receive an input of a passcode, according to an embodiment.

Referring to FIG. 16B, the image forming apparatus 20 may display a passcode input screen 1650. The user may input the passcode to the image forming apparatus 20, according to the passcode input screen 1650.

Referring back to FIG. 16A, in operation 1635, the image forming apparatus 20 may determine whether the passcode is valid. The image forming apparatus 20 may compare the stored passcode corresponding to the UID with the user-input passcode, may determine whether they match with each other, and may determine whether the passcode is valid. When the passcode is not valid, the image forming apparatus 20 may display a message indicating that the login has been failed.

In operation 1640, when the passcode is valid, the image forming apparatus 20 may display a home screen.

According to the present embodiment, the image forming apparatus 20 performs not only the user authentication by using the user information but also performs the user authentication by using the passcode, thus, even if another user who is not the original user of the mobile terminal performs user authentication by using the mobile terminal, the user authentication is not successfully performed by using only the user information stored in the mobile terminal, and the image forming apparatus requests the other user to input a passcode that is pre-registered in the image forming apparatus, so that the user authentication may be successfully performed only on a valid user.

FIG. 17 is a flowchart for describing a procedure in which the mobile terminal stores identification information of the image forming apparatus during a preset time period, and thus, limits user authentication using the mobile terminal, according to an embodiment.

Referring to FIG. 17, in operation 1705, when user authentication with respect to the image forming apparatus 20 has been successful, the mobile terminal 10 may store identification information of the image forming apparatus which is received from the image forming apparatus 20 to which the user authentication has been performed.

In operation 1710, the image forming apparatus 20 may periodically broadcast a packet (an advertising packet) including the identification information of the image forming apparatus. The mobile terminal 10 may receive some packets (advertising packets) from among a plurality of broadcasted packets (advertising packets).

In operation 1715, the mobile terminal 10 may determine whether to transmit a logout request, according to the number of the some packets (the advertising packets) received during a unit time period, and/or received signal strengths of the received some packets (the advertising packets).

In operation 1720, the mobile terminal 10 may transmit the logout request to the image forming apparatus 20, based on a result of determining whether to transmit the logout request. When the image forming apparatus 20 receives the logout request from the mobile terminal 10, the image forming apparatus 20 may perform a logout with respect to a user who has been successfully authenticated.

In operation 1725, when the user who has been successfully authenticated is logged out, the mobile terminal 10 may be set to retain the stored identification information of the image forming apparatus 20 during a preset time period.

In operation 1730, the image forming apparatus 20 may periodically broadcast the packet (the advertising packet) including the identification information of the image forming apparatus 20. The mobile terminal 10 may receive the broadcasted packet (the advertising packet).

In operation 1735, when the stored identification information of the image forming apparatus matches with the identification information of the image forming apparatus 20 which is included in the packet (the advertising packet), the mobile terminal 10 may determine not to transmit a connection request (e.g., a BLE connection request).

In operation 1740, when the preset time period passes, the mobile terminal 10 may delete the stored identification information of the image forming apparatus.

In operation 1745, the image forming apparatus 20 may broadcast the packet (the advertising packet) including the identification information of the image forming apparatus 20.

In operation 1750, the mobile terminal 10 may receive some packets (advertising packets) from among the plurality of broadcasted packets (the advertising packets), and may determine whether to transmit a connection request (e.g., a BLE connection request), according to the number of the some packets (the advertising packets) received during a unit time period, and/or received signal strengths of the received some packets (the advertising packets). In this regard, since the stored identification information of the image forming apparatus was deleted from the mobile terminal 10, identification information of an image forming apparatus which matches with the identification information of the image forming apparatus which is included in the packet (the advertising packet) is not stored.

Therefore, the mobile terminal 10 may receive the some packets (the advertising packets) from among the plurality of broadcasted packets (the advertising packets), and may determine whether to transmit the connection request (e.g., the BLE connection request), according to the number of the some packets (the advertising packets) received during a unit time period, and/or received signal strengths of the received some packets (the advertising packets).

In operation 1755, the mobile terminal 10 may transmit the connection request (e.g., the BLE connection request) to the image forming apparatus 20, based on a result of determining whether to transmit the connection request (e.g., the BLE connection request).

In operation 1760, the image forming apparatus 20 may receive the connection request (e.g., the BLE connection request) from the mobile terminal 10, and may establish a connection (e.g., the BLE connection request) with the mobile terminal 10.

In operation 1765, the mobile terminal 10 may transmit user information to the image forming apparatus 20 via the connection (the BLE connection).

In operation 1770, the image forming apparatus 20 may receive the user information from the mobile terminal 10, and may perform user authentication with respect to the image forming apparatus by using the received user information.

According to the present embodiment, the mobile terminal may store the identification information of the image forming apparatus during the preset time period, and may not perform the user authentication during a preset time period by limiting a connection (e.g., a BLE connection) with the image forming apparatus corresponding to the stored identification information of the image forming apparatus.

With reference to FIG. 17, it is described that the mobile terminal transmits the logout request, according to the number of packets (advertising packets) received during a unit time period, and/or received signal strengths of the received packets (the advertising packets), but the present embodiment is not limited thereto and it is obvious to one of ordinary skill in the art that the mobile terminal 10 may receive a user input indicating the logout request, and may transmit the logout request to the image forming apparatus.

FIG. 18 is a flowchart for describing a procedure in which the image forming apparatus broadcasts an advertising packet including status information of the image forming apparatus during a preset time period, and thus, limits user authentication using the mobile terminal, according to an embodiment.

Referring to FIG. 18, in operation 1805, the mobile terminal 10 transmits user information to the image forming apparatus 20, and the image forming apparatus 20 performs user authentication based on the transmitted user information. In this regard, it is assumed that the user authentication has been successfully performed.

In operation 1810, the image forming apparatus 20 may receive a user input indicating that a logout is performed.

In operation 1815, the image forming apparatus 20 may perform the logout with respect to an authenticated user, based on the received user input.

In operation 1820, the image forming apparatus 20 may generate, during a preset time period, a packet (an advertising packet) including status information of the image forming apparatus, wherein the status information indicates that a login is not available.

The image forming apparatus 20 may generate packets (advertising packets) so as to periodically transmit the packets (the advertising packets), and the status information of the image forming apparatus which indicates that the login is not available may be included in packets (advertising packets) that are generated during the preset time period.

In operation 1825, the image forming apparatus 20 may broadcast the packet (the advertising packet) including the status information of the image forming apparatus and identification information of the image forming apparatus. The mobile terminal 10 may receive the packet (the advertising packet) broadcasted from the image forming apparatus 20.

In operation 1830, when the status information of the image forming apparatus indicates that the login is not available, the mobile terminal 10 may determine not to perform a connection request (e.g., a BLE connection request).

In operation 1835, after a preset time elapses, the image forming apparatus 20 may generate a packet (an advertising packet) including status information of the image forming apparatus which indicates that a login is available.

In operation 1840, the image forming apparatus 20 may broadcast the packet (the advertising packet) including the status information of the image forming apparatus and the identification information of the image forming apparatus. The mobile terminal 10 may receive some packets (advertising packets) from among a plurality of packets (advertising packets) broadcasted from the image forming apparatus 20.

In operation 1845, the mobile terminal 10 may determine whether to transmit a connection request (e.g., a BLE connection request), according to the status information of the image forming apparatus included in the received some packets (the advertising packets) and the number of the some packets (the advertising packets) received during a unit time period, and/or received signal strengths of the received some packets (the advertising packets). For example, when the number of the some packets (the advertising packets) received during the unit time period is equal to or greater than a certain number, and the status information of the image forming apparatus included in the received some packets indicates that the login is available, the mobile terminal 10 may determine to transmit the connection request (e.g., the BLE connection request).

In operation 1850, when the mobile terminal 10 determines to transmit the connection request (e.g., the BLE connection request), according to the status information of the image forming apparatus included in the received some packets (the advertising packets) and the number of the some packets (the advertising packets) received during a unit time period, and/or received signal strengths of the received some packets (the advertising packets), the mobile terminal 10 may transmit the connection request (e.g., the BLE connection request) to the image forming apparatus 20.

In operation 1855, the image forming apparatus 20 may receive the connection request (e.g., the BLE connection request) from the mobile terminal 10, and may establish a connection (e.g., a BLE connection) with the mobile terminal 10, based on the received connection request (e.g., the BLE connection request).

In operation 1860, the mobile terminal 10 may transmit user information to the image forming apparatus 20 via the connection (e.g., the BLE connection). The image forming apparatus 20 may transmit the user information from the mobile terminal 10. The image forming apparatus 20 may receive the user information from the mobile terminal 10.

In operation 1865, the image forming apparatus 20 may perform user authentication with respect to the image forming apparatus by using the received user information.

According to the present embodiment, when a logout is performed in the image forming apparatus 20, a packets (an advertising packets) including status information of the image forming apparatus which indicates that a login is not available during a preset time period is generated, and the generated advertising packet is broadcasted to limit that the mobile terminal transmits a connection request (e.g., a BLE connection request), so that, even if a user carrying the mobile terminal does not become distant from the image forming apparatus, user authentication may not be performed during a preset time period.

With reference to FIG. 18, it is described that the user authentication with respect to all users who receive the packet (the advertising packet) is limited during a preset time period, however, the present embodiment is not limited thereto, and a packet (an advertising packet) including user information about a user who logged out may be generated, and a terminal that stores the user information and is from among terminals that receive the packet (the advertising packet) may be limited in transmitting a connection request (e.g., a BLE connection request).

Figure 19:
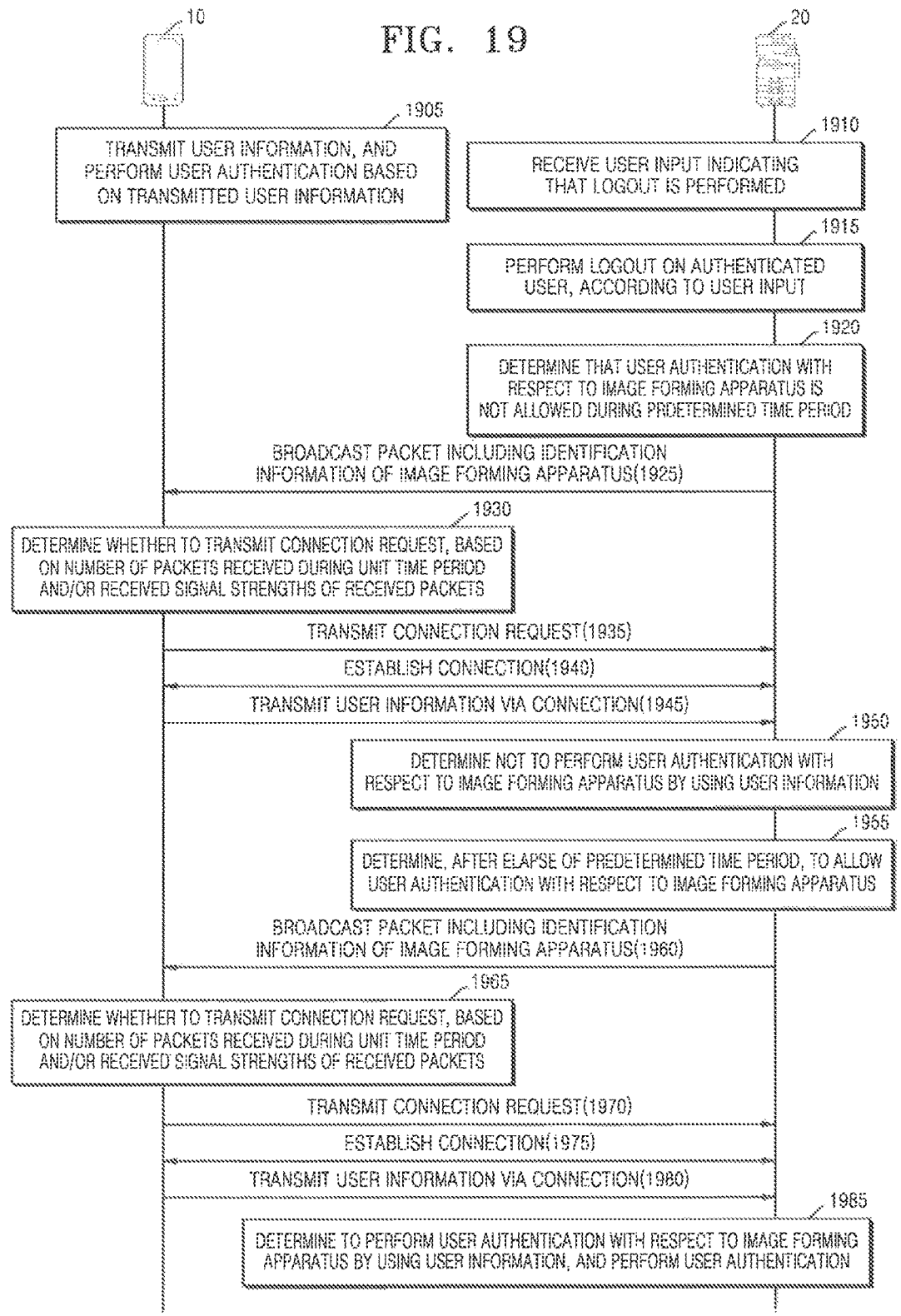
FIG. 19 is a flowchart for describing a procedure in which, when a user logs out from the image forming apparatus, user authentication with respect to the image forming apparatus is limited during a preset time period so that the user authentication using the mobile terminal is limited, according to an embodiment.

FIG. 19 is a flowchart for describing a procedure in which, when a user logs out from the image forming apparatus, user authentication with respect to the image forming apparatus is limited during a preset time period so that the user authentication using the mobile terminal is limited, according to an embodiment.

Referring to FIG. 19, in operation 1905, the mobile terminal 10 transmits user information to the image forming apparatus 20, and user authentication is performed based on the transmitted user information by the image forming apparatus 20. In this regard, it is assumed that the user authentication is successfully performed.

In operation 1910, the image forming apparatus 20 may receive a user input indicating that a logout is performed.

In operation 1915, the image forming apparatus 20 may perform the logout on an authenticated user, according to the received user input.

In operation 1920, the image forming apparatus 20 may determine that the image forming apparatus 20 does not allow user authentication with respect to the image forming apparatus during a preset time period after the image formnning apparatus 20 performs the logout.

In operation 1925, the image forming apparatus 20 may broadcast a packet (an advertising packet) including identification information of the image forming apparatus. The mobile terminal 10 may receive some packets (advertising packets) from among a plurality of packets (advertising packets) that are broadcasted from the image forming apparatus 20.

In operation 1930, the mobile terminal 10 determines whether to transmit a connection request (e.g., a BLE connection request), based on the number of some packets (the advertising packets) received during a unit time period and/or received signal strengths of the received some packets (the advertising packets).

In operation 1935, when the mobile terminal 10 determines to transmit the connection request (e.g., the BLE connection request), based on the number of some packets (the advertising packets) received during the unit time period and/or received signal strengths of the received some packets (the advertising packets), the mobile terminal 10 may transmit the connection request (e.g., the BLE connection request) to the image forming apparatus 20.

In operation 1940, the image forming apparatus 20 may receive the connection request (e.g., the BLE connection request) from the mobile terminal 10, and may establish a connection (e.g., a BLE connection) with the mobile terminal 10, based on the received connection request (e.g., the BLE connection request).

In operation 1945, the mobile terminal 10 may transmit the user information to the image forming apparatus 20 via the connection (e.g., the BLE connection).

In operation 1950, since the image forming apparatus 20 previously determined not to allow the user authentication with respect to the image forming apparatus during the preset time period, the image forming apparatus 20 may determine not to perform the user authentication with respect to the image forming apparatus by using the user information.

In operation 1955, the image forming apparatus 20 may determine, after an elapse of a preset time period, to allow the user authentication with respect to the image forming apparatus.

In operation 1960, the image forming apparatus 20 may broadcast a packet (an advertising packet) including the identification information of the image forming apparatus. The mobile terminal 10 may receive some packets (advertising packets) from among a plurality of packets (advertising packets) that are broadcasted from the image forming apparatus 20.

In operation 1965, the mobile terminal 10 may determine whether to transmit a connection request (e.g., a BLE connection request), based on the number of some packets (the advertising packets) received during a unit time period and/or received signal strengths of the received some packets (the advertising packets).

In operation 1970, when the mobile terminal 10 determines to transmit the connection request, the mobile terminal 10 may transmit the connection request (e.g., the BLE connection request) to the image forming apparatus 20.

In operation 1975, the image forming apparatus 20 may receive the connection request (e.g., the BLE connection request) from the mobile terminal 10, and may establish a connection (e.g., a BLE connection) with the mobile terminal 10, based on the received connection request (e.g., the BLE connection request).

In operation 1980, the mobile terminal 10 may transmit the user information to the image forming apparatus 20 via the connection (e.g., the BLE connection).

In operation 1985, the image forming apparatus 20 receives the user information from the mobile terminal 10, since the image forming apparatus 20 previously determined to allow the user authentication with respect to the image forming apparatus 20, the image forming apparatus 20 may determine to perform the user authentication with respect to the image forming apparatus by using the received user information, and may perform the user authentication with respect to the image forming apparatus.

According to the present embodiment, when a logout is performed in the image forming apparatus 20, the image forming apparatus 20 may determine that a login is not available during a preset time period, even if the image forming apparatus 20 receives the user information from the mobile terminal 10, the image forming apparatus 20 does not perform the user authentication with respect to the image forming apparatus, based on the determination, so that, when a carried mobile terminal distant from the image forming apparatus, the user authentication with respect to the image forming apparatus may not be performed during a preset time period.

With reference to FIG. 19, it is described that the user authentication with respect to all users are limited during a preset time period, but the present embodiment is not limited thereto, and it is obvious to one of ordinary skill in the art that the user information about a user who logged out may be stored, and user authentication with respect to the user corresponding to the stored user information may be limited.

Referring to the present embodiment, the image forming apparatus 20 receives the user information via the connection (e.g., the BLE connection) and then limits that the user authentication is performed, but the present embodiment is not limited thereto, and it is obvious to one of ordinary skill in the art that, upon receipt of the connection request (e.g., the BLE connection request), establishing the connection (e.g., the BLE connection) may be limited.

FIG. 20 is a flowchart for describing a procedure in which the image forming apparatus performs a logout on an authenticated user when the mobile terminal becomes distant from the image forming apparatus, according to an embodiment.

Referring to FIG. 20, in operation 2005, the mobile terminal 10 transmits user information to the image forming apparatus 20, and the image forming apparatus 20 performs user authentication based on the transmitted user information. In this regard, it is assumed that the user authentication has been successfully performed.

In operation 2010, the image forming apparatus 20 may broadcast a packet (an advertising packet) including identification information of the image forming apparatus. The mobile terminal 10 may receive some packets (advertising packets) from among a plurality of packets (advertising packets) that are broadcasted from the image forming apparatus 20.

In operation 2015, the mobile terminal 10 may determine whether to transmit a logout request, based on the number of some packets (the advertising packets) received during a unit time period and/or received signal strengths of the received some packets (the advertising packets). For example, the mobile terminal 10 may determine to transmit the logout request, when the number of packets (advertising packets) during a unit time period, which are from among the received some packets (adverting packets) and whose received signal strengths are equal to or less than a first threshold value, is equal to or greater than a predetermined detecting count.

In operation 2020, the mobile terminal 10 may transmit the logout request, based on a result of whether to transmit the logout request to the image forming apparatus 20. The image forming apparatus 20 may receive the logout request from the mobile terminal 10.

In operation 2025, when the image forming apparatus 20 receives the logout request, the image forming apparatus 20 may perform a logout on an authenticated user.

According to the present embodiment, the mobile terminal 10 transmits the logout request to the image forming apparatus 20, based on the received signal strengths of the packets (the advertising packets), so that the logout may be automatically performed without involvement by the user.

The above embodiments can be written as computer programs and can be implemented in general-use digital computers that execute the programs using a computer-readable recording medium.

Examples of the computer-readable recording medium include magnetic storage media (e.g., ROM, floppy disks, hard disks, etc.), optical recording media (e.g., CD-ROMs, or DVDs), carrier waves (e.g., data transmission through the Internet), or the like.

It should be understood that the exemplary embodiments described herein should be considered in a descriptive sense only and not for purposes of limitation. Descriptions of features or aspects within each embodiment should typically be considered as available for other similar features or aspects in other exemplary embodiments.

While one or more embodiments have been described with reference to the figures, it will be understood by those of ordinary skill in the art that various changes in form and details may be made therein without departing from the spirit and scope as defined by the following claims.

The invention claimed is:

1. A method for adjusting a sensitivity of a transceiver in a mobile terminal, the method comprising:
    providing a user interface to adjust the sensitivity of the transceiver to a signal to be received from an image forming apparatus;
    receiving a first user input, via the user interface, to select a sensitivity value of the transceiver to the signal to be received; and
    adjusting the sensitivity value of the transceiver to the signal to be received based on the received first user input.

2. The method of claim 1, further comprising:
    receiving, from the image forming apparatus, at least one packet comprising identification information of the image forming apparatus;
    transmitting a connection request based on the sensitivity value of the transceiver; and
    connecting to the image forming apparatus based on the connection request.

3. The method of claim 2, wherein the transmitting of the connection request comprises:
    determining whether to transmit the connection request when a received signal strength of the at least one packet is greater than or equal to a value related to the sensitivity value of the transceiver; and
    transmitting the connection request to the image forming apparatus according to a result of the determining.

4. The method of claim 3,
    wherein the at least one packet includes a plurality of packets,
    wherein the plurality of packets are sequentially received during a unit time period,
    wherein the determining of whether to transmit the connection request comprises determining to transmit the connection request when the received signal strengths of the plurality of received packets are equal to or greater than the value related to the sensitivity value of the transceiver and the number of the plurality of received packets is equal to or greater than a predetermined count, and
    wherein the unit time period and the predetermined count are previously set.

5. The method of claim 3, wherein the transmitting of the connection request comprises:
    displaying a message for receiving a second user input according to the result of the determining;
    receiving the second user input according to the displayed message; and
    transmitting the connection request to the image forming apparatus, based on the received second user input.

6. The method of claim 1, wherein the signal to be received comprises a Bluetooth signal.

7. The method of claim 1, further comprising:
    determining whether the mobile terminal is in range of the image forming apparatus.

8. The method of claim 1, further comprising:
    notifying a user when a connection to the image forming apparatus is available.

9. A non-transitory computer processor readable storage medium including instructions, executable by a processor, stored thereon to perform a method, the storage medium comprising:
    instructions to provide a user interface to adjust a sensitivity of a transceiver in a mobile terminal to a signal to be received from an image forming apparatus;
    instructions to receive a first user input, via the user interface, to select a sensitivity value of the transceiver to the signal to be received; and
    instructions to adjust the sensitivity value of the transceiver to the signal to be received based on the received first user input.

10. The non-transitory computer processor readable storage medium of claim 9, further comprising:
    instructions to receive, from the image forming apparatus, at least one packet comprising identification information of the image forming apparatus;
    instructions to transmit a connection request based on the sensitivity value of the transceiver; and
    instructions to connect to the image forming apparatus based on the connection request.

11. The non-transitory computer processor readable storage medium of claim 10, wherein the instructions to transmit the connection request comprise:
    instructions to determine whether to transmit the connection request when a received signal strength of the at least one packet is greater than or equal to a value related to the sensitivity value of the transceiver; and
    instructions to transmit the connection request to the image forming apparatus according to a result of the determining.

12. The non-transitory computer processor readable storage medium of claim 11,
    wherein the at least one packet includes a plurality of packets,
    wherein the plurality of packets are sequentially received during a unit time period, wherein the determining of whether to transmit the connection request comprises determining to transmit the connection request when the received signal strengths of the plurality of received packets are equal to or greater than the value related to the sensitivity value of the transceiver and the number of the plurality of received packets is equal to or greater than a predetermined count, and wherein the unit time period and the predetermined count are previously set.

13. The non-transitory computer processor readable storage medium of claim 11, wherein the instructions to transmit the connection request comprise:

instructions to display a message for receiving a second user input according to the result of the determining;

instructions to receive the second user input according to the displayed message; and instructions to transmit the connection request to the image forming apparatus, based on the received second user input.

14. The non-transitory computer processor readable storage medium of claim 9, wherein the signal to be received comprises a Bluetooth signal.

15. The non-transitory computer processor readable storage medium of claim 9, further comprising:

instructions to determine whether the mobile terminal is in range of the image forming apparatus.

16. The non-transitory computer processor readable storage medium of claim 9, further comprising:

instructions to notify a user when a connection to the image forming apparatus is available.

* * * * *